(12) United States Patent
Mohanty

(10) Patent No.: US 9,498,735 B2
(45) Date of Patent: Nov. 22, 2016

(54) POLYGONAL TILES FOR TWO-DIMENSIONAL AND THREE-DIMENSIONAL SYMMETRY STRUCTURES

(71) Applicant: Yana Mohanty, San Diego, CA (US)

(72) Inventor: Yana Mohanty, San Diego, CA (US)

( * ) Notice: Subject to any disclaimer, the term of this patent is extended or adjusted under 35 U.S.C. 154(b) by 0 days.

(21) Appl. No.: 14/634,038

(22) Filed: Feb. 27, 2015

(65) Prior Publication Data

US 2015/0182870 A1    Jul. 2, 2015

Related U.S. Application Data

(63) Continuation-in-part of application No. 13/302,122, filed on Nov. 22, 2011, now Pat. No. 9,070,300.

(60) Provisional application No. 61/422,037, filed on Dec. 10, 2010.

(51) Int. Cl.
*A63H 33/08* (2006.01)
*G09B 23/02* (2006.01)
*G09B 23/00* (2006.01)
*G09B 23/04* (2006.01)
*B44C 3/12* (2006.01)
*A63F 9/06* (2006.01)

(52) U.S. Cl.
CPC ............... *A63H 33/08* (2013.01); *G09B 23/00* (2013.01); *G09B 23/02* (2013.01); *G09B 23/04* (2013.01); *A63F 9/0669* (2013.01); *A63F 2009/0697* (2013.01); *B44C 3/12* (2013.01); *Y10T 428/1486* (2015.01); *Y10T 428/16* (2015.01); *Y10T 428/18* (2015.01); *Y10T 428/183* (2015.01)

(58) Field of Classification Search
USPC ........... 434/33, 81, 96, 188, 211; 273/157 R; 428/33
See application file for complete search history.

(56) References Cited

U.S. PATENT DOCUMENTS

| | | | |
|---|---|---|---|
| 909,603 A | 1/1909 | Janin | |
| 2,776,521 A * | 1/1957 | Zimmerman | A63H 33/065 16/227 |
| 2,885,207 A | 5/1959 | Wormser | |
| 3,003,260 A * | 10/1961 | Bassetti | G09B 23/04 428/542.2 |
| 3,633,286 A | 1/1972 | Maurer | |
| 4,133,152 A | 1/1979 | Penrose | |
| 4,309,852 A * | 1/1982 | Stolpin | A63H 33/04 446/116 |
| 4,620,998 A | 11/1986 | Lalvani | |
| 4,792,319 A * | 12/1988 | Svagerko | A63H 33/08 446/104 |
| 4,836,787 A * | 6/1989 | Boo | A63H 33/048 434/403 |
| 4,842,905 A | 6/1989 | Stech | |
| 5,178,391 A * | 1/1993 | Schoen | A63F 9/12 273/153 R |
| 5,183,430 A * | 2/1993 | Swann | A63H 33/04 446/104 |

(Continued)

OTHER PUBLICATIONS

Weisstein, Eric W. "Platonic Solid." From MathWorld—A Wolfram Web Resource. http://mathworld.wolfram.com/PlatonicSolid.html visited Nov. 13, 2014.

(Continued)

*Primary Examiner* — James Hull
(74) *Attorney, Agent, or Firm* — Mark Wisnosky

(57) ABSTRACT

A variety of sets of interconnecting plane tiles having shapes, patterns on the faces of some of the tiles and interconnecting elements to be able to construct all 17 plane periodic patterns, the five Platonic solids and the thirteen Archimedean solids are described. The tiles include connectors that enable constructing plane patterns as well as three-dimensional solids.

11 Claims, 68 Drawing Sheets

(56) References Cited

U.S. PATENT DOCUMENTS

| | | | |
|---|---|---|---|
| 5,203,706 A * | 4/1993 | Zamir | G09B 1/16 434/159 |
| 5,368,301 A * | 11/1994 | Mitchell | A63F 9/10 273/157 R |
| 5,619,830 A | 4/1997 | Osborn | |
| 5,945,181 A * | 8/1999 | Fisher | B44C 3/123 428/33 |
| 6,309,716 B1 * | 10/2001 | Fisher | B44C 3/12 273/157 R |
| 7,438,623 B2 * | 10/2008 | Lin | A63H 33/086 446/104 |
| 7,833,077 B1 | 11/2010 | Simmons | |
| 8,366,507 B2 * | 2/2013 | Chen | A63H 33/086 446/108 |
| 2006/0037885 A1 * | 2/2006 | Hilbourne | B65D 81/24 206/525 |
| 2014/0099159 A1 * | 4/2014 | Maunder | F16B 5/0024 403/294 |

OTHER PUBLICATIONS

Weisstein, Eric W. "Archimedean Solid." From MathWorld—A Wolfram Web Resource. http://mathworld.wolfram.com/ArchimedeanSolid.html, visited Nov. 13, 2014.

\* cited by examiner

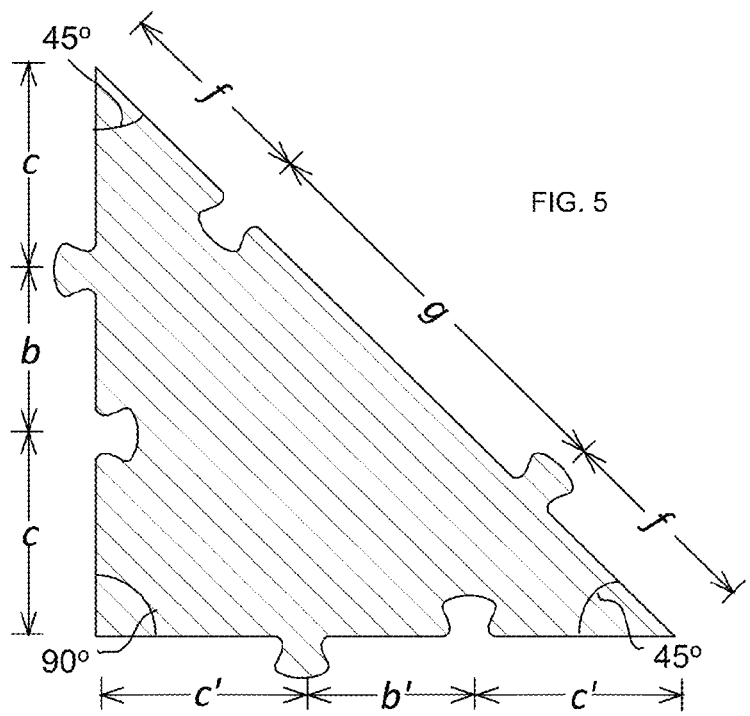
FIG. 5
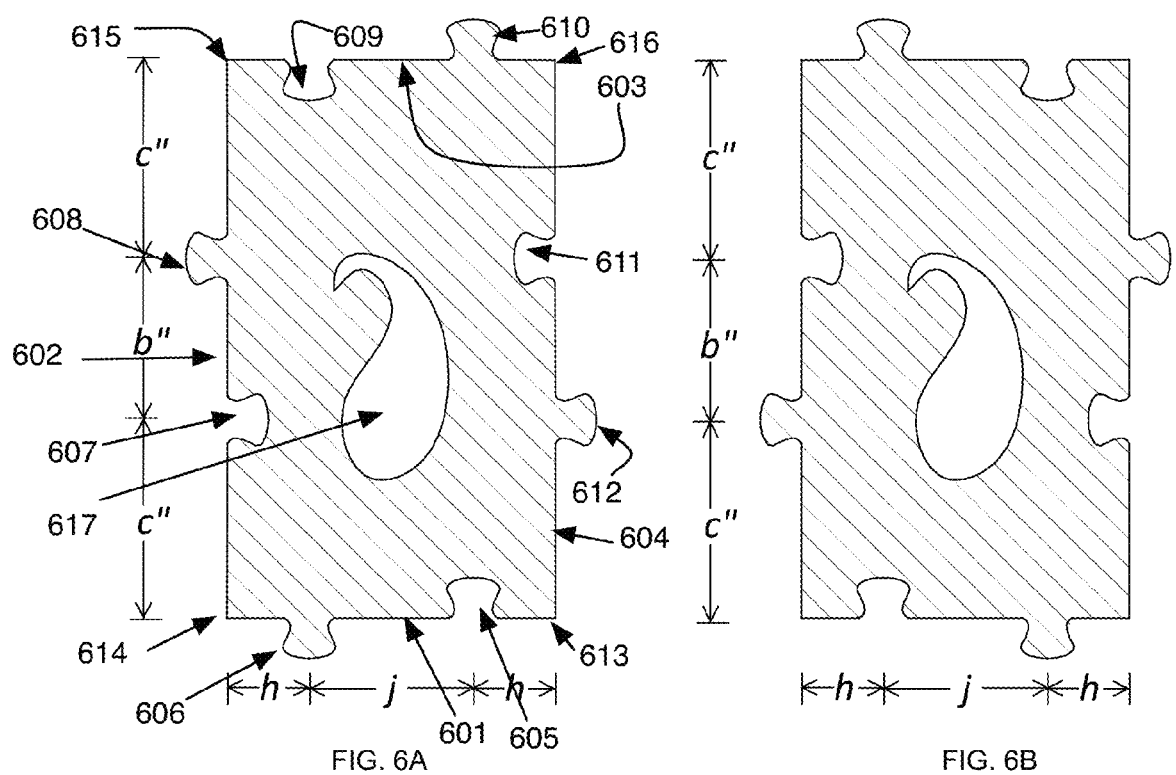
FIG. 6A
FIG. 6B

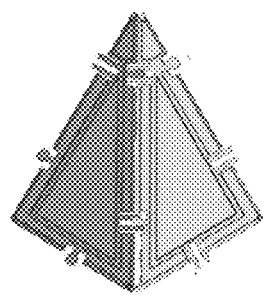
5723
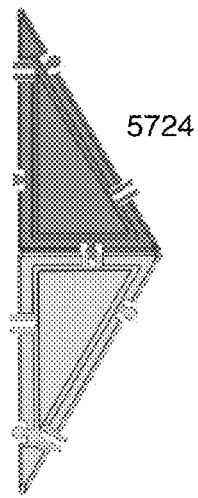
5724
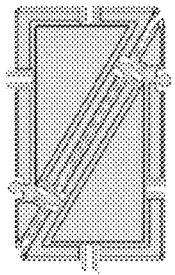
5725
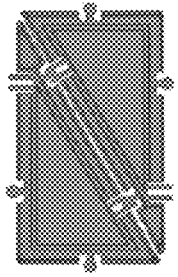
5726
Fig. 57B

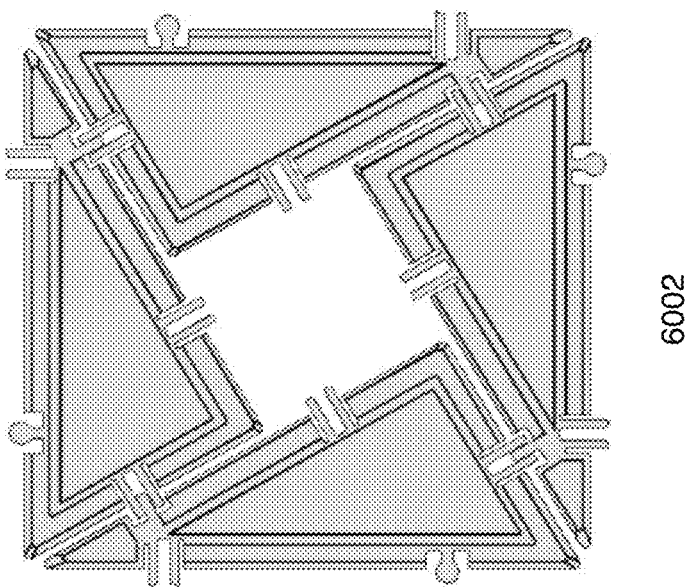
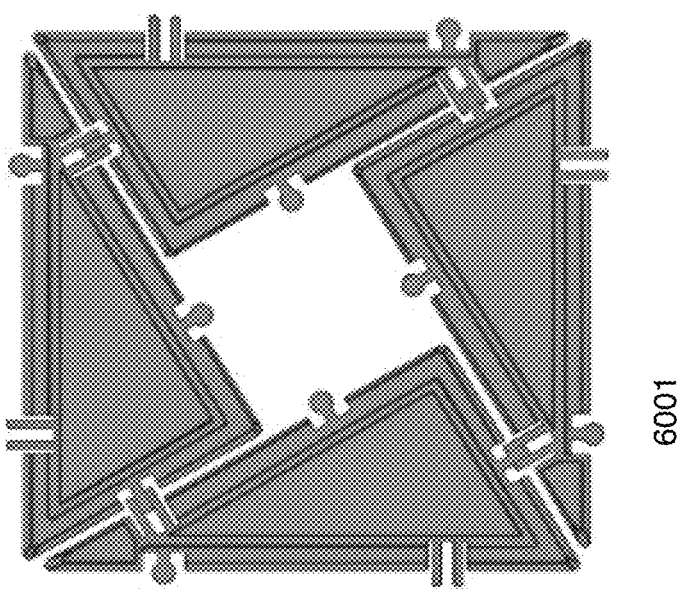
Fig. 60

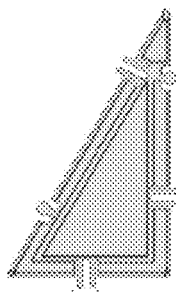 6113
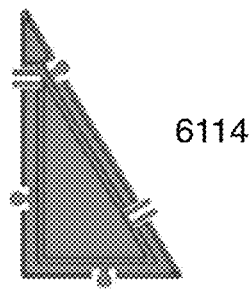 6114
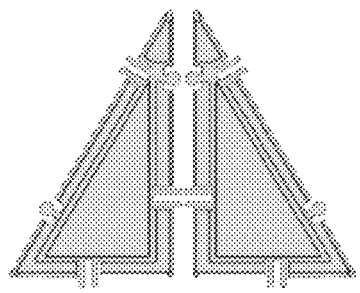 6115
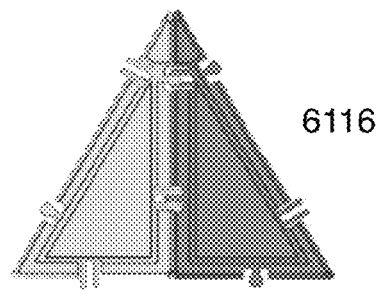 6116
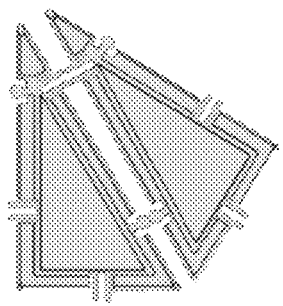 6117
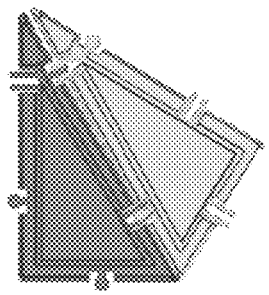 6118
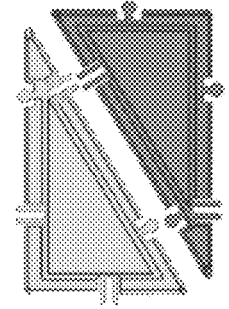 6119
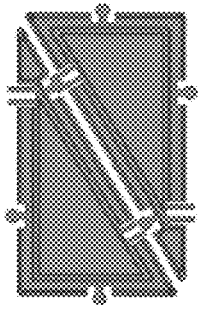 6120
Fig. 61B Weisstein, Eric W. "Archimedean Solid." From *MathWorld*—A Wolfram Web Resource.
http://mathworld.wolfram.com/ArchimedeanSolid.html

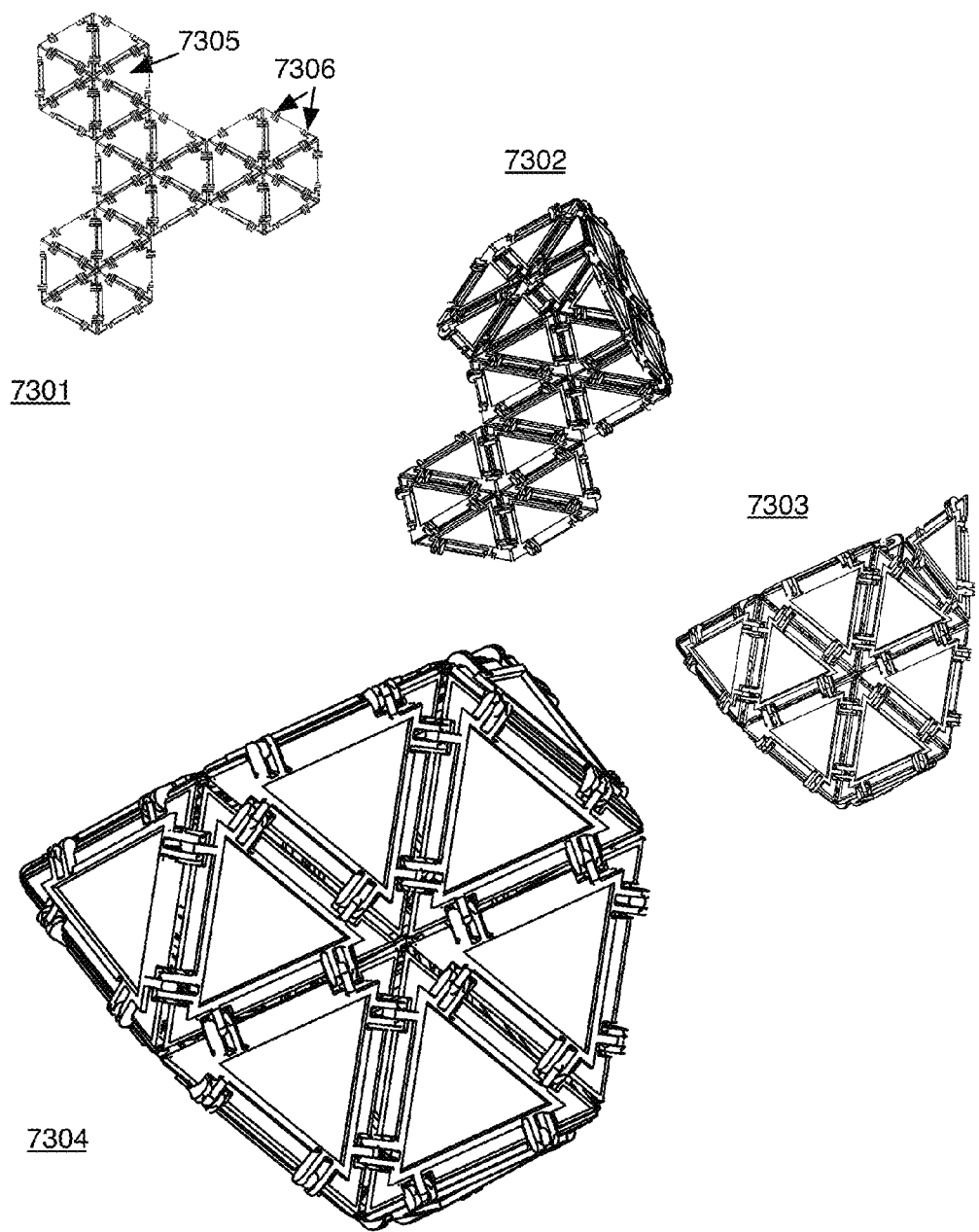
Fig. 73  Truncated Tetrahedron

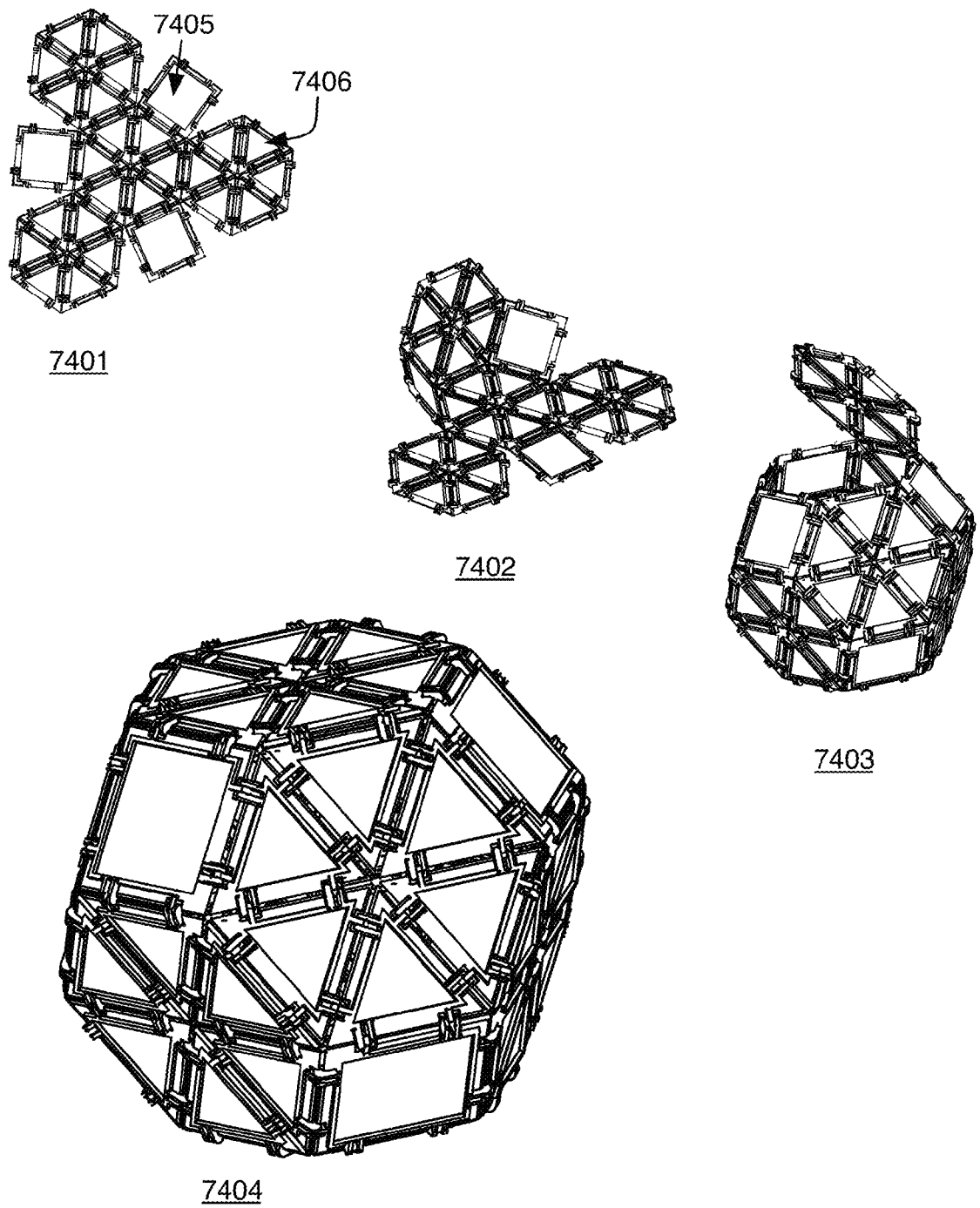
Fig. 74 Truncated Octahedron

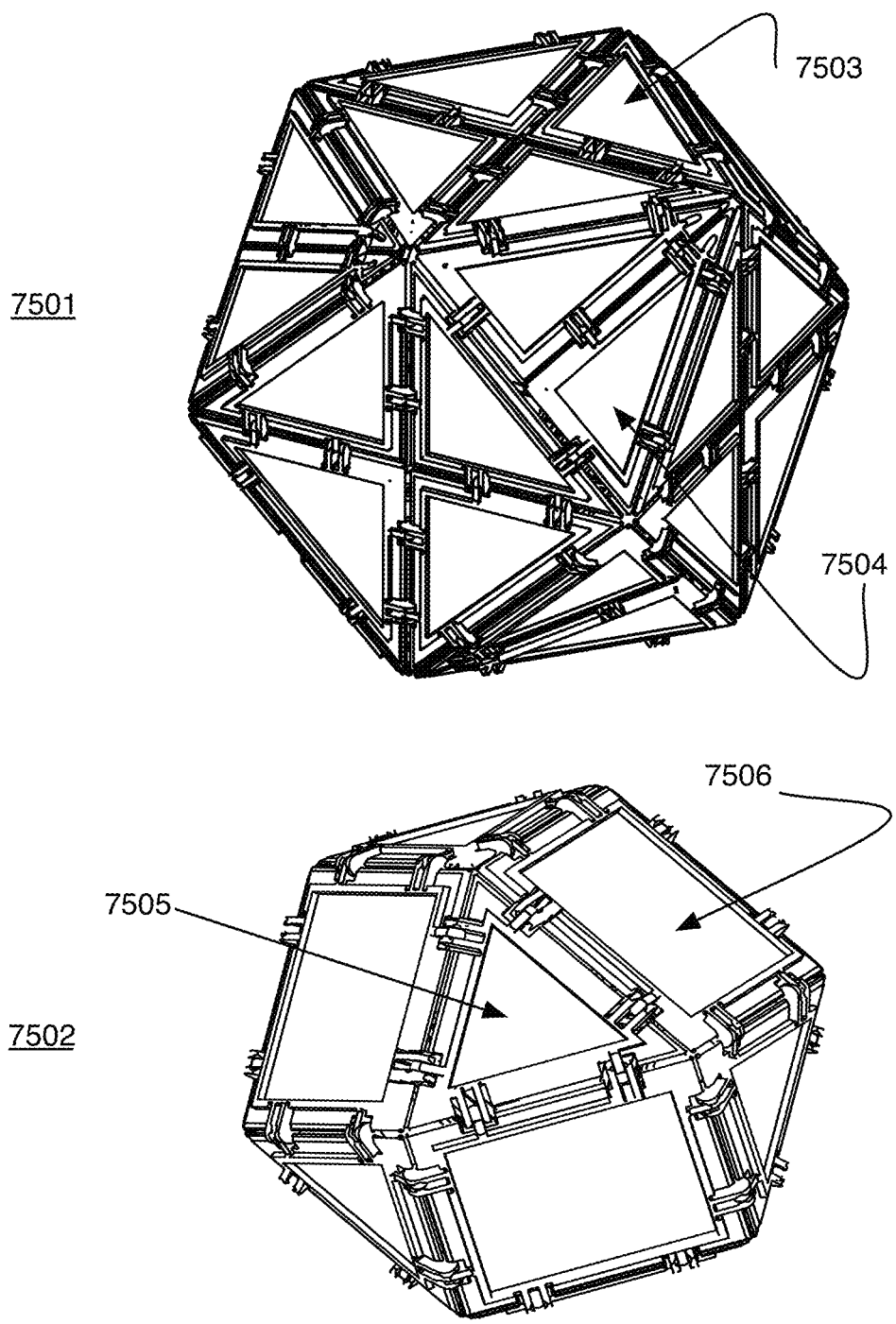
Fig. 75   Cuboctohedron

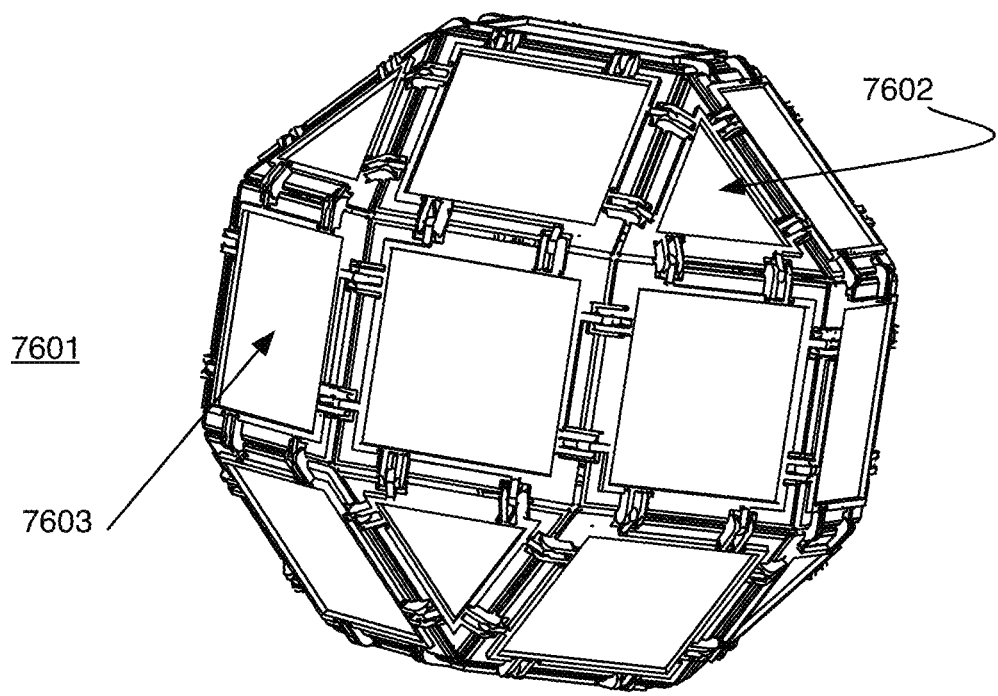
Fig. 76    Rhombicuboctahedron
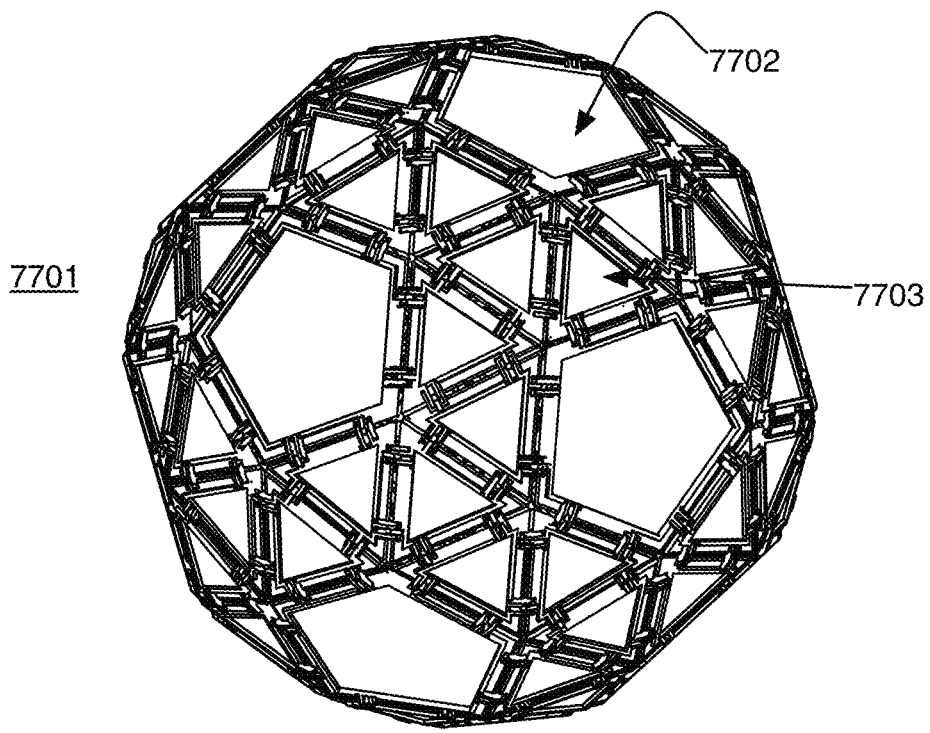
Fig. 77    snub dodecahedron

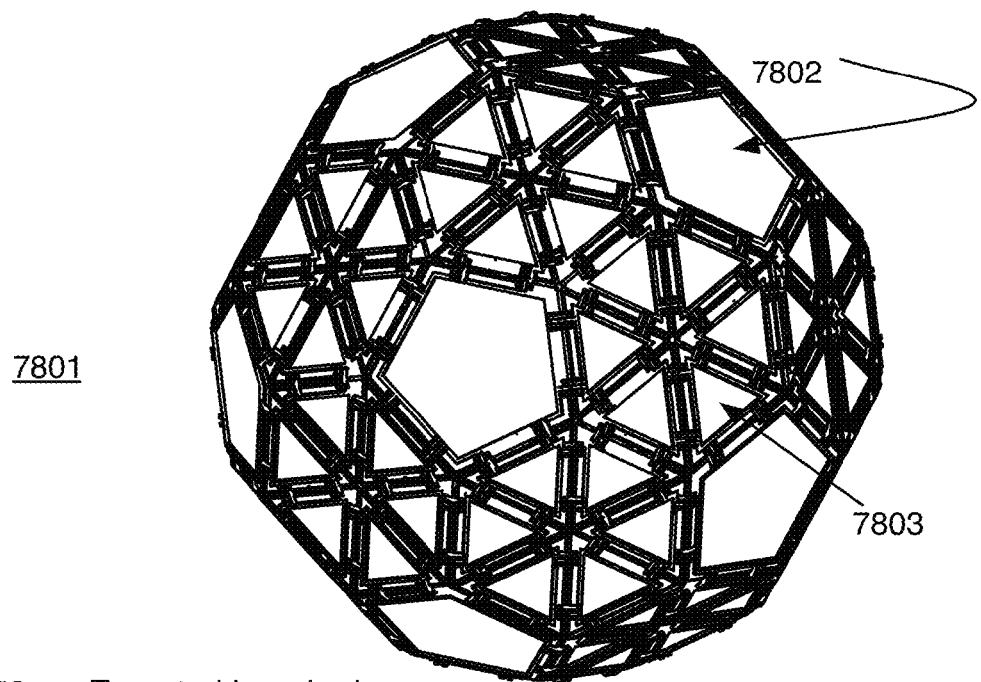
Fig. 78  Tuncated Icosahedron
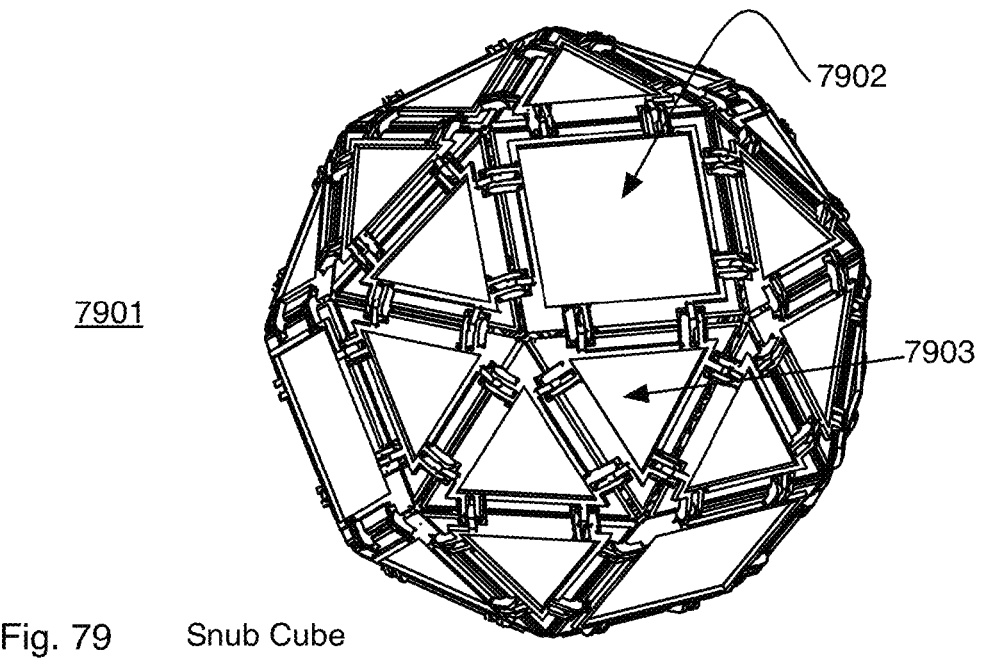
Fig. 79  Snub Cube

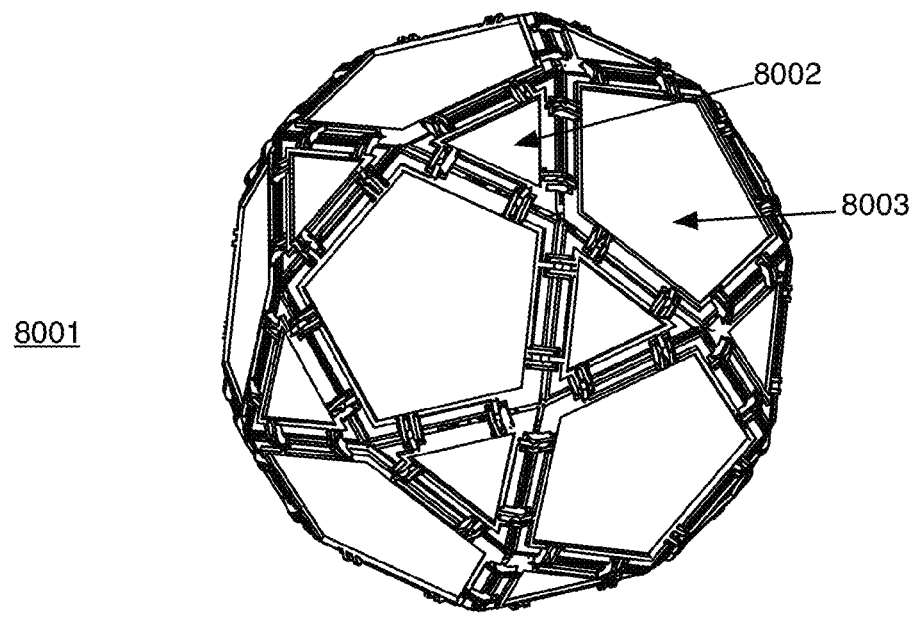
Fig. 80  Icosidodecahedron
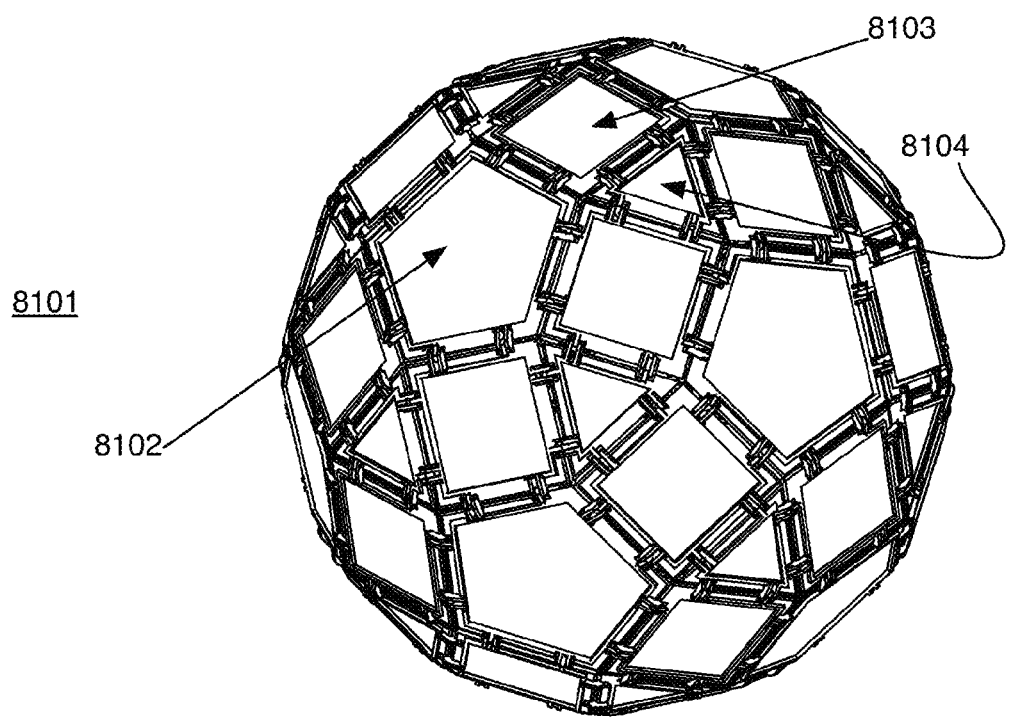
Fig. 81  Rhombicosidodecahedron

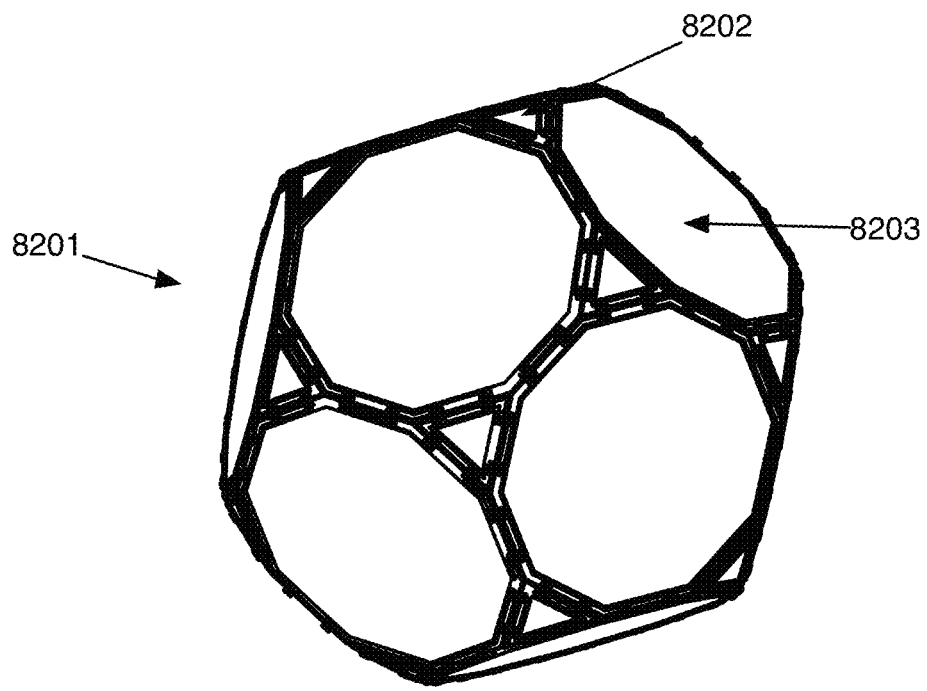
Fig 82    truncated dodecahedron
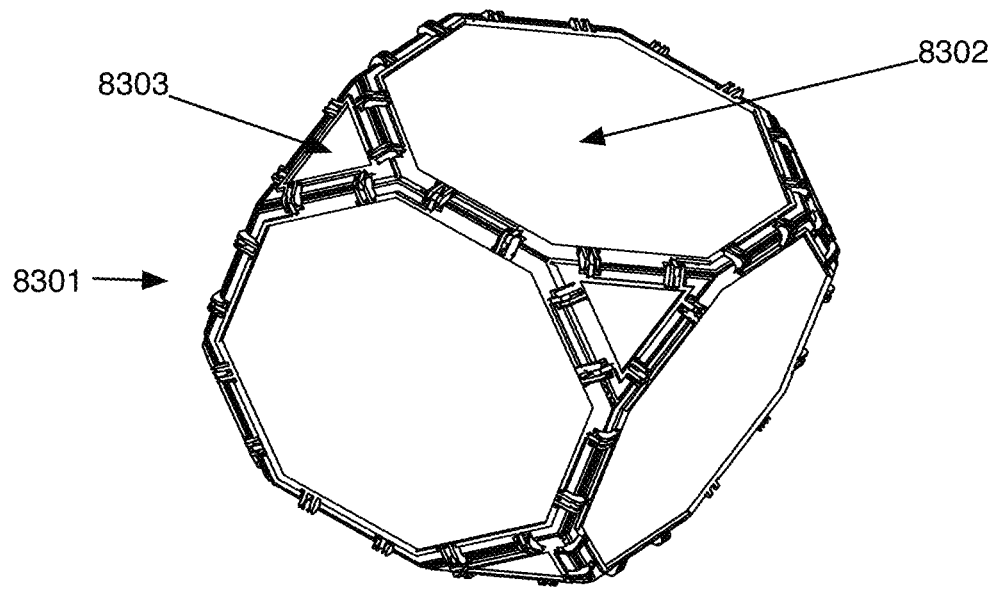
Fig 83    Truncated Cube

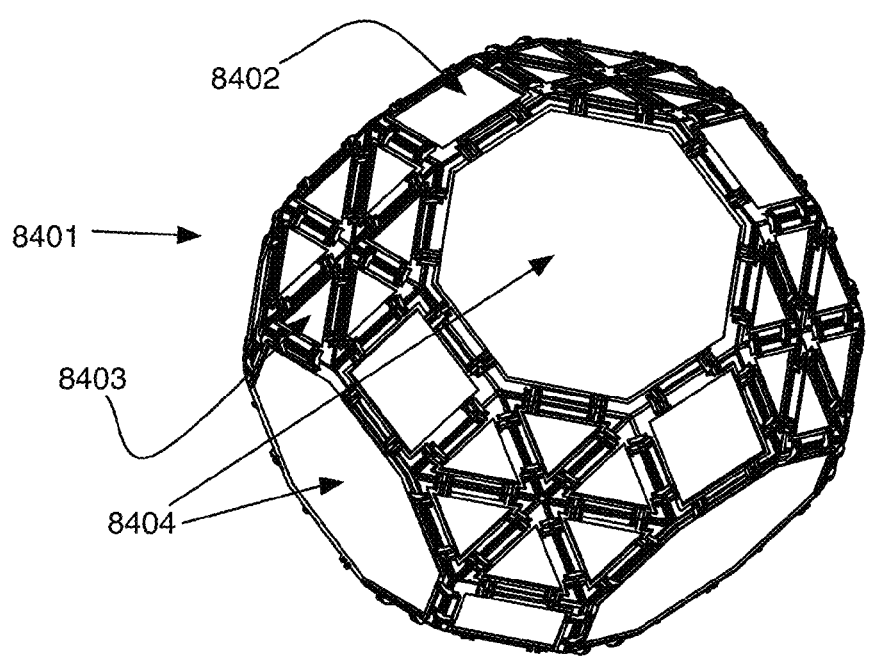
Fig. 84    great rhombicuboctahedron
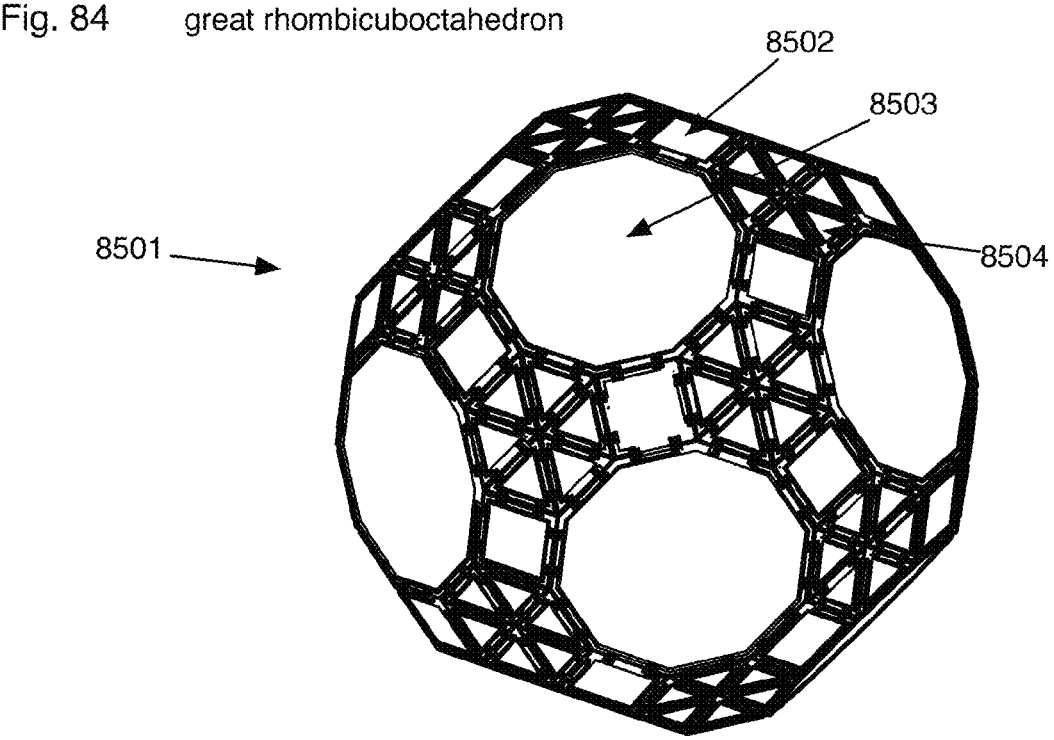
Fig. 85    great rhombicosidodecahedron

POLYGONAL TILES FOR TWO-DIMENSIONAL AND THREE-DIMENSIONAL SYMMETRY STRUCTURES

CROSS-REFERENCE TO RELATED APPLICATIONS

This application is a continuation in part of U.S. patent application Ser. No. 13/302,122 titled: Set of Variably Assemblable Polygonal Tiles with Stencil Capability, filed on Nov. 22, 2011, by the same inventor and currently pending and included herein in its entirety by reference.

TECHNICAL FIELD

The present invention relates to interlocking tile sets that can be assembled to make plane periodic patterns and three-dimensional polygonal solids with particular symmetry properties.

RELATED BACKGROUND ART

Plane periodic patterns have been used as decorations all over the world for millennia. Apart from being used in the design of floor tiles, wallpapers, textiles, and other articles, plane periodic patterns also occur in nature as cross sections of crystal lattices. As such, crystallographers have studied them since the 19th century. It was then that scientists discovered that all the plane periodic patterns fall into just 17 categories. Mathematicians consider two patterns in the same category to be "the same", even if the patterns look somewhat different to a layperson. This begs the question: what criteria are used to determine whether any two given patterns are in the same category, or, in other words, "the same"? The mathematically correct answer is that two patterns are "the same" if their groups of symmetry are the same. A pattern's group of symmetry is the set of all the moves (such as rotations, reflections, translations, or glide reflections) one can perform on a pattern without changing it. This definition of "the same" with regard to plane periodic patterns will be used throughout this document.

The "17 wallpaper patterns," as they are commonly known, have been the subject of rigorous mathematical research, of which the most recent and complete exposition can be found in (Conway, Burgiel, & Goodman-Strauss, The Symmetries of Things, 2008, pp. 15-49). This work describes one of the standard notations for the patterns, known as the "Conway notation" and shows how this notation holds the key to the proof of why there are only 17 possible patterns. Conway et al. go further to show the relationships between the various patterns and the different ways they can be colored. They put these findings in a mathematical framework using group theory, which is an extremely important and powerful tool in the study of mathematics.

Given both the visual and mathematical appeal of planar patterns, they have been a popular subject of study for students of a variety of levels. At the college level, students are taught to identify each of the 17 patterns in textbooks such as (Gallian, 2009, pp. 467-478). For students wishing to create an electronic version of any of the 17 patterns based on a single motif, there are a number of free software packages available on the Internet. These include Escher Web Sketch (Nicolas Schoeni, Hardake, & Chapuis) and Java Kali (Amenta & Phillips, 1996). Both of these programs can create any of the 17 patterns in seconds, making them effective tools for demonstration. However, the speed and the method with which the patterns are drawn on the screen make it difficult for most users to learn about the structure and identification of the patterns from these programs. All the elements of the tiling array are drawn on the screen simultaneously, so that the user has a hard time grasping the symmetries (i.e. rotations, translations, glide reflections, or reflections) that generate the entire pattern.

There are infinitely many ways to create tessellations, and much work has been done in the area of designing tessellating articles. Some examples can be seen in U.S. Pat. No. 909,603 (1909) to Janin, U.S. Pat. No. 4,133,152 (1979) to Penrose, U.S. Pat. No. 4,620,998 (1986) to Lalvani, U.S. Pat. No. 5,619,830 (1997) to Osborn, and U.S. Pat. No. 6,309,716 (2001) to Fisher. The above patents disclose sets of tiles that can be assembled into either periodic or nonperiodic planar patterns. However, none can construct the complete set of plane periodic patterns, nor teach a means to make this possible.

U.S. Pat. No. 5,368,301 (1994) issued to Mitchell discloses a puzzle composed of isosceles right triangle pieces that are similar in shape to some of the pieces in the present invention, as well as equilateral triangles. However, it is not possible to construct the complete set of all 17 repeating plane patterns with this set, even if one were to work with a multitude of identical tiles.

U.S. Pat. No. 7,833,077 (2010) due to Simmons, Jr. discloses interlocking blocks that can be assembled in a variety of ways. Their cross sections are somewhat similar to the tiles in the present invention, but they cannot be assembled into all of the 17 repeating planar patterns.

U.S. Pat. No. 3,633,286 (1972) to Maurer and U.S. Pat. No. 5,203,706 (1993) to Zamir disclose interlocking tiles with a stencil portion. Both of these inventions can be used to draw a very limited number of repeating planar patterns due to the shape of the tiles (rectangular) and the placement of the interlocking elements.

There are even fewer teaching resources that can be extended to three dimensions. The Platonic solids are convex polyhedra with equivalent faces composed of congruent convex regular polygons. There are exactly five such solids: the cube, dodecahedron, icosahedron, octahedron, and tetrahedron. This fact was proved by Euclid in the last proposition of the Elements. (see Weisstein, Eric W. "Platonic Solid." From MathWorld—A Wolfram Web Resource. http://mathworld.wolfram.com/PlatonicSolid.html visited 13 Nov. 2014). The Platonic solids, when projected on a sphere, tessellate it into regular spherical polygons. Thus, they can be viewed as regular tessellations of the sphere (http://en.wikipedia.org/wiki/Platonic_solid). There is a need for a teaching tool that can demonstrate the construction of all 17 symmetry types of plane repeating patterns. There is a need to extend this teaching set to three dimensions and be capable of creating three-dimensional solid elements, such as all five Platonic solids, and to extend the symmetric patterns on spherical surfaces (see Conway p. 51). There is a need for a teaching tool that can go beyond this and also create other well known solid types such as the Archimedean solids. The Archimedean solids are the convex polyhedra that have a similar arrangement of nonintersecting regular convex polygons of two or more different types arranged in the same way about each vertex with all sides of the polygons the same length. There are 13 Archimedean solids. (see Weisstein, Eric W. "Archimedean Solid." From MathWorld—A Wolfram Web Resource. http://mathworld.wolfram.com/ArchimedeanSolid.html, visited 13 Nov. 2014).

OBJECTIVES OF THE INVENTION

It is the primary objective of the present invention to provide a set of tiles as a manipulative educational aid for studying plane periodic patterns and three dimensional structures through the process of constructing them, and for learning the mathematical notation for these patterns.

It is another object of the invention to provide a set of tiles as a manipulative educational aid for learning basic geometrical and trigonometric concepts.

It is an object of the invention to provide a set of tiles as a manipulative educational aid for learning the four types of symmetry: translation, rotation, reflection, and glide reflection.

It is a further object of the invention to provide a stenciling assembly tracing planar patterns for the purpose of decoration and amusement.

DISCLOSURE OF THE INVENTION

Some definitions are in order. The following notation, henceforth referred to as the Conway notation, will be used for the 17 plane periodic patterns: *632, 632, 3*3, *333, 333, *442, 442, 4*2, 2*22, 22*, 2222, *2222, **, *X, XX, 22X, O. The patterns, together with their notation, are shown in FIG. 7. Patterns *632 and *442 will be referred to as the "parent" patterns, since all the other 15 patterns can be derived from them.

The "fundamental domain" of a pattern is the smallest part of the pattern based on which the entire pattern can be constructed. Some patterns have a uniquely defined fundamental domain, while others have fundamental domains of more than one possible shape.

Some of the tiles comprising the present invention differ from one another only in terms of the presence of a design. The tiles that do not have a design will be referred to as "plain". In the cases of tiles with a design, the design is included in the determination of the symmetry group of a pattern made with those tiles.

A tile and its "complement" are the same size and shape. The only difference between them is that the genders of their corresponding male and female coupling elements are opposite. Two complementary tiles fit together so that the designs on each tile, if any, are mirror images of one another.

In a first embodiment a set of tiles for covering a plane surface consists of nine types of tile. The set includes a plurality of each of: a 30°-60°-90° triangle, a 45°-45°-90° triangles. Wherein at least a portion of each type of tile piece further includes asymmetric stencils cut into the planar faces of each of the three shapes. The tile pieces include male and female coupling elements that enable construction of two dimensional, planar structures. The 30-60-90 triangles include complementary, non-overlapping pieces wherein the male and female connectors are interchanged. The male and female coupling elements are placed so that the tiles can be interconnected only in certain prescribed configurations. The dimensions of the tiles, the placement of the male and female coupling elements and the asymmetric stencils enable the particular constructions that include all 17 plane periodic patterns. The connectors in a first embodiment are male planar tabs and corresponding female cutouts sized and shaped to receive the male tabs analogous to parts as are found on jigsaw puzzles. Such tabs enable planar structures and are described in the parent application to this one (U.S. patent application Ser. No. 13/302,122, included herein in its entirety by reference).

In another embodiment methods of using the tiles make use of the fact that some tiles have an asymmetrical design cut out in the fashion of a stencil, while others are plain. The symmetry operations, such as rotations, reflections, translations, or glide reflections, applied to a pattern of interconnected tiles that result in an unchanged view of the pattern determine the classification of the pattern into one of the groups of symmetry. The "unchanged view" implies that both the tiles overlap and any features such as stencils on the tiles overlap after the symmetry operation. The tiles have jigsaw puzzle-like edges, with the male and female coupling elements placed so that the tiles can be juxtaposed only in certain prescribed configurations. Either periodic or non-periodic patterns can be assembled using the tiles. With periodic patterns, a fundamental domain can always be constructed using one or more tiles. This has the advantage of reinforcing the concept of a fundamental domain in the mind of the user. After creating a repeating pattern, the user can replace some of the tiles with designs on them with identically shaped plain tiles, thereby creating a new repeating pattern that is related to the original one they created. By working in this fashion and restricting himself to working with one shape at a time (e.g. isosceles triangle), the user can gradually discover the various families of patterns, along with their Conway notation, all of which comprise complete set of plane periodic patterns. The user then has the option of tracing the patterns in the stenciled tiles. This feature serves two functions. First, the user can keep a record of his design and utilize it for decorative or other purposes. Second, the pattern can be colored, creating yet more repeating patterns. Third, students in a classroom setting can analyze and compare their patterns after tracing them.

In another embodiment the male tab and female cutout connectors are replaced with ball and socket connectors respectively that enable rotation about the connection axis and thereby enabling three-dimensional structures. The tiles can also be used by school age children for exploring basic geometry. Children can be challenged to create a multitude of different polygons or patterns by juxtaposing a set of tiles. In addition, the tiles are a tool in teaching the properties of 30°-60°-90° triangle and 45°-45°-90° triangles, which are key elements in the study of trigonometry.

In another embodiment a pentagon, square and equilateral triangle are added to the set of tiles. These additional tile elements similarly are selectively sized, and include male and female ball and socket connectors strategically placed to allow prescribed configurations. The resulting expanded set can be used to construct all 17 symmetry group planar structures, the five Platonic closed solids, 9 of the 13 Archimedean closed solids and a host of other planar three-dimensional solid figures including prisms, and many other constructions limited mainly by the imagination of the user.

In another embodiment an octagon and a decagon are added to the set of tiles of the previous paragraph. These additional tile elements similarly are selectively sized, and include male and female ball and socket connectors strategically placed to allow prescribed configurations. The resulting expanded set can be used to construct all 17 symmetry group planar structures, the five Platonic closed solids, and the 13 Archimedean closed solids. A host of other planar three-dimensional solid figures including prisms, and many other constructions limited mainly by the imagination of the user are also.

The present invention differs from all prior art in the fields of tessellation and stencils in that it combines the tessellating and stenciling capabilities to create any of the 17 possible plane periodic patterns and is a teaching tool for learning about the basic symmetries as well as the plane periodic patterns. Math education experts recommend that students starting in 3rd grade "predict and describe the results of sliding, flipping, and turning two-dimensional shapes" (National Council of Teachers of Mathematics). They can learn to do this by exploring the various juxtapositions of the tiles comprising the invention.

The present invention has an advantage over polygonal tiles with straight edges in that the possible combinations are reduced from infinite to finite by the arrangement of the male and female coupling elements. Thus, the students are guided toward discovering mathematical properties by the way the tiles mate with each other. Because of this guiding structure built into the tiles, less teacher supervision is required with using the present invention compared to using straight-edged polygons. Versions of a set of the tiles allow construction of planar tessellations and serve as building blocks for three dimensional solids

BRIEF DESCRIPTION OF THE DRAWINGS

FIG. 5 is a top view of the plain version of the tiles in FIGS. 4A and 4B.

FIGS. 6A and 6B show a top view of the rectangular tile and its complement with jigsaw puzzle-like connector tabs.

FIGS. 57A and 57B shows ways that the 30-60-90 triangles fit together.

FIG. 60 shows additional ways the 30-60-90 triangles fit together and also can be used to teach the Pythagorean theorem.

FIG. 61B shows additional views to those of FIG. 61A of how the size of the tiles and the selected placement of the coupling elements preclude certain connections between the tiles.

FIGS. 68 A-85 show construction of solid three-dimensional solids using the tiles of FIGS. 45-60.
FIGS. 68A-75 show construction of the Platonic solids and FIG. 68A shows the construction of a small tetrahedron.
FIG. 71 shows the construction of a dodecahedron.
FIGS. 73-85 shows how to use the tiles of FIGS. 45-60 to make the 13 Archimedean solids.

FIG. 73 shows the construction of a truncated tetrahedron.

FIG. 74 shows the construction of a truncated octahedron.
FIG. 75 shows the construction of a large and small cuboctahedron.
FIG. 76 shows the construction of a Rhombicuboctahedron.
FIG. 77 shows the construction of a snub dodecahedron.
FIG. 78 shows the construction of a truncated icosahedron.
FIG. 79 shows the construction of a snub cube.
FIG. 80 shows the construction of an icosidodecahedron.
FIG. 81 shows the construction of a Rhombicosidodecahedron.
FIG. 82 shows the construction of a truncated dodecahedron.
FIG. 83 shows the construction of a truncated cube.
FIG. 84 shows the construction of a rhombicuboctahedron.
FIG. 85 shows the construction of a great rhombicosidodecahedron.

MODES FOR CARRYING OUT THE INVENTION

Figure 1:
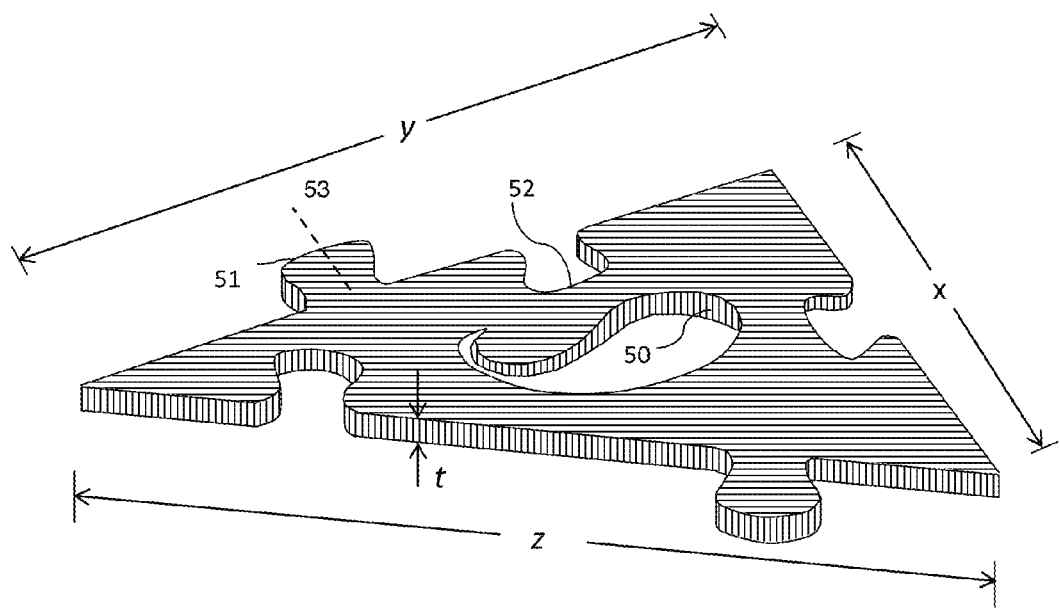
FIG. 1 is a perspective view of a typical first type tile with jigsaw puzzle-like connector tabs.

FIG. 1 is an enlarged left perspective view of a single 30°-60°-90° triangle tile. This particular embodiment has an aperture 50 in the shape of a paisley, but any other asymmetrical shape may be used in place of the paisley. The dimensions obey the relationships $y=\sqrt{3}x$ and $z=2x$. The absolute length of the sides x, y, z and its thickness, t, are made of sufficient size for the tile to be comfortably used as a stencil by children and adults. The coupling elements have a "gender" as shown in the Figure the element 51 is a male element and the element 52 is a female element.

Male elements fit into female elements to form a connection to join the tiles together. The male 51 and female 52 coupling elements can be realized as tongues and recesses, markers, dowel pins and recesses, ball and sockets and other connectors with clearly identifiable male and female elements. In the first preferred embodiment, pictured in FIG. 1, tongues and recesses form the male and female coupling elements, respectively. In a second preferred embodiment that enables three dimensional constructions the connectors are ball and sockets as shown and discussed in conjunction with FIGS. 45-60. The male 51 and female 52 coupling elements are each symmetric about their respective midlines 53. The midline is shown in FIG. 1 for the male coupling element.

The tiles comprising the invention can be made of acrylic, polycarbonate, other plastics, chipboard, cardboard, glass, foam, wood, or other sufficiently rigid materials. Depending on the materials used and the size and thickness of the tiles, a variety of methods can be used to manufacture the tiles, such as cutting by water jet or laser, stamping with a die or injection molding.

Figure 2A:
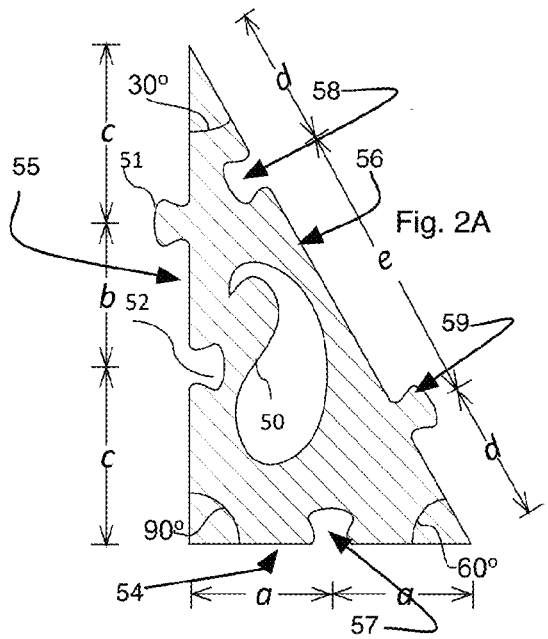
FIG. 2A is a top view of the tile in FIG. 1.
Figure 2B:
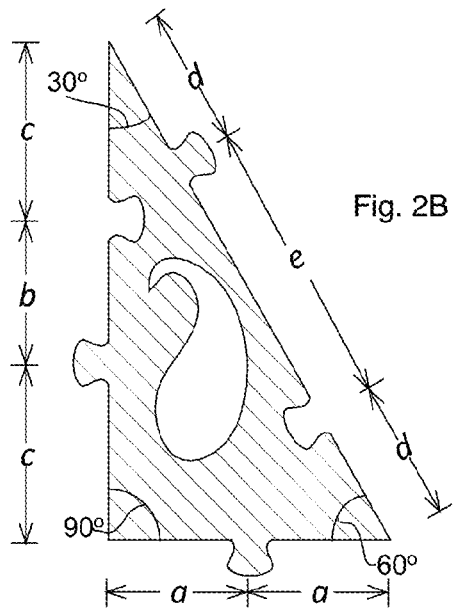
FIG. 2B is a top view tile complementary to the tile in FIG. 2A.

FIG. 2A is a top view of the tile in FIG. 1, and FIG. 2B is its complement. The complement of a tile is an identical tile except that the male and female coupling elements have been interchanged. The dimensions in this embodiment of the invention are as follows. $a=b=d=x/2$ and $e=x$ where x was defined in FIG. 1. c is determined by the fact that $2c+b=y$. So $c=(y-b)/2$. The first tile is a substantially planar 30°-60°-90° triangle having a first edge or leg of the triangle 54 with linear dimension x or 2*a, a second edge or other leg 55 with a dimension $\sqrt{3}x$ and having a third edge 56 that is the hypotenuse of the triangle having a dimension 2*x. The tile includes male and female coupling elements located as follows. There is a first coupling element located at the center of the first edge 54. The center of the coupling element is a distance "a" from the vertices at each end of the first edge where a=x/2. There are two coupling elements 51, 52, one male 51 and the second female 52 in the second edge 55. The centers of the coupling elements are a distance "c" from the vertices at each end of the edge 55 and have a space of dimension "b" or x/2 between them. The distances can be seen to satisfy the equations:

$$2c+b=y=\sqrt{3}x=\sqrt{3}(2a) \quad [1]$$

$$c=(\sqrt{3}/2-1/4)x \quad [2]$$

$$d=x/2 \quad [3]$$

There are two coupling elements 58, 59, one female 58 and one male 59 located in the third edge 56 or hypotenuse of the triangle. The center of each coupling element is a distance "d" from the vertices at each end of the edge 56. The distances a, b and d are all equal. The distance e between the coupling elements 58, 59 is equal to the length of the first edge x.

FIG. 2B shows the complement piece to that shown in FIG. 2A. All the dimensions are the same the difference is that all of the coupling elements are replaced with one of the opposite gender.

Figure 3A:
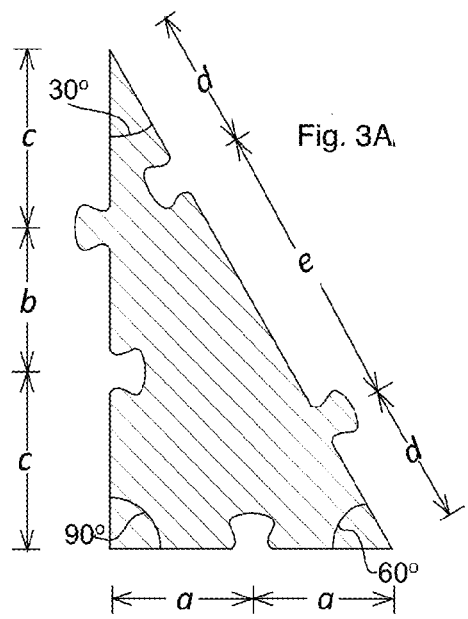
FIG. 3A is a top view of the plain version of the tile in FIG. 2A.
Figure 3B:
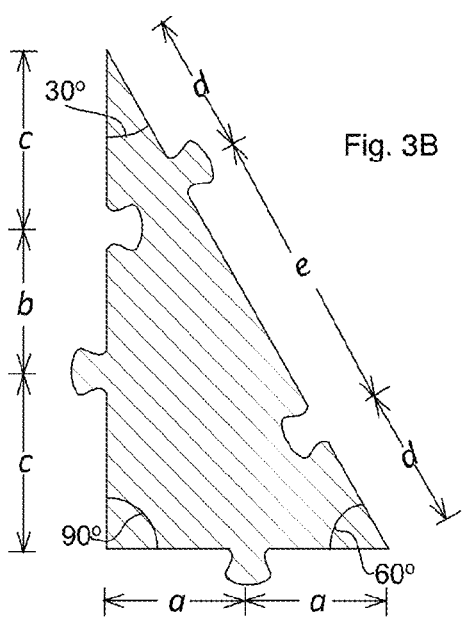
FIG. 3B is a top view of the plain version of the tile in FIG. 2B.

FIGS. 3A and 3B depict the plain version of the tiles in FIGS. 2A and 2B, respectively. "Plain" means that there is no asymmetric pattern or cutout 50 in the tile.

To summarize a first embodiment includes a 30-60-90 triangle shaped tile having a first edge 54 of length x, a second edge 55 of length $\sqrt{3}$x and a third edge 56 of length 2x. The edges join at three vertices (not labeled). There is a first coupling element 57 in the first edge with its center point located at the center of the edge. There is a second coupling element 52 having the same "gender" as the first coupling element and located a distance c=($\sqrt{3}$/2−1/4)x from the vertex that joins the first edge and the second edge. There is a third coupling element 51 having a gender opposite that of the gender of the first and second coupling elements and whose center is located at a distance c=($\sqrt{3}$/2−1/4)x from the vertex that joins the second edge and the third edge. There is a fourth coupling element 58 having the same gender as the first and second coupling elements and whose center is located a distance x/2 from the vertex that joins the second and third edges. There is a fifth coupling element 59 of the same gender as that of the third coupling element whose center is located a distance a distance x/2 from the vertex that joins the third and first edges. All of the coupling elements are symmetrical about their centers as was shown in FIG. 1. The size of the edges and gender and location of the coupling elements results in a restricted number of ways the tiles may be fit together. In one embodiment the first coupling element is a female coupling element and in a second embodiment, identified here as the complement of the first embodiment the first coupling element is a male coupling element. In one embodiment the faces of the tiles are plain and in another embodiment the faces of the tiles include an asymmetrical marking 50. In yet another embodiment the asymmetrical markings are stencils that are cut through the faces of the tiles.

Figure 4A:
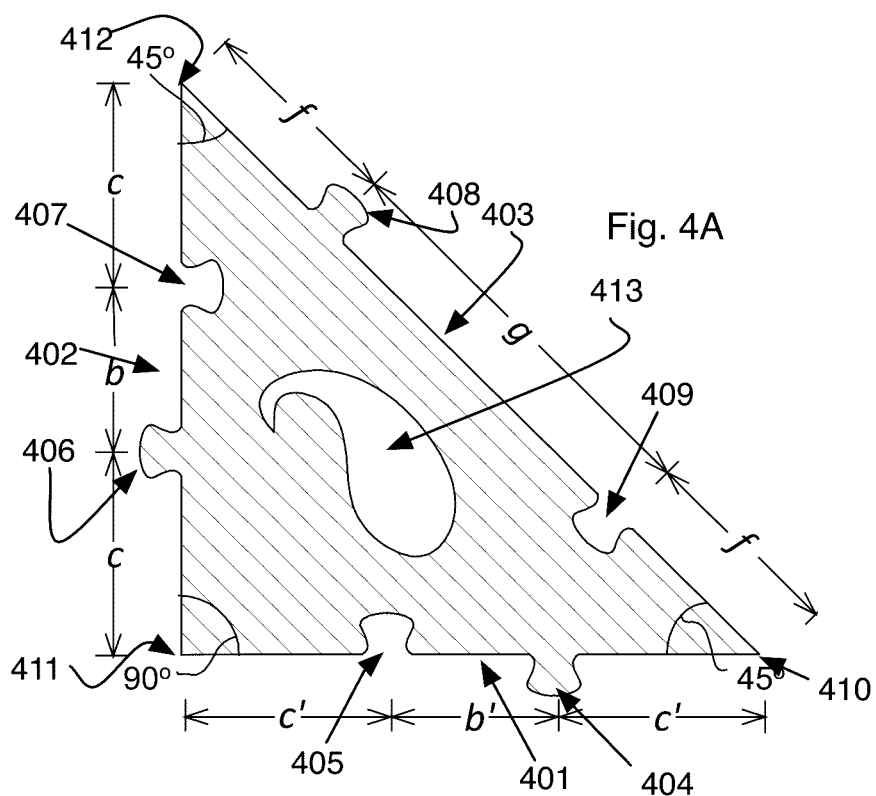
FIGS. 4A and 4B show a top view of the right isosceles triangle tile and its complement with jigsaw puzzle-like connector tabs.
Figure 4B:
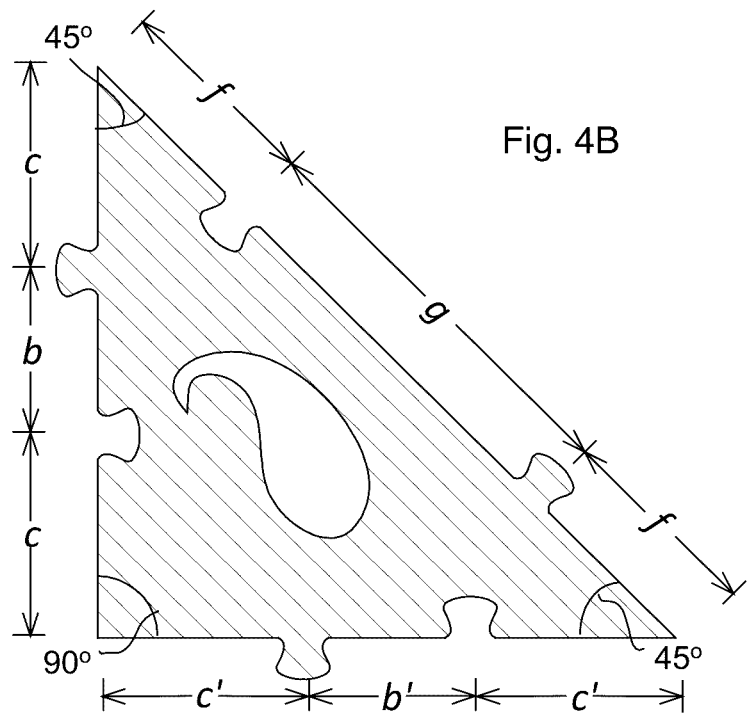

FIGS. 4A and 4B depict the right isosceles triangle tile and its complement. 2c+b=2c+b=y, where y was defined in FIG. 1. That is the length of the edges are equal to the length of the second edge in the 30°-60°-90° triangle as described in FIGS. 1 and 2 and therefore the length of the legs of the right isosceles triangles are equal to $\sqrt{3}$x=$\sqrt{3}$(2a) where x is the length of the first edge of the 30°-60°-90° triangle member of the set described in FIGS. 1-2. In the preferred embodiment, b'=b, c'=c and g=2f. b and c are the same dimensions as in FIGS. 1-3. Given that the tiles in question are shaped like right isosceles triangles, the length of the hypotenuse must be $\sqrt{2}$ times the length of either side or $\sqrt{6}$x. This translates into the equation 2f+g=$\sqrt{(2c'+b')}$=$\sqrt{2}$y. Together with g=2f, this gives f=$\sqrt{2}$y/4 and g=$\sqrt{2}$y/2. Substituting y=$\sqrt{3}$x, implies f=$\sqrt{6}$x/4 Referring to FIG. 4A a second embodiment includes a tile shaped as an isosceles right triangle with a first leg or first side 401 having a length equal to $\sqrt{3}$x and a second leg 402 having a length $\sqrt{3}$x. There is a first coupling element 404 on the first edge whose center is located at a distance c' from the vertex 410 between the first edge 401 and the third edge 403 or hypotenuse of the triangle where c' is c=($\sqrt{3}$/2−1/4)x and a second coupling element 405 on the first edge 401 where the center of the second coupling element is located a distance c'=($\sqrt{3}$/2−1/4)x from the vertex 411 between the first edge 401 and the second edge or second leg 402 of the triangle. The second coupling element 405 has a gender that is opposite of that of the first coupling element 404. As shown in the Figure the first coupling element 404 is a male coupling element and the second 405 is a female coupling element. There are a third coupling element 406 and a fourth coupling element 407 located on the second edge 402. The third coupling element has the same gender as the first coupling element and the fourth coupling element has the same gender as the second coupling element. The center of the third coupling element 406 is located a distance c=($\sqrt{3}$/2−1/4)x from the vertex 411 between the first edge 401 and the second edge 402. The center of the fourth coupling element 406 is located a distance c=($\sqrt{3}$/2−1/4)x from the vertex 412 between the second edge 402 and the third edge 403. There are a fifth coupling element 408 and a sixth coupling element 409 located on the third edge 403. The fifth coupling element has the same gender as the first and third coupling elements and the sixth coupling element has the same gender as the second and fourth coupling elements. The center of the fifth coupling element 408 is located a distance f=$\sqrt{6}$x/4 from the vertex 412 between the second edge 402 and the third edge 403. The center of the sixth coupling element 409 is located a distance f=$\sqrt{6}$x/4 from the vertex 410 between the third edge 403 and the first edge 401. The tile further includes and asymmetric pattern located on the face of the tile. In the case shown the asymmetric pattern is a stencil hole through the tile.

Another embodiment shown in FIG. 4B is the complementary tile to that shown and described in FIG. 4A. The tiles are identical except that the genders of the coupling elements are all swapped. In FIG. 4A the first, third and fifth coupling elements are male and the second, fourth and sixth coupling elements are female. In FIG. 4B the first, third and fifth coupling elements are all female and the second, fourth and sixth coupling elements are now all male. Note that this complementary nature of the tiles in FIGS. 4A and 4B requires the presence of the asymmetric pattern 413. Otherwise the coupling elements could be swapped simply by flipping the tile to its other side.

FIG. 5 depicts the plain version of both of the tiles in FIGS. 4A and 4B. As pointed out, the tile of FIG. 5 has no complement since the tile does not include an asymmetric pattern.

FIGS. 6A and 6B is a top view of a rectangular tile embodiment and its complement. In a first embodiment, b"=b, c"=c, j=b, and h=j/2, with b and c defined in FIGS. 2A and 2B. Referring to FIG. 6A, the first embodiment of the rectangular tile includes a rectangular shaped tile having a first edge. The first edge includes two coupling elements 605, 606. The first coupling element 605 has its center located a distance h from the corner or vertex 613 between the first edge 601 and the fourth edge 604. The first edge further includes a second coupling element 606 whose gender is the opposite of that of the first coupling element and in the Figure shown the first coupling element is female and the second coupling element 606 is male. The center of the second coupling element is located a distance h from the corner 614 that joins the first edge 601 and the second edge 602.

In a preferred embodiment the ratio of the lengths of the long edges 602, 604 to that of the short edges 601, 603 is the golden ratio or $(1+\sqrt{5})/2$ and the length of the long edge 602 is selected to mate with the longer leg of the 30-60-90 triangles discussed above. The long edge 602 includes a third coupling element 607. The location and gender of the coupling elements on the long edges 607, 608, 611, 612 are chosen such that the long edge can mate with the hypotenuse of the 30-60-90 triangular tile discussed above. The connector 607 is located a distance c" from the corner 614. The second edge 602 further includes a fourth coupling element 608 whose center is located a distance c" from the corner 615. The gender of the first and third coupling elements are the same and in the Figure are female and the gender of the second and fourth coupling elements are the same, opposite the gender of the first and third coupling elements and in FIG. 6A, male. The third edge 603 of the rectangular tile includes a fifth 609 and sixth 610 coupling element where the location along the edge is the same as the first and second coupling elements. and includes two coupling elements 611, 612. The location of these seventh 611 and eight 612 coupling elements is the same as that in those 607, 608 on the second edge. The seventh coupling element is a distance $c''=(\sqrt{3}/2-1/4)x$ from the corner 616 and the eight coupling element is a distance $c''=(\sqrt{3}/2-1/4)x$ from the corner 613. The gender of the first, third, fifth and seventh coupling elements are all the same and in the case shown, female. The gender of the second, fourth, sixth and eight coupling elements are all the same, opposite the gender of the first, third, fifth and seventh coupling elements and in the case shown, male. The tile shown in FIG. 6B is the complement of that shown in FIG. 6A. The genders of the coupling elements are swapped and otherwise the tiles are identical. Note again that without the asymmetric stencil 617 the tiles do not have a complement as the tiles in FIGS. 6A and 6B would be identical just one is flipped over.

Figure 7:
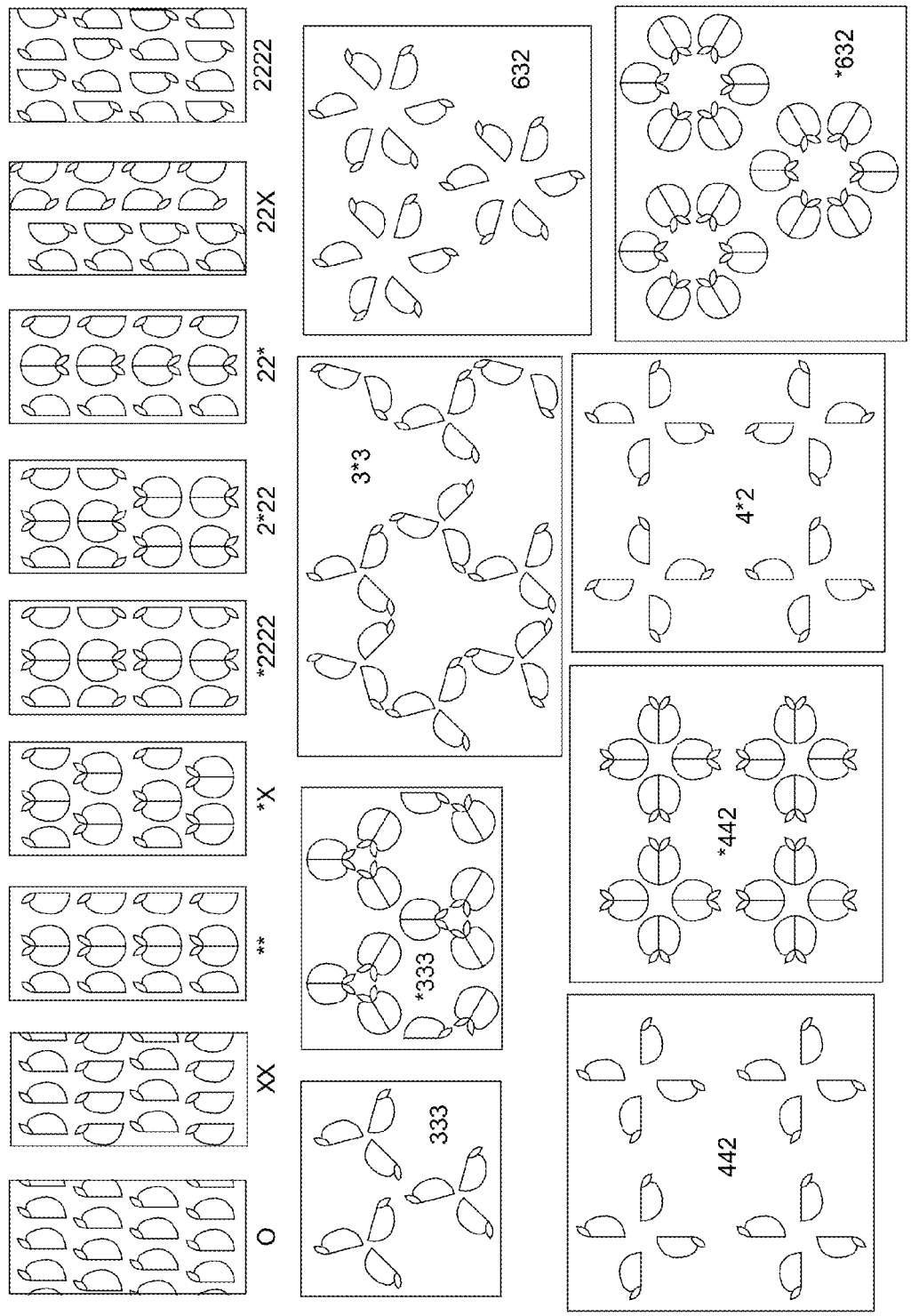
FIG. 7 is a prior art list of the 17 plane periodic patterns along with their labels in the Conway notation.

It is known in the art that for plane periodic tiling there are 17 symmetry classes. FIG. 7 depicts of all the 17 planar periodic patterns based on a motif of a half-apple as the basic unit of repetition. Note that the half-apples are asymmetric. That is the "leaf" on the top of the half-apple results in the ability to demonstrate all 17 of the patterns. Without this asymmetry all 17 patterns cannot be shown. In the instant case of using the tiles described in FIGS. 1-6 to define the plane periodic patterns it is the asymmetry provided by the stencils that allows construction of all 17 plane periodic patterns. The Conway notation is used to label each pattern. The Conway notation defines which symmetry operations are possible for the particular pattern that results in the pattern appearing unchanged. FIGS. 37A, 37B, 37C, and 37D, along with their detailed description, show how the tiles can be used to teach the basic 4 symmetry operations of translation, gyration, reflection, and glide reflection.

Embodiments of the present invention include sets of the tiles described in FIGS. 1-6 that enable construction of particular symmetry patterns.

1. One embodiment includes a set of plane-filling, double-sided tiles capable of forming all 17 plane periodic patterns, said set comprising
   a. at least six identical tiles of a first type, having a planar right triangular shape having two faces and three edges and having angles of 30°, 60°, and 90° between the edges, and having a first male coupling element along the edge that is the shorter leg of the triangle, a second male coupling element along the edge that is the longer leg of the triangle, a third female coupling element along the edge that is the longer leg of the triangle a fourth male coupling element along the edge that is the hypotenuse of the triangle and a fifth female coupling element along the edge that is the hypotenuse of the triangle all said coupling elements having a centerline and all said coupling elements having a location of the centerlines along the edges, and,
   b. at least six identical tiles of a second type, having a planar right triangular shape having two faces and three edges and having angles of 30°, 60°, and 90° between the edges, and having a first female coupling element along the edge that is the shorter leg, a second female coupling element along the edge that is the longer leg of the triangle, a third male coupling element along the edge that is the longer leg a fourth female coupling element along the edge that is the hypotenuse of the triangle and a fifth male coupling element along the edge that is the hypotenuse of the triangle, all said coupling elements having a centerline and all said coupling elements having a location of the centerlines along the edges, and, the locations of the first second, third, fourth and fifth coupling elements along the edges being the same as the locations of the first, second, third, fourth and fifth coupling elements of the tiles of the first type along their edges, and,
   c. at least six identical tiles of a third type said tiles being identical to the tiles of the first type but further including an asymmetric pattern on each side of each tile said asymmetric patterns being the same on both sides and on all tiles and the patterns having a location and an orientation on the faces of the tiles said locations and orientations being the same on all faces and all tiles,
   d. at least six identical tiles of a fourth type said tiles being identical to the tiles of the second type but further including an asymmetric pattern on each side of each tile said asymmetric patterns being the same on both sides and on all tiles the same as the asymmetric patterns on the tiles of the third type and the patterns having a location and an orientation on the faces of the tiles said locations and orientations being the same on all faces and all tiles, and, said locations and orientations being the same as the locations and orientations of the asymmetric patterns on the tiles of the third type, and,
   e. the size and location of the coupling elements on the tiles of the first, second, third and fourth types provide for mutual interlocking of the tiles such that the tiles may be interlocked only with long edges adjoined to one another, short edges adjoined to one another and hypotenuses adjoined to one another,
   f. and wherein tiles of the first, second, third and fourth type may be selected and joined to form patterns displaying the symmetry of the plane periodic patterns identified in Conway notation as O, 2222, 22X, XX, **, *X, *2222, 2*22, 22*, 333, 632, *333, 3*3 and *632, and g. at least four identical tiles of a fifth type having a planar right triangular shape with two faces and three edges and having angles of 45°, 45°, and 90° between the edges and having a first, female, coupling element along a first edge that is a first leg of the triangle and a second, male, coupling element along the first edge and a third, female, coupling element along the edge that is the second leg of the triangle and a fourth, male, coupling element along the second edge and fifth, female, coupling element along the edge that is the hypotenuse of the triangle and a sixth, male, coupling element along the hypotenuse each of the coupling elements having a centerline and a location along the edge that is defined by the locations of the centerlines h. at least four identical tiles of a sixth type said tiles being identical to the tiles of the fifth type but further including an asymmetric pattern on each side of each tile said asymmetric patterns being the same on both sides and on all tiles and is the same as the asymmetric patterns on the tiles of the third type and the patterns having a location and an orientation on the faces of the tiles said locations and orientations being the same on all faces and all tiles, and, i. at least four identical tiles of a seventh type said tiles being identical to the tiles of the sixth type except that the first third and fifth coupling elements are male coupling elements and the second, fourth and sixth coupling elements are female coupling elements, j. the size and location of the coupling elements on the tiles of the fifth, sixth and seventh types provide for mutual interlocking of the tiles such that the tiles may be interlocked only with hypotenuses adjoined to one another and legs joined to one another, k. and wherein tiles of the fifth, sixth and seventh types may be selected and joined to form patterns displaying the symmetry of the plane periodic patterns identified in Conway notation as O, 2222, 22X, XX, **, *X, *2222, 2*22, 22*, 442, *442 and 4*2, l. wherein all of the coupling elements are of a ball and socket type such that when edges of the tiles are joined, the joined tiles may be rotated may be rotated relative to one another in a direction perpendicular to the joined edge.

Another embodiment includes a set of tiles includes a set of seven different planar tiles comprising:

1. At least six identical 30°-60°-90° triangular tiles, each having a first edge of linear dimension "x" and a second edge of dimension $\sqrt{3}*x$ and a third edge that is the hypotenuse, of dimension $2*x$. Vertices are at the ends of each edge. The triangle includes:
   a. a first coupling elements having a midpoint and whose midpoint is located at the midpoint of the first edge,
   b. second and third coupling elements each having a midpoint located on the second edge and whose midpoints are located a distance x/2 apart and equidistant from the vertices at each end of the second edge, wherein the second coupling element is located nearer the first edge than the third coupling element,
   c. fourth and fifth coupling elements each having a midpoint and located on the third edge and whose midpoints are located a distance x/2 from the vertices at either end of the third edge and the fourth coupling element is located nearer the vertex adjoining the second edge and the fifth coupling element is nearer the vertex adjoining the first edge,
   d. where each of the coupling connectors are symmetric about their midpoint and the first, second and fourth coupling elements are female coupling elements and the third, and fifth coupling elements are male coupling elements wherein the male and female coupling elements are sized and shaped to removably join with coupling elements of the opposite gender, 2. At least six identical 30°-60°-90° triangular tiles that are complements of the tiles listed in item 1 where complements means that the tiles are essentially identical except that each of the coupling elements is of the opposite gender as that listed in item 1. Therefore the first, second and fourth coupling elements are male coupling elements and the third, and fifth coupling elements are female coupling elements.

3. At least six identical 30°-60°-90° triangular tiles the same as those tiles listed in item 1 but further including an asymmetric design on at least one face of the tile.

4. At least six identical 30°-60°-90° triangular tiles the same as those tiles listed in item 2 but further including an asymmetric design on at least one face of the tile.

5. At least four identical isosceles right triangular tiles, each having a first edge of linear dimension $\sqrt{3}x$ and a second edge of dimension $\sqrt{3}x$ and a third edge, that is the hypotenuse, of dimension $\sqrt{6}x$. Vertices are at the ends of each edge. The triangle includes:
   a. first and second coupling elements each having a midpoint and located on the first edge and whose midpoints are located a distance x/2 apart and equidistant from the vertices at each end of the first edge, wherein the first coupling element is located nearer vertex between the first and third edge than the second coupling element,
   b. third and fourth coupling elements each having a midpoint located on the second edge and whose midpoints are located a distance x/2 apart and equidistant from the vertices at each end of the second edge, wherein the third coupling element is located nearer the vertex between first edge and the second edge than the fourth coupling element,
   c. fifth and sixth coupling elements each having a midpoint and located on the third edge and whose midpoints are located a distance $\sqrt{6}*x/4$ from the vertices at either end of the third edge and the fifth coupling element is located nearer the vertex adjoining the second edge and the third edge,
   d. where each of the coupling connectors are symmetric about their midpoint and the first, third and fifth coupling elements are female coupling elements and the second, fourth and sixth coupling elements are male coupling elements wherein the male and female coupling elements are sized and shaped to removably join with coupling elements of the opposite gender.

6. At least four identical isosceles right triangular tiles as described in item 5 with the addition of an asymmetric design on at least one face of the tile.

7. At least four identical isosceles right triangular tiles that are complements of the tiles listed in item 6 where complements means that the tiles are essentially identical except that each of the coupling elements is of the opposite gender as that listed in item 6. Therefore the first, third and fifth coupling elements are male coupling elements and the second, fourth and sixth coupling elements are female coupling elements.

A second embodiment includes the seven tiles of the set as described above and in addition includes two rectangular tiles as described as tiles 8 and 9:

8. A plurality of identical rectangular shaped tiles having a width of x and a height equal to √3x, the tiles including:
   a. a first edge on one end of the rectangle with length equal to x and proceeding clockwise around the tile a second edge with length equal to √3x a third edge opposite the first edge with length equal to x and a fourth edge opposite the second edge with length equal to √3x,
   b. first and second coupling elements each having a midpoint and located on the first edge and whose midpoints are located a distance x/2 apart and equidistant from the corners at each end of the first edge, wherein the first coupling element is located nearer vertex between the first and fourth edge than the second coupling element,
   c. third and fourth coupling elements each having a midpoint located on the second edge and whose midpoints are located a distance x/2 apart and equidistant from the vertices at each end of the second edge, wherein the third coupling element is located nearer the vertex between first edge and the second edge than the fourth coupling element,
   d. fifth and sixth coupling elements each having a midpoint and located on the third edge and whose midpoints are located a distance x/2 apart and equidistant from the vertices at each end of the third edge, wherein the fifth coupling element is located nearer the corner between second edge and the third edge than the sixth coupling element,
   e. seventh and eighth coupling elements each having a midpoint located on the fourth edge and whose midpoints are located a distance x/2 apart and equidistant from the corners at each end of the fourth edge, wherein the seventh coupling element is located nearer the corner between third edge and the fourth edge than the eighth coupling element,
   f. where each of the coupling connectors are symmetric about their midpoint and the first, third, fifth and seventh coupling elements are female coupling elements and the second, fourth, sixth and eighth coupling elements are male coupling elements wherein the male and female coupling elements are sized and shaped to removably join with coupling elements of the opposite gender,
   g. and an asymmetric design on at least one face of each of the plurality of tiles, the asymmetric design being the same on all of the plurality of rectangular tiles.
9. A plurality of identical rectangular tiles are complements of the tiles listed in item 8 where complements means that the tiles are essentially identical except that each of the coupling elements is of the opposite gender as that listed in item 8. Therefore the first, third, fifth and seventh coupling elements are male coupling elements and the second, fourth, sixth and eighth coupling elements are female coupling elements.

The dimensions of all of the tiles are all scaled to the same factor, x, the length of the shorter leg of the 30-60-90 triangle. The locations of the coupling elements are all also scaled to the same unit length x. the actual dimension of x is selected for ease of handling of the tiles. The dimension may range anywhere from inches to feet depending upon the intended use to be a table top teaching tool to being a playground or field sized teaching tool.

The first embodiment of the set of tiles described above may be used to construct all 17 plane periodic patterns. This is demonstrated in FIGS. 8-24.

Figure 8:
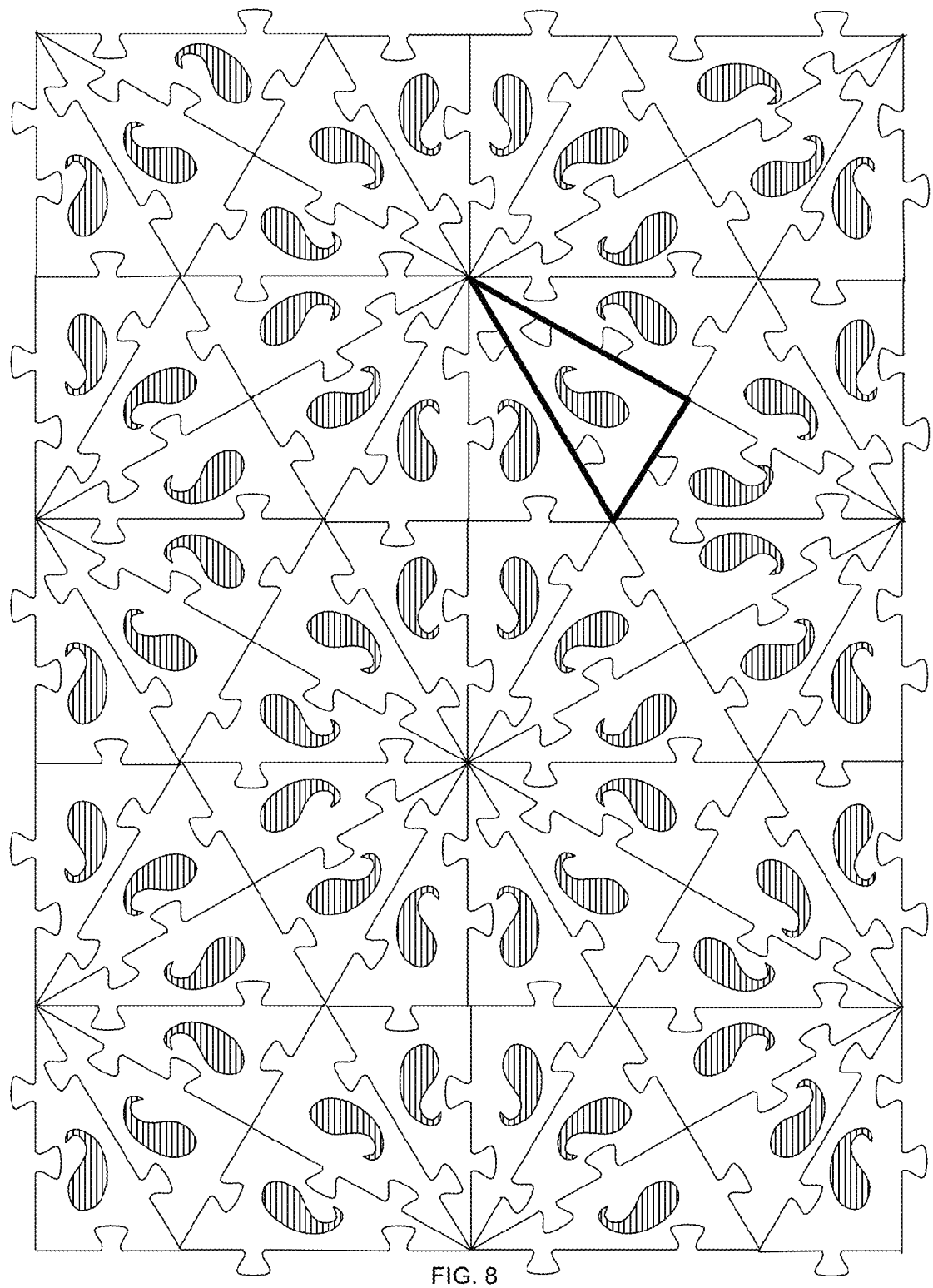
FIG. 8 is a top view of the *632 pattern using the tiles of FIGS. 1-6. The fundamental domain is outlined in bold.

FIG. 8 is a top view of the pattern denoted as *632 in the Conway notation. The inside of the paisley shape will be shown hatched for clarity. The pattern is assembled using the tiles in FIGS. 2A and 2B. The fundamental domain of the pattern is shown in bold.

If we disregard the male and female coupling elements of the tiles, the fundamental domain of this pattern corresponds exactly to a single tile.

Figure 9:
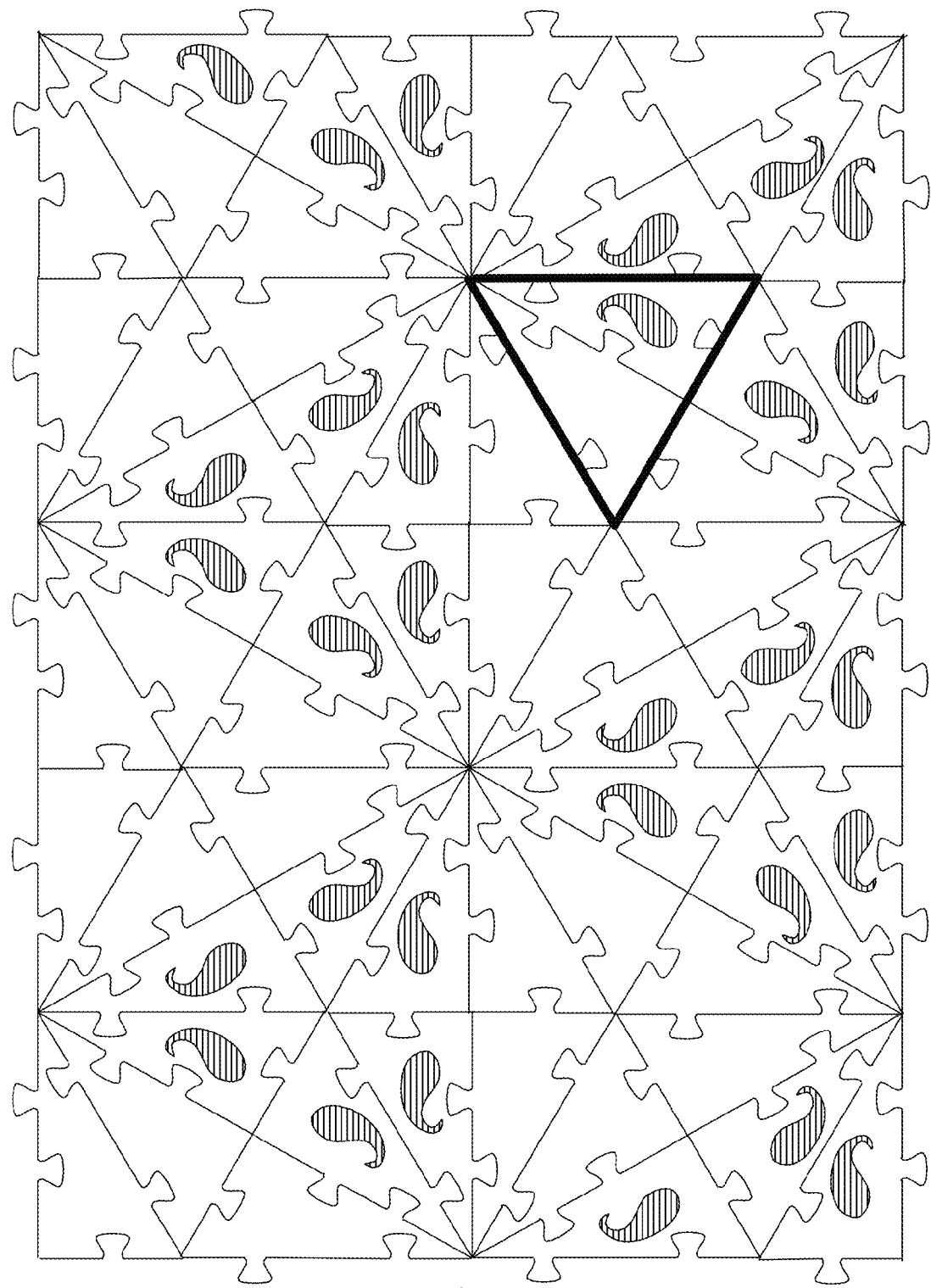
FIG. 9 is a top view of the *333 pattern using the tiles of FIGS. 1-6. The fundamental domain is outlined in bold.

FIG. 9 is a top view of the pattern denoted as *333 in the Conway notation. It is assembled using the tiles in FIGS. 2A, 2B, 3A, and 3B. The fundamental domain consists of the two tiles as shown in bold. Note that the stencils are needed to define the symmetry class. Without the stencils the patterns of FIGS. 8 and 9 would be identical. The set of tiles, including tiles both with and without the stencils allows, by proper selection and alignment, construction of *632 pattern of FIG. 8 and the *333 pattern of FIG. 9. The size of the tiles, placement of the connectors and use of the asymmetric patterns on a portion of the tiles enables a unique tile set with which the entire set of 17 plane periodic patterns may be constructed.

Figure 10:
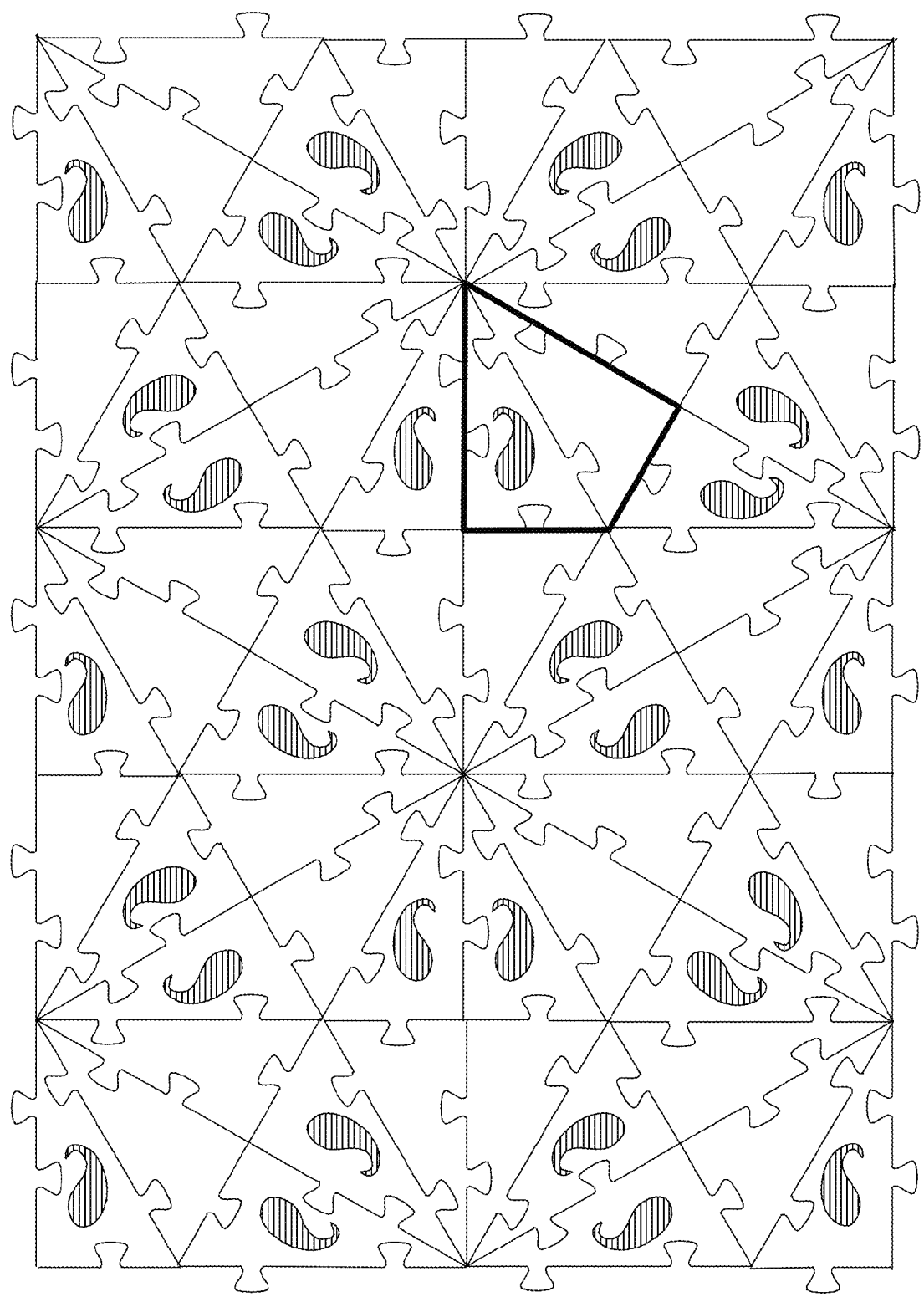
FIG. 10 is a top view of the 3*3 pattern using the tiles of FIGS. 1-6. A fundamental domain is outlined in bold.

FIG. 10 is a top view of the pattern denoted as 3*3 in the Conway notation. It is also assembled using the tiles in FIGS. 2A, 2B, 3A, and 3B. This pattern has more than one fundamental domain. The bold outline shows one of these fundamental domains.

Figure 11:
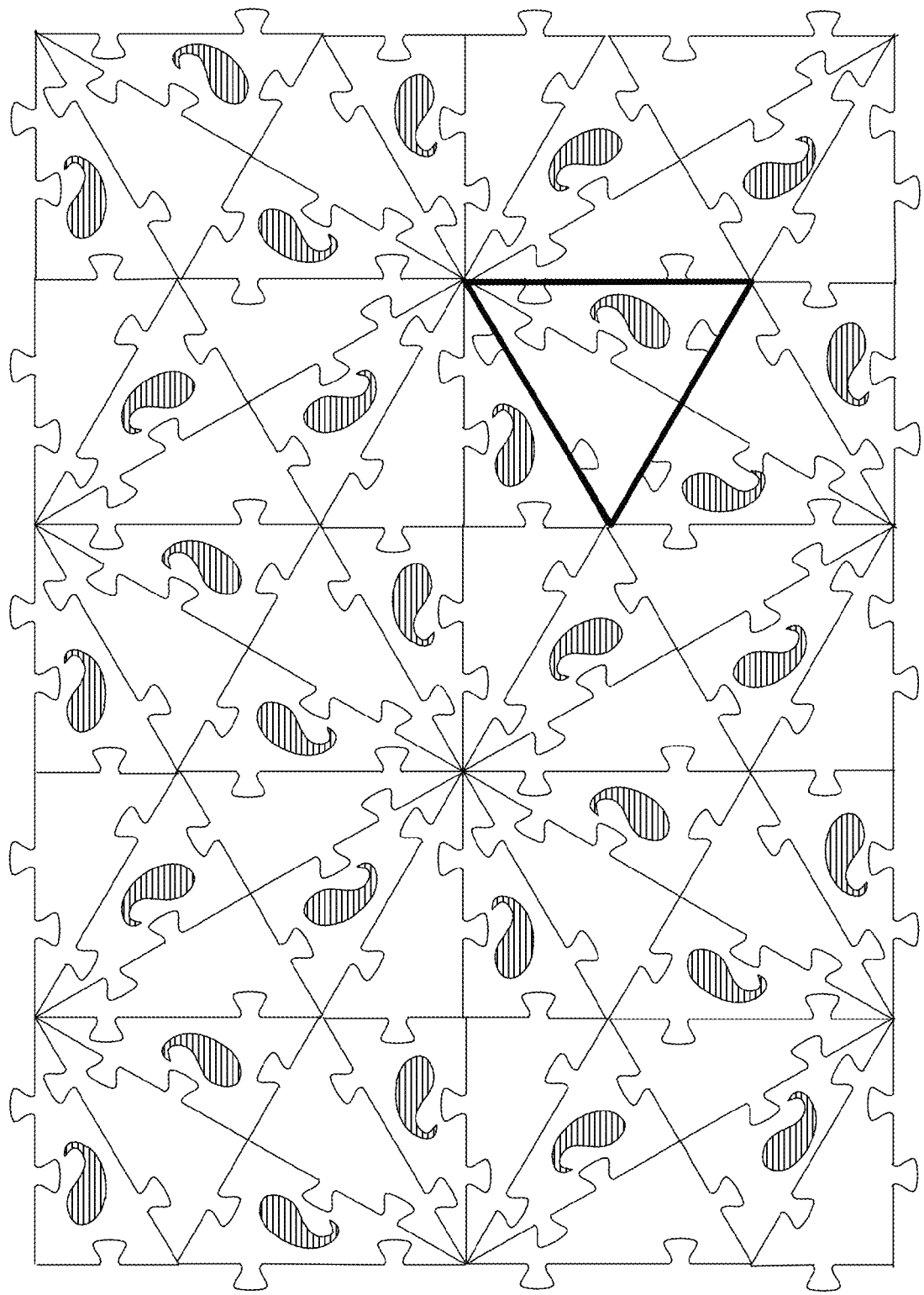
FIG. 11 is a top view of the 632 pattern. A fundamental domain is outlined in bold.

FIG. 11 is a top view of the pattern denoted as 632 in the Conway notation. It is assembled using the tiles in FIGS. 2A, 2B, 3A, and 3B. A fundamental domain is shown in bold.

Figure 12:
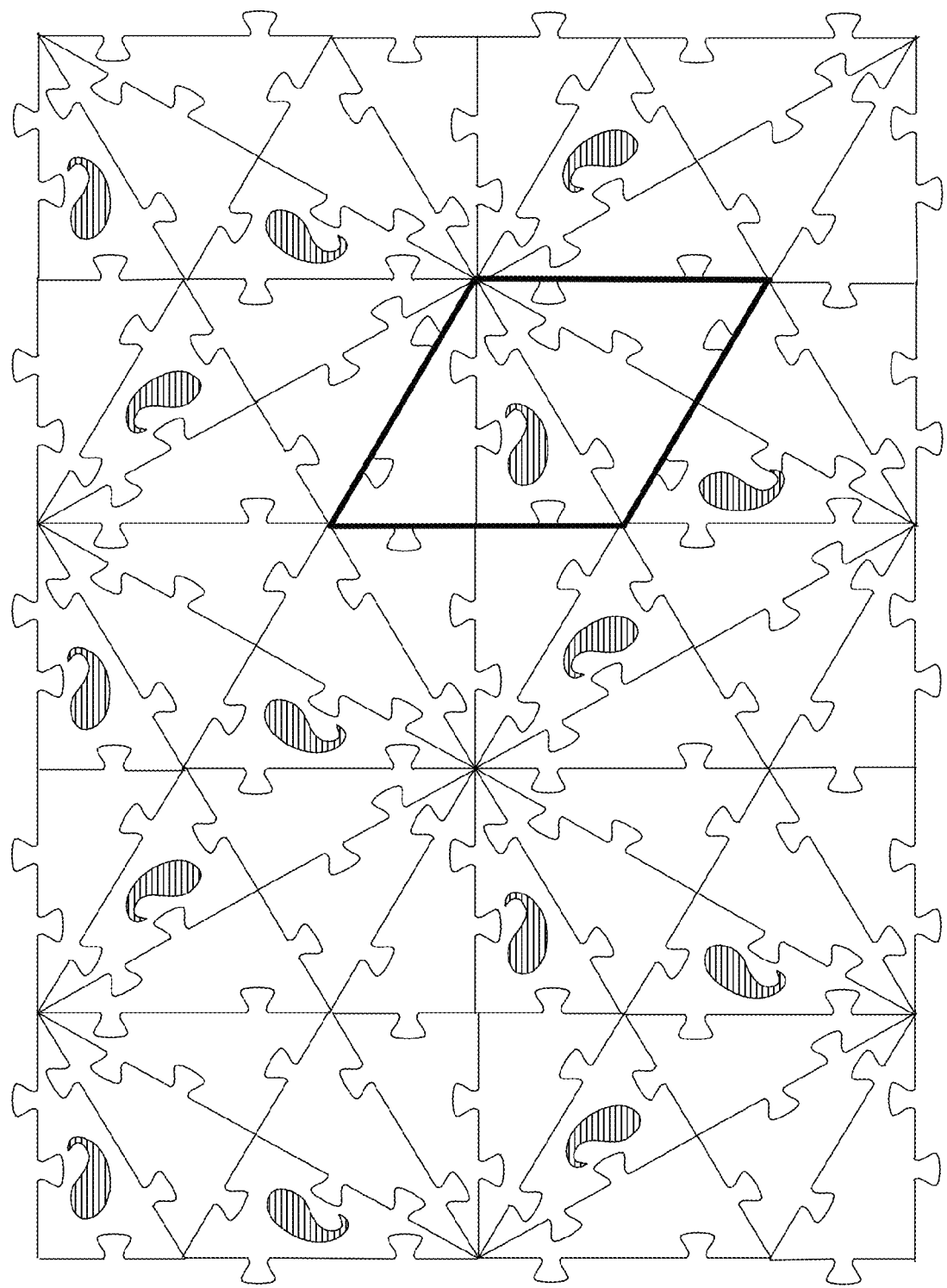
FIG. 12 is a top view of the 333 pattern. A fundamental domain is outlined in bold.

FIG. 12 is a top view of the pattern denoted as 333 in the Conway notation. It is assembled using the tiles in FIGS. 2A, 2B, 3A, and 3B. A fundamental domain is shown in bold.

Figure 13:
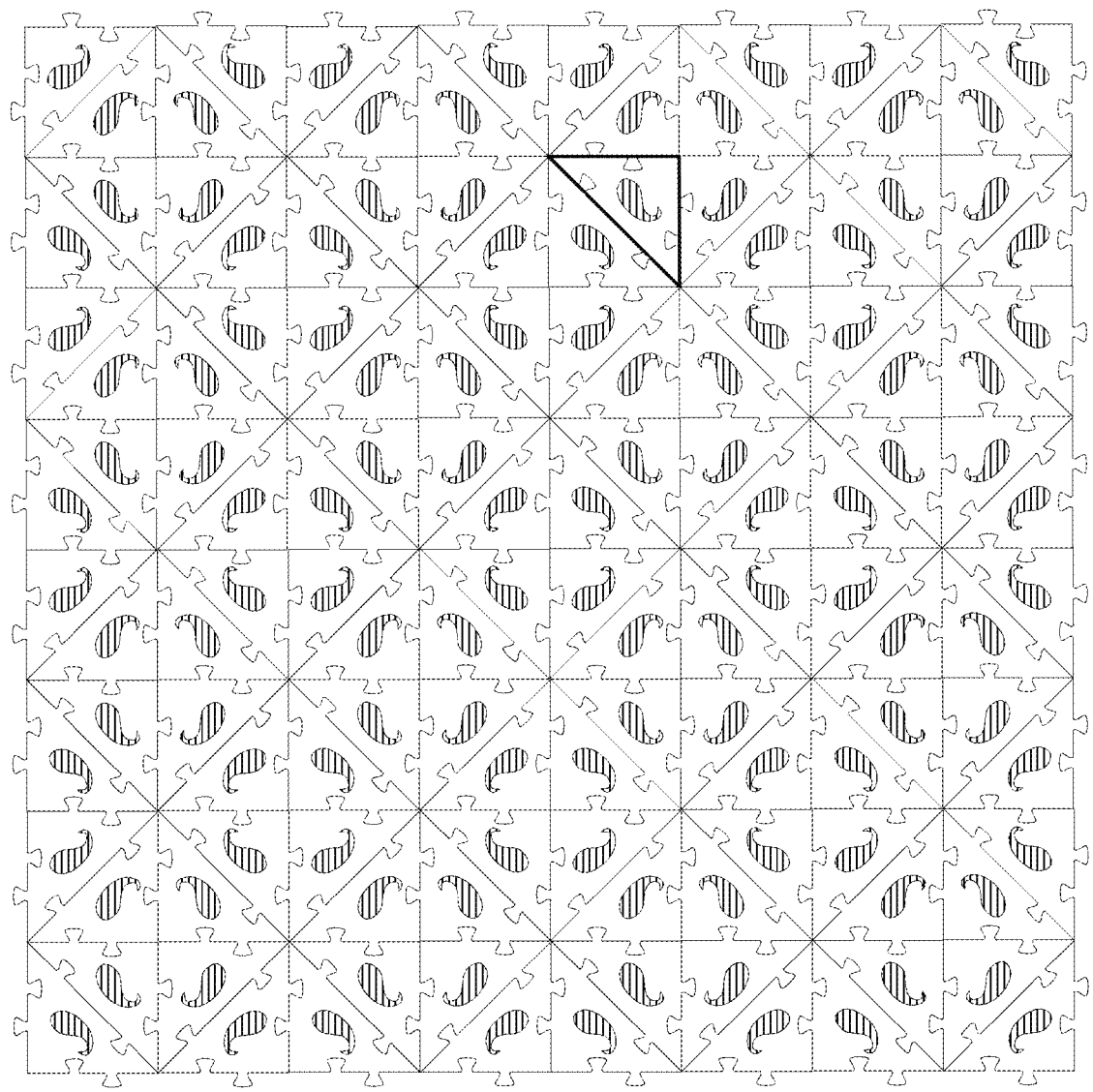
FIG. 13 is a top view of the *442 pattern. The fundamental domain is outlined in bold.

FIG. 13 is a top view of the pattern denoted as *442 in the Conway notation. It is assembled using the tiles in FIGS. 4A and 4B. The only fundamental domain is shown in bold. *442 the second of the two "parent" patterns. It can be used to construct the patterns *2222, 2*2, 4*2, and 442. This is accomplished by systematically replacing groups of tiles with identically shaped plain tiles.

Figure 14:
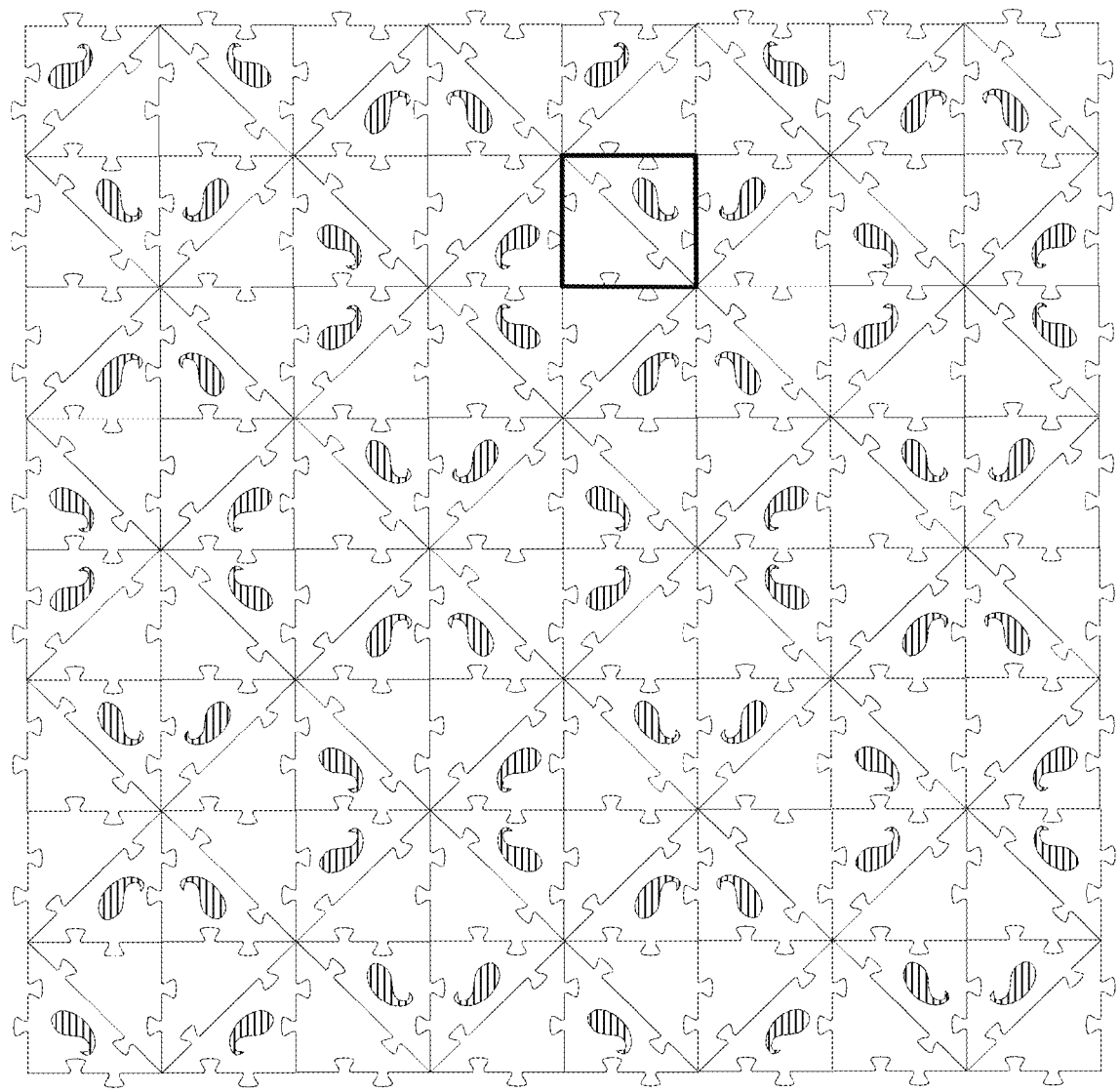
FIG. 14 is a top view of the 4*2 pattern. A fundamental domain is outlined in bold.

FIG. 14 is a top view of the pattern denoted as 4*2 in the Conway notation. It is assembled using the tiles in FIGS. 4A, 4B, and 5. A fundamental domain is shown in bold.

Figure 15:
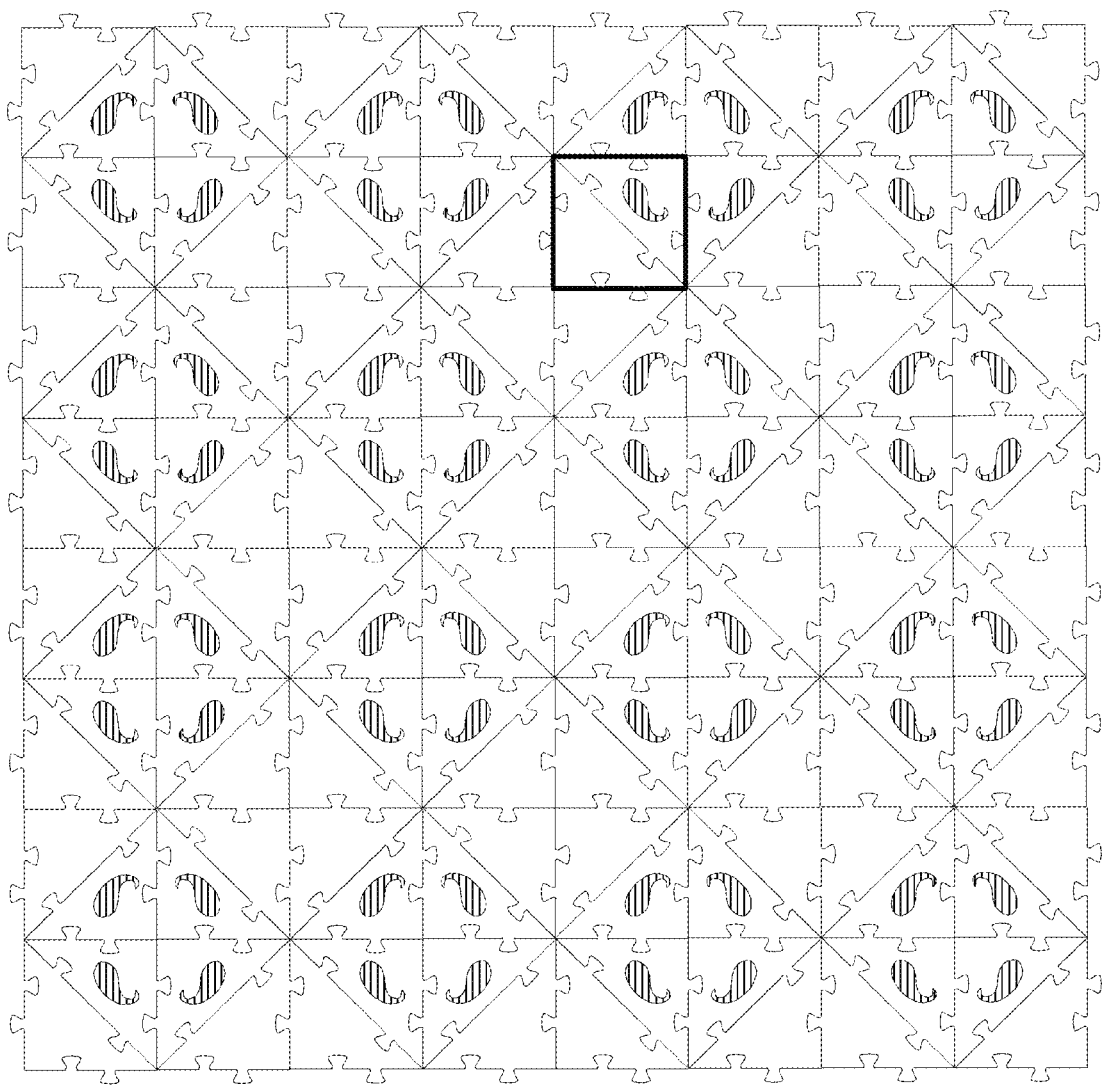
FIG. 15 is a top view of the *2222 pattern. The fundamental domain is outlined in bold.

FIG. 15 is a top view of the pattern denoted as *2222 in the Conway notation. It is assembled using the tiles in FIGS. 4A, 4B, and 5. The fundamental domain is shown in bold. The rest of the patterns, 2222, 22*, 22X, **, *X, XX, O can be derived from *2222 by replacing some of the patterned tiles with identically shaped plain tiles.

Figure 16:
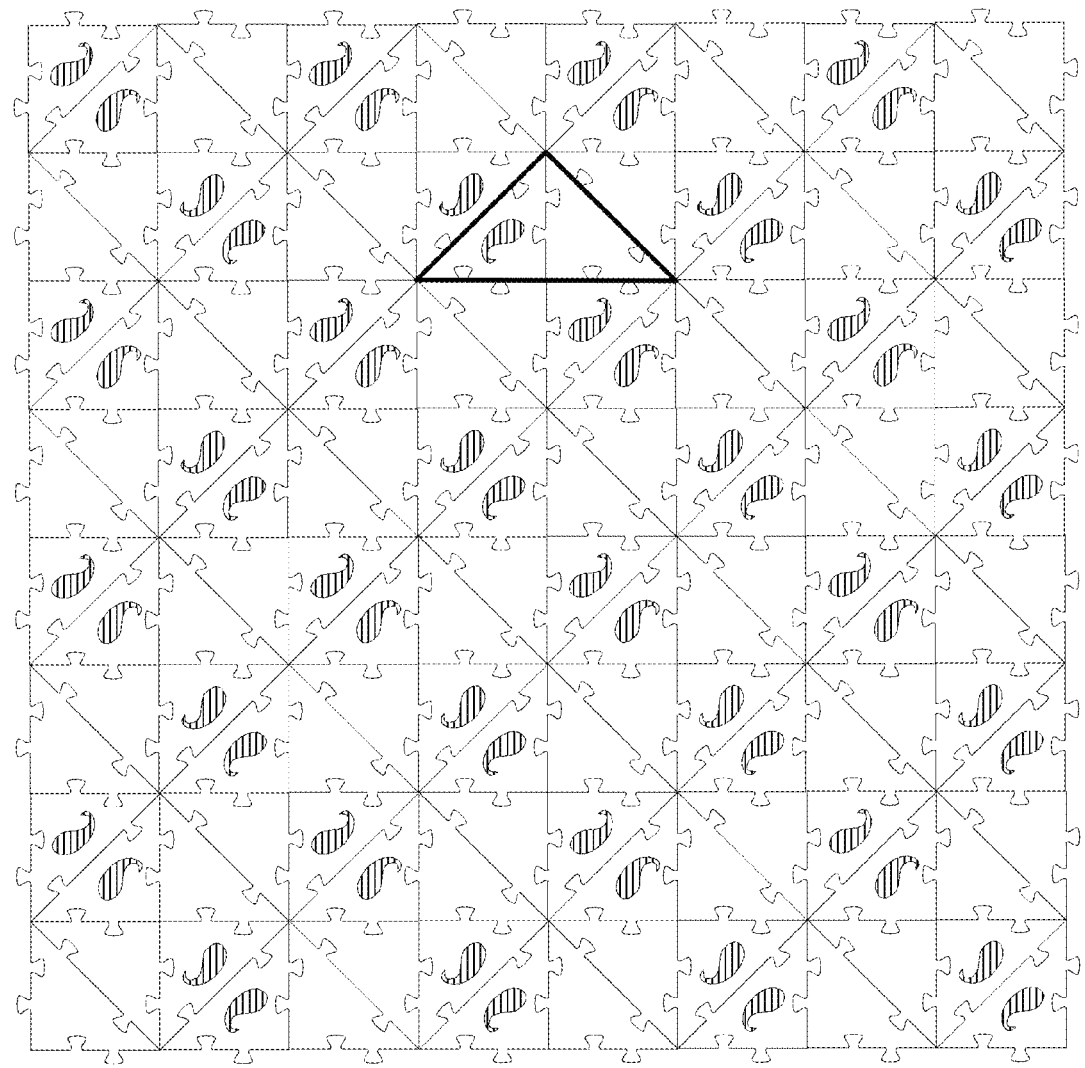
FIG. 16 is a top view of the 2*22 pattern. A fundamental domain is outlined in bold.

FIG. 16 is a top view of the pattern denoted as 2*22 in the Conway notation. It is assembled using the tiles in FIGS. 4A, 4B, and 5. A fundamental domain is shown in bold.

Figure 17:
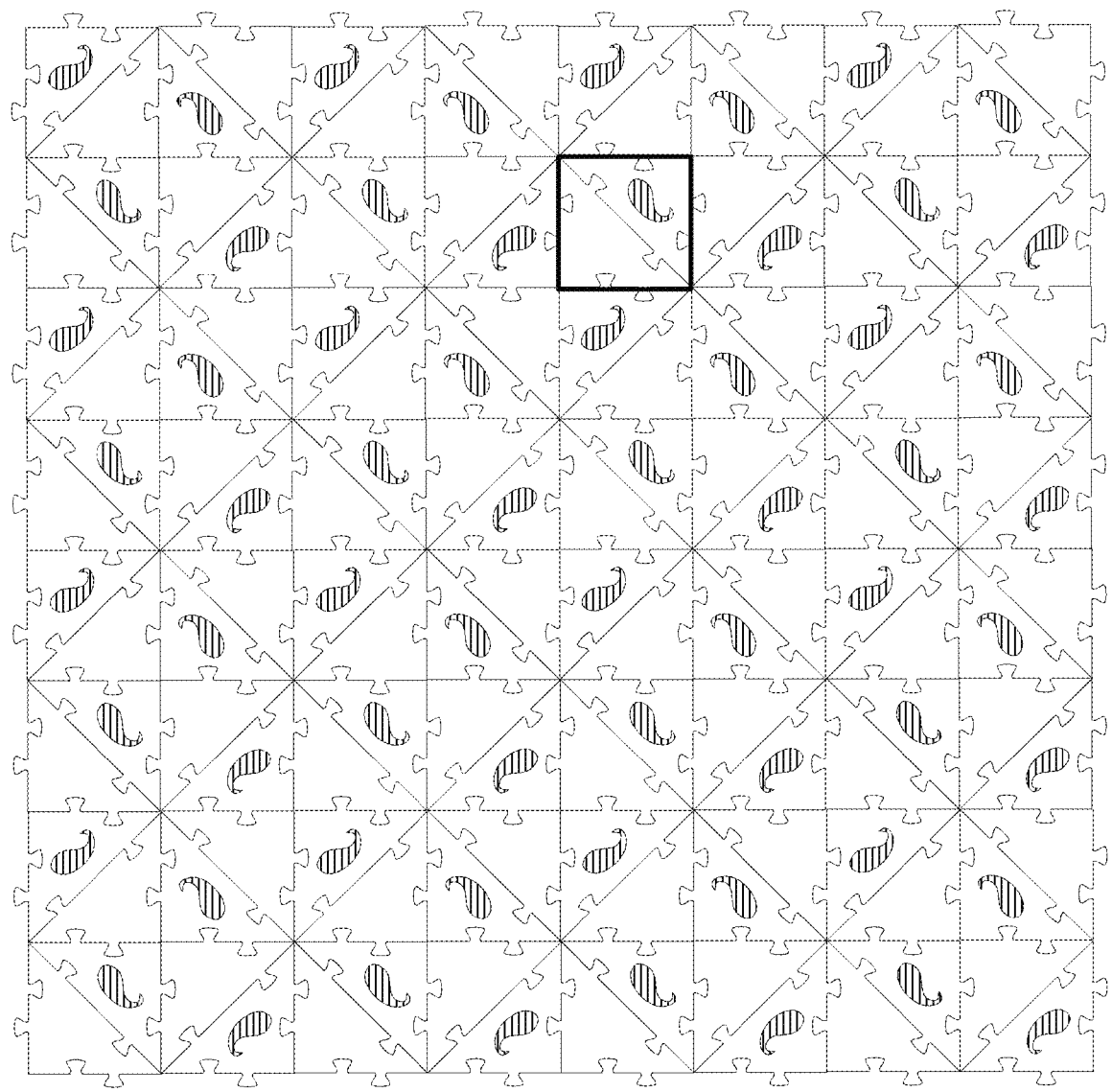
FIG. 17 is a top view of the 442 pattern. A fundamental domain is outlined in bold.

FIG. 17 is a top view of the pattern denoted as 442 in the Conway notation. It is assembled using the tiles in FIGS. 4A, 4B, and 5. A fundamental domain is shown in bold.

Figure 18:
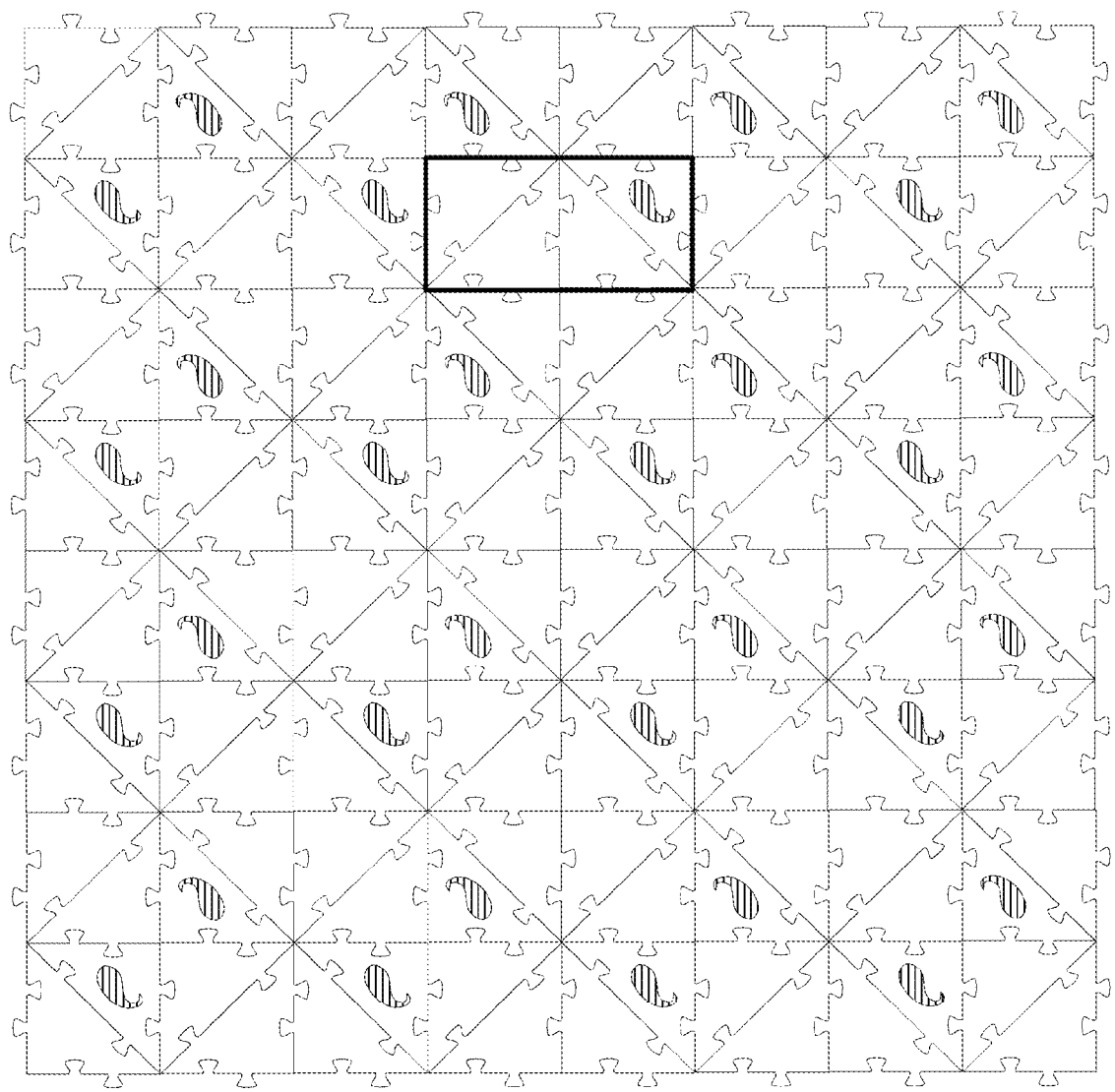
FIG. 18 is a top view of the 2222 pattern. A fundamental domain is outlined in bold.

FIG. 18 is a top view of the pattern denoted as 2222 in the Conway notation. It is assembled using the tiles in FIGS. 4A, 4B, and 5. A fundamental domain is shown in bold.

Figure 19:
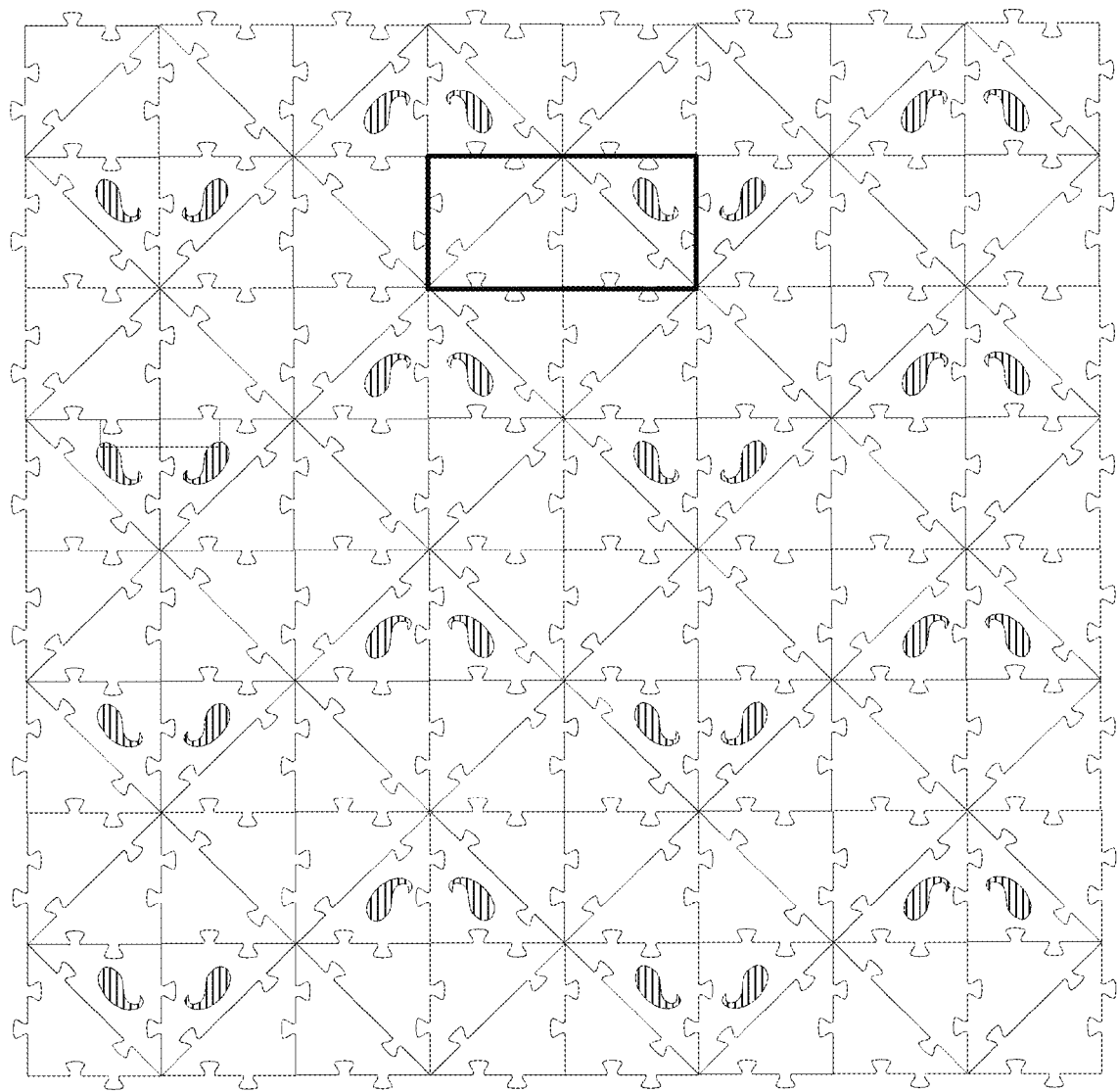
FIG. 19 is a top view of the 22* pattern. A fundamental domain is outlined in bold.

FIG. 19 is a top view of the pattern denoted as 22* in the Conway notation. It is assembled using the tiles in FIGS. 4A, 4B, and 5. A fundamental domain is shown in bold.

Figure 20:
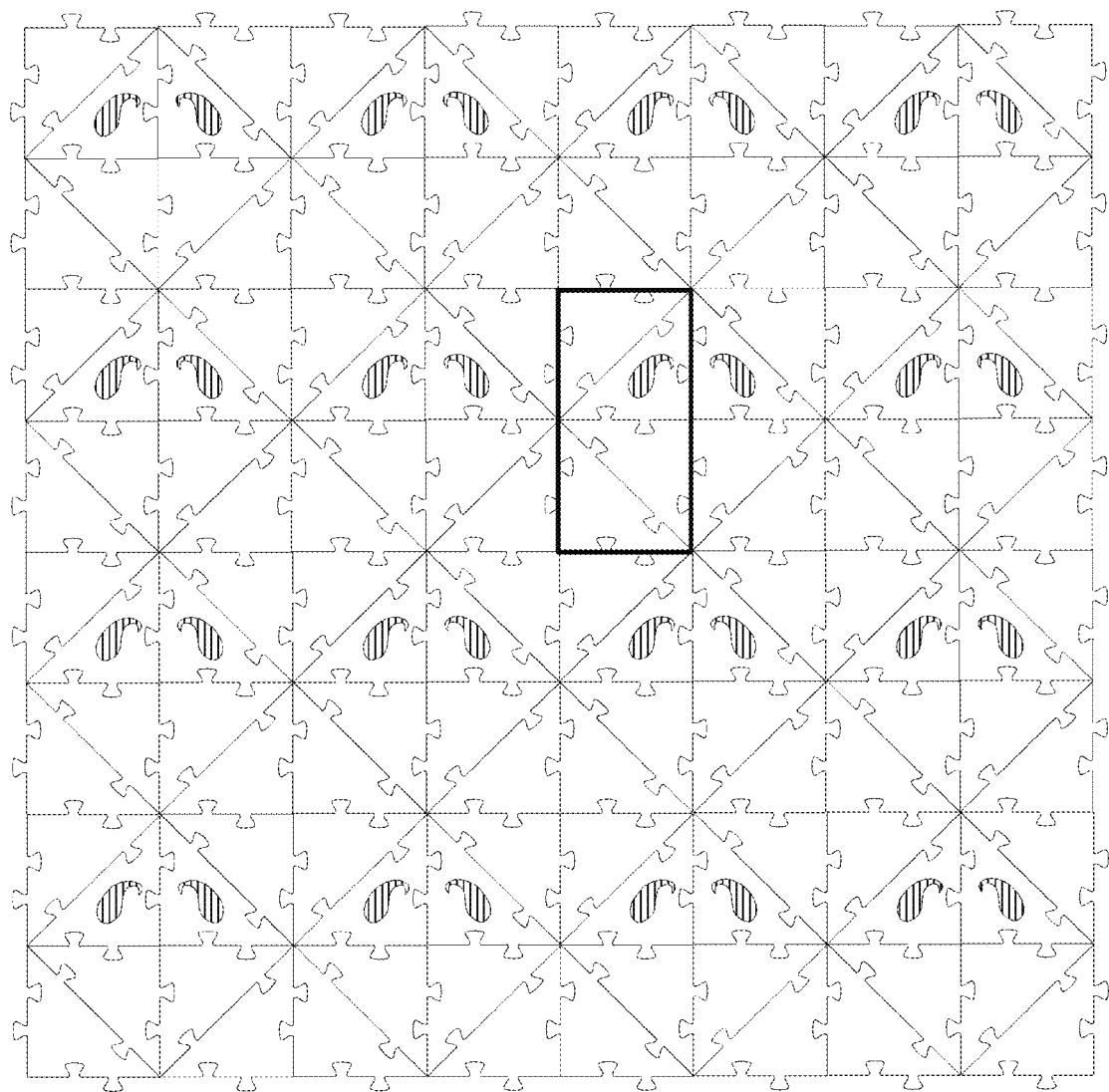
FIG. 20 is a top view of the ** pattern. A fundamental domain is outlined in bold.

FIG. 20 is a top view of the pattern denoted as  in the Conway notation. It is assembled using the tiles in FIGS. 4A, 4B, and 5**. A fundamental domain is shown in bold.

Figure 21:
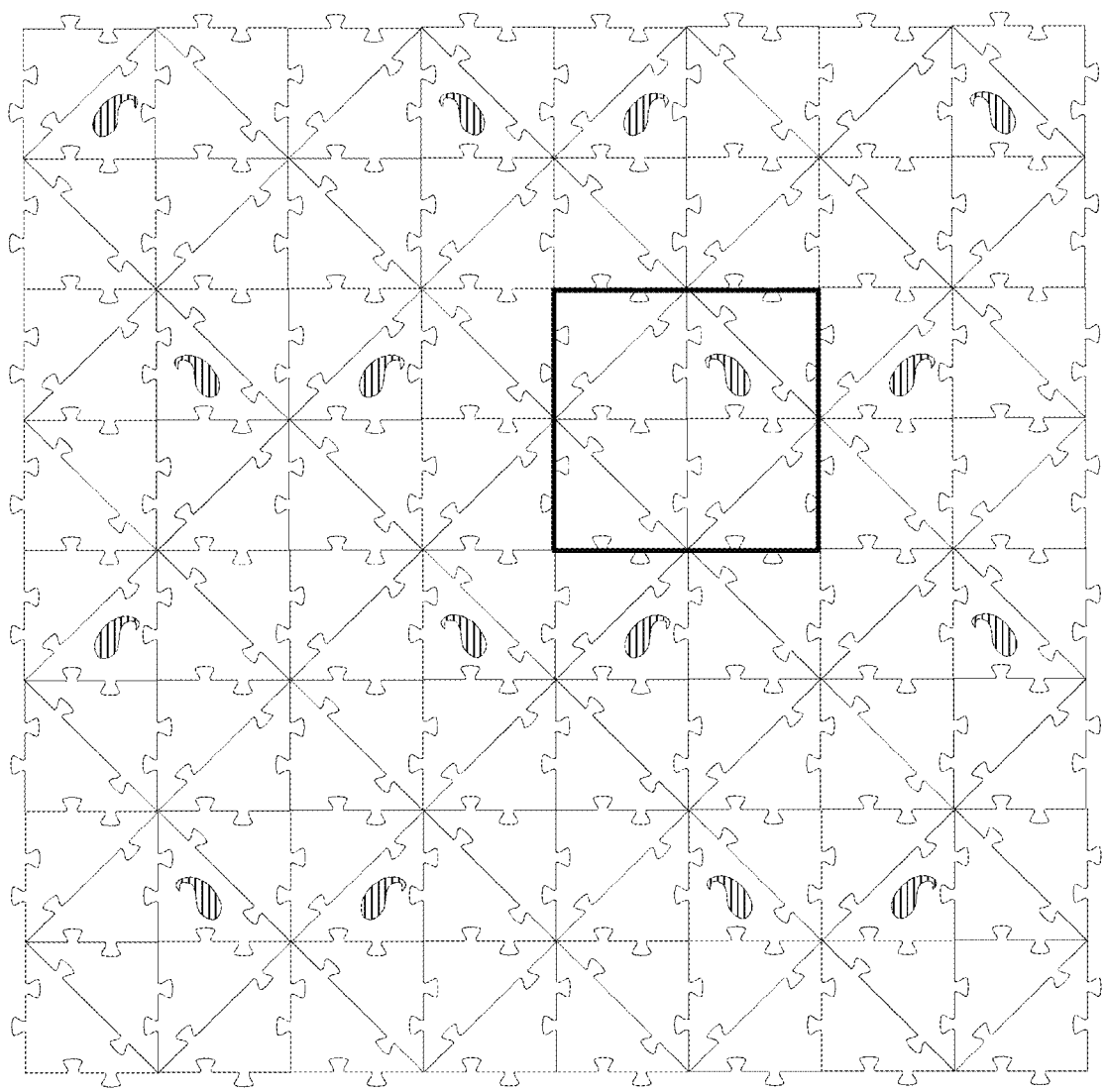
FIG. 21 is a top view of the *X pattern. A fundamental domain is outlined in bold.

FIG. 21 is a top view of the pattern denoted as *X in the Conway notation. It is assembled using the tiles in FIGS. 4A, 4B, and 5. A fundamental domain is shown in bold.

Figure 22:
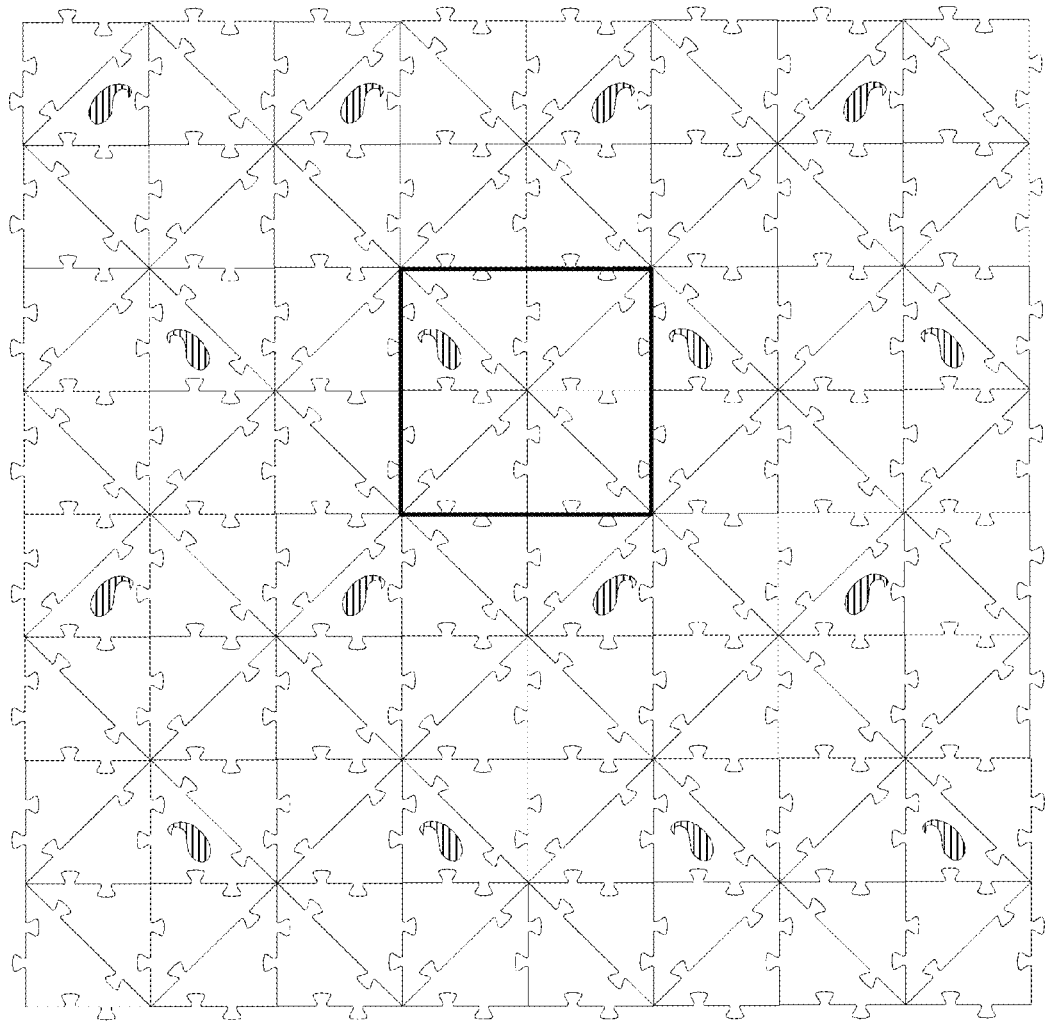
FIG. 22 is a top view of the XX pattern. A fundamental domain is outlined in bold.

FIG. 22 is a top view of the pattern denoted as XX in the Conway notation. It is assembled using the tiles in FIGS. 4A, 4B, and 5. A fundamental domain is shown in bold.

Figure 23:
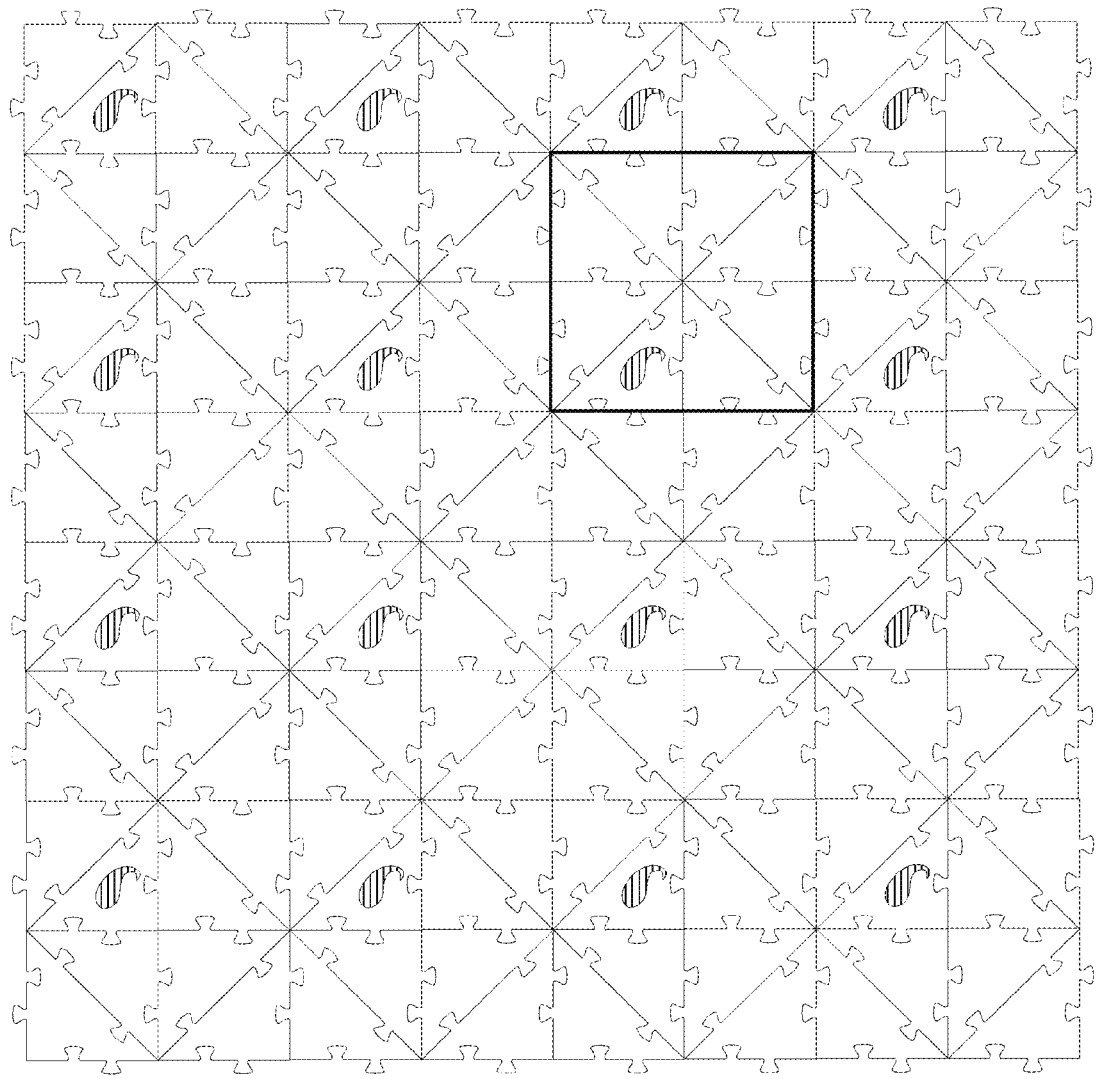
FIG. 23 is a top view of the O pattern. A fundamental domain is outlined in bold.

FIG. 23 is a top view of the pattern denoted as O in the Conway notation. It is assembled using the tiles in FIGS. 4A, 4B, and 5. A fundamental domain is shown in bold.

Figure 24:
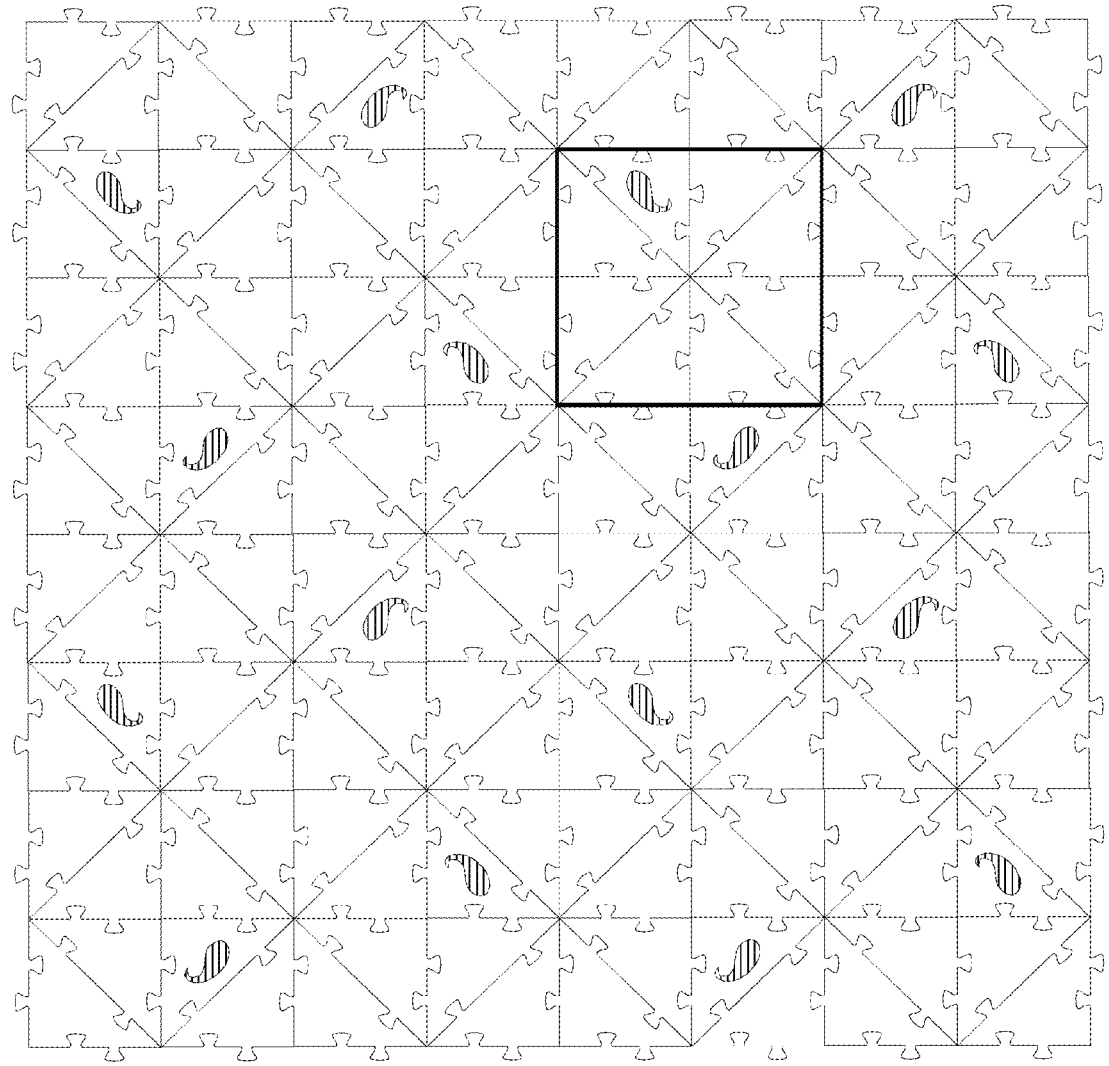
FIG. 24 is a top view of the 22X pattern. A fundamental domain is outlined in bold.

FIG. 24 is a top view of the pattern denoted as 22X in the Conway notation. It is assembled using the tiles in FIGS. 4A, 4B, and 5. A fundamental domain is shown in bold.

Figure 25:
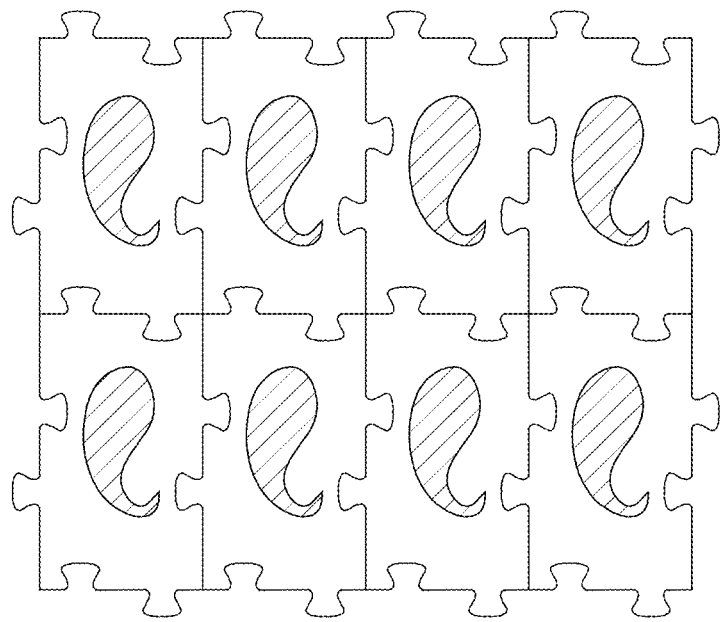
FIG. 25 is a top view of the O pattern made with the rectangular tiles.

FIG. 25 is a top view of the O pattern made with the rectangular tiles in FIG. 6B. This is a different way of making the pattern than the one shown in FIG. 23.

Figure 26:
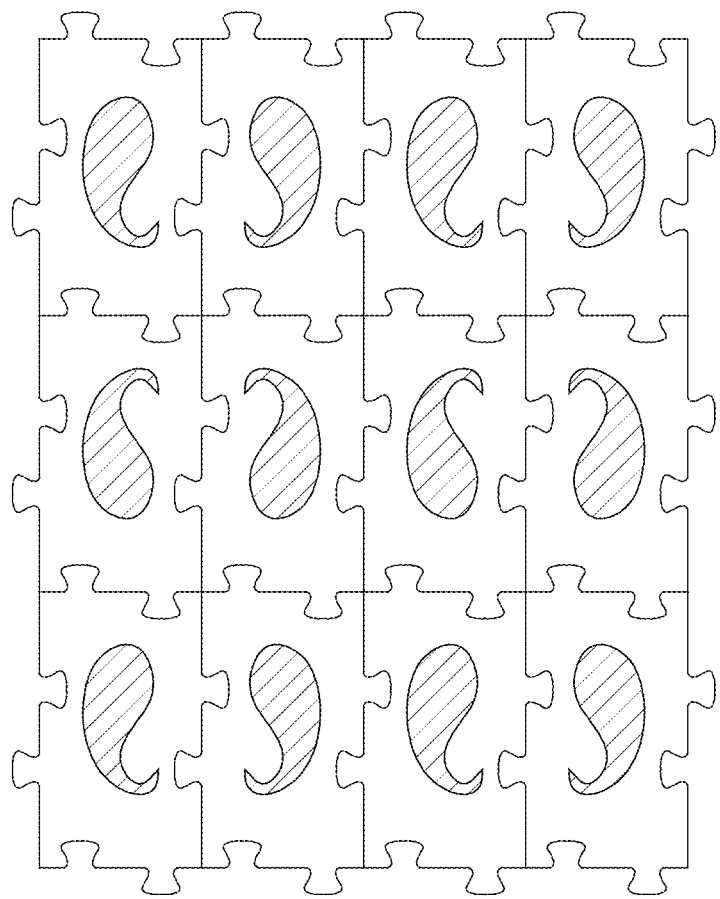
FIG. 26 is a top view of the *2222 pattern made with the rectangular tiles.

FIG. 26 is a top view of the *2222 pattern made with the rectangular tiles in FIGS. 6A and 6B.

Figure 27:
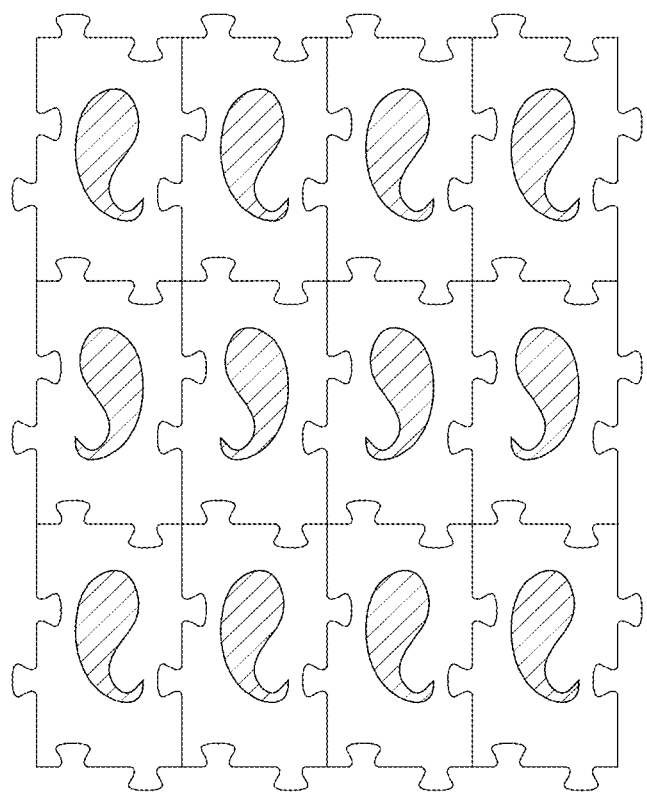
FIG. 27 is a top view of the XX pattern made with the rectangular tiles.

FIG. 27 is a top view of the XX pattern made with the rectangular tiles in FIGS. 6A and 6B.

Figure 28:
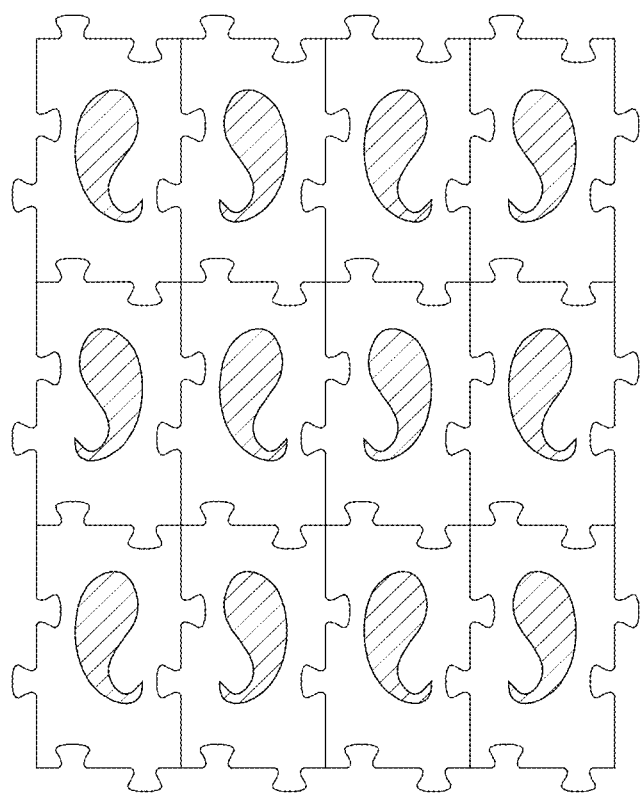
FIG. 28 is a top view of the *X pattern made with the rectangular tiles.

FIG. 28 is a top view of the *X pattern made with the rectangular tiles in FIGS. 6A and 6B.

Figure 29:
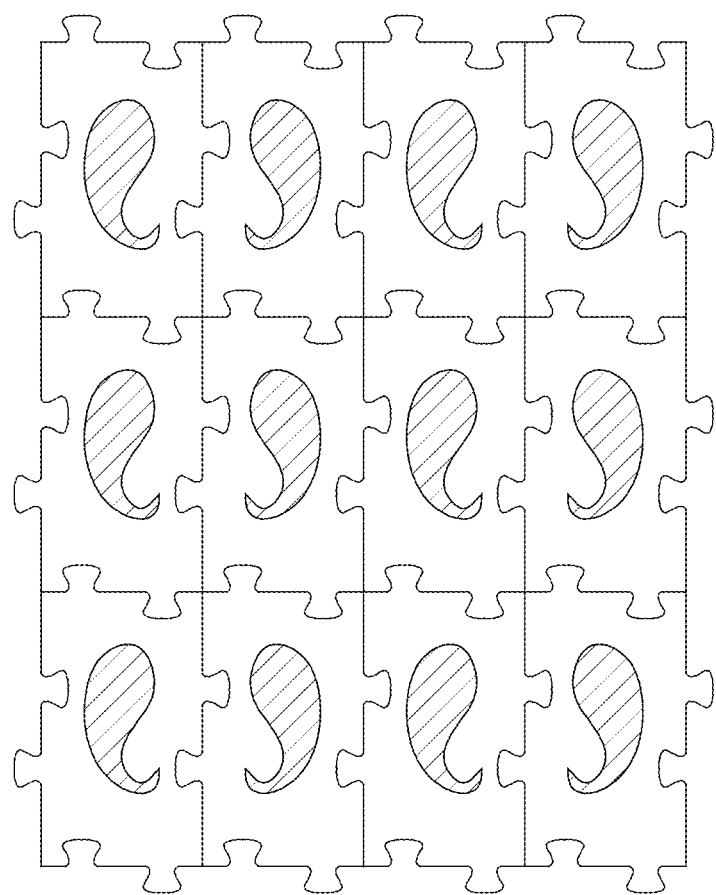
FIG. 29 is a top view of the ** pattern made with the rectangular tiles.

FIG. 29 is a top view of the ** pattern made with the rectangular tiles in FIGS. 6A and 6B.

Figure 30:
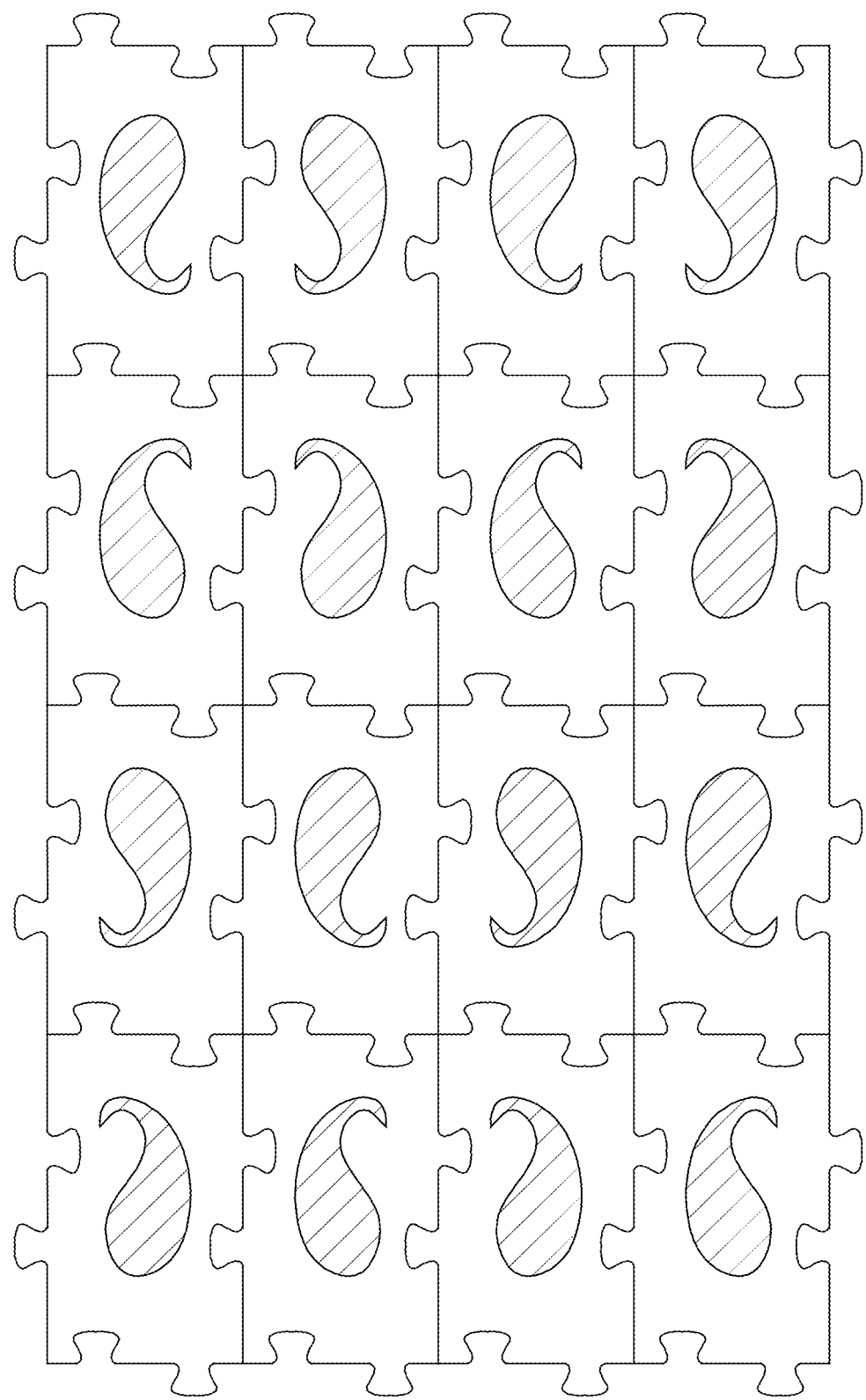
FIG. 30 is a top view of the 2*22 pattern made with the rectangular tiles.

FIG. 30 is a top view of the 2*22 pattern made with the rectangular tiles in FIGS. 6A and 6B.

Figure 31:
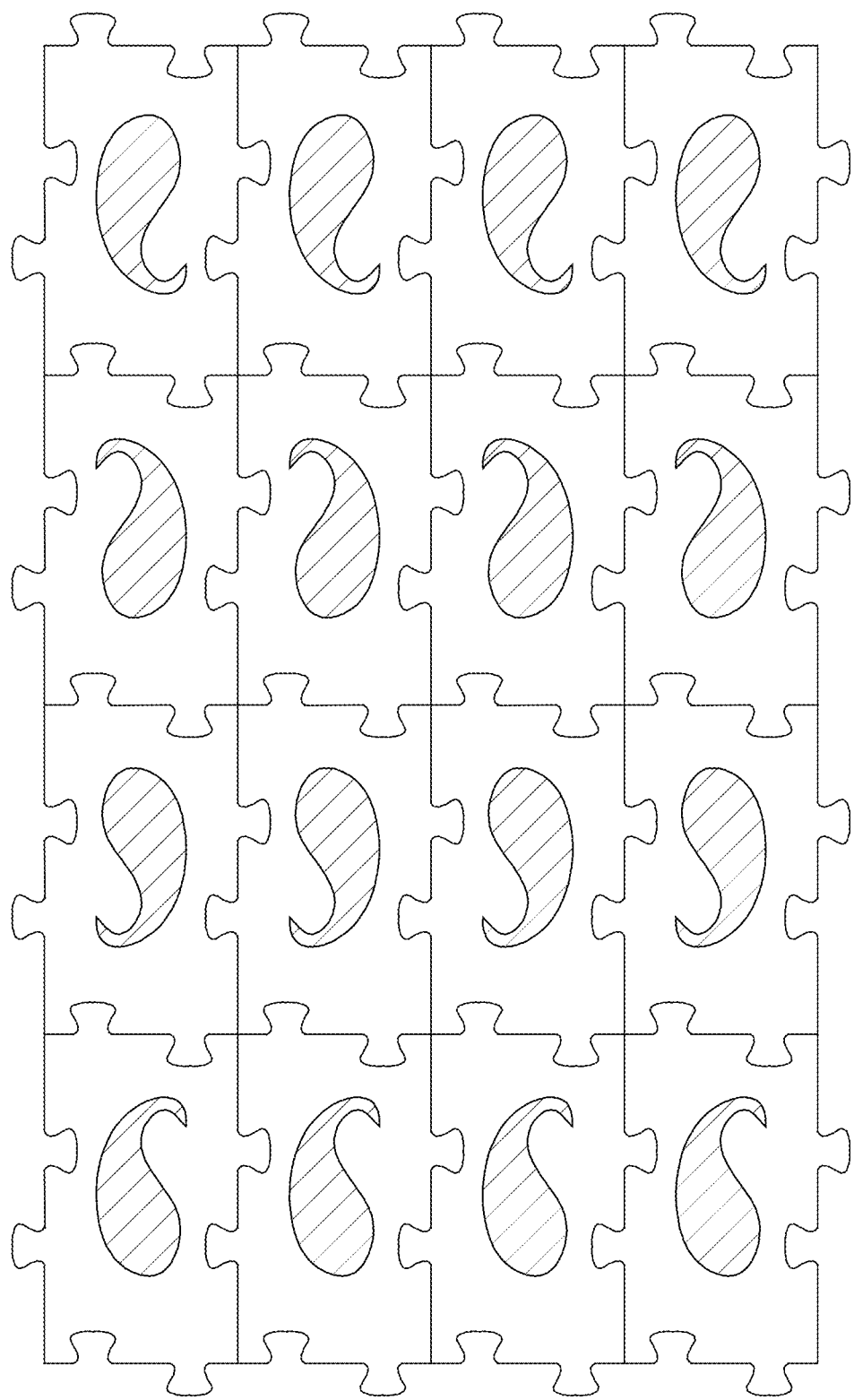
FIG. 31 is a top view of the 22* pattern made with the rectangular tiles.

FIG. 31 is a top view of the 22* pattern made with the rectangular tiles in FIGS. 6A and 6B.

Figure 32:
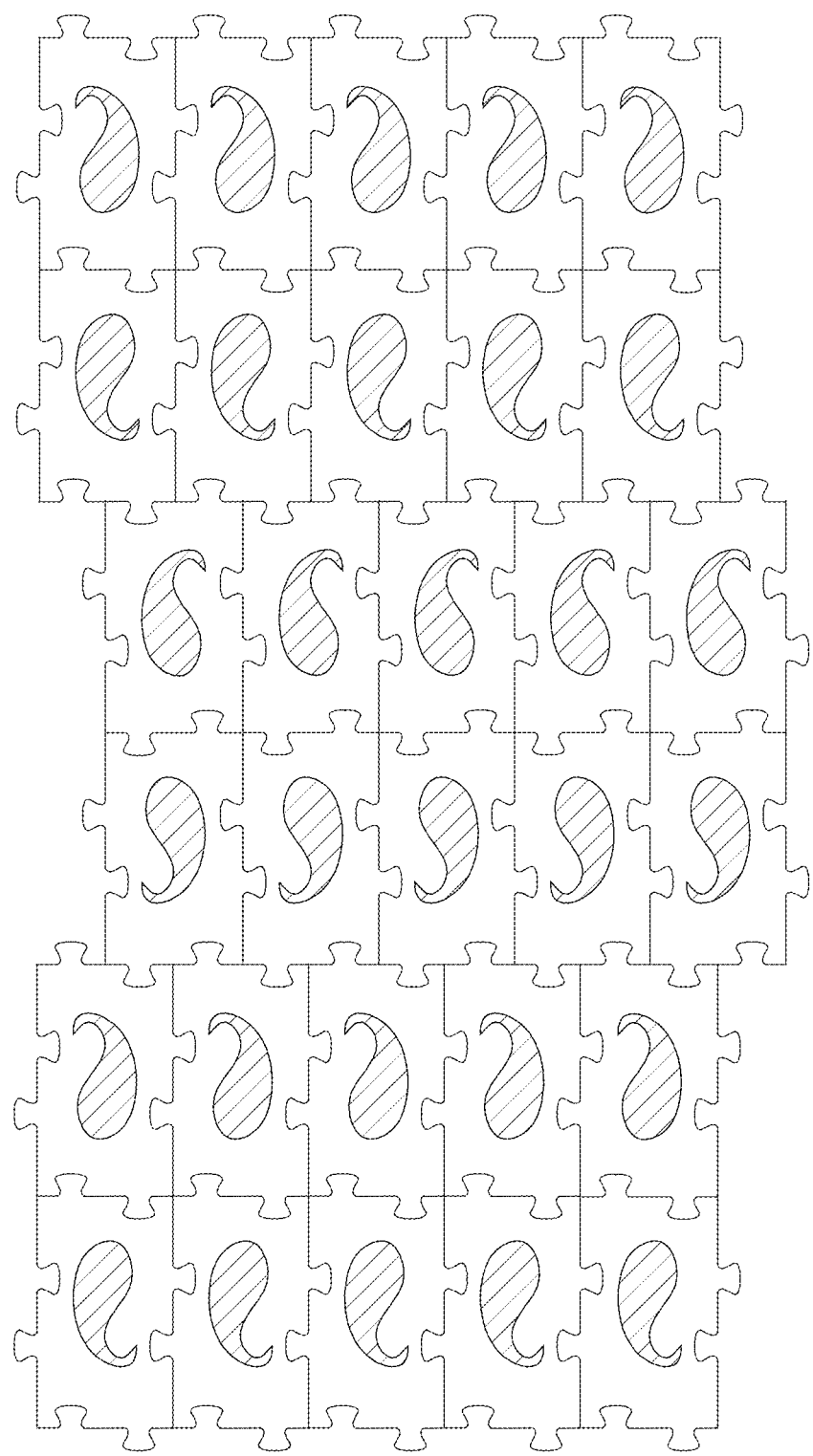
FIG. 32 is a top view of the 22X pattern made with the rectangular tiles.

FIG. 32 is a top view of the 22X pattern made with the rectangular tiles in FIGS. 6A and 6B.

Figure 33:
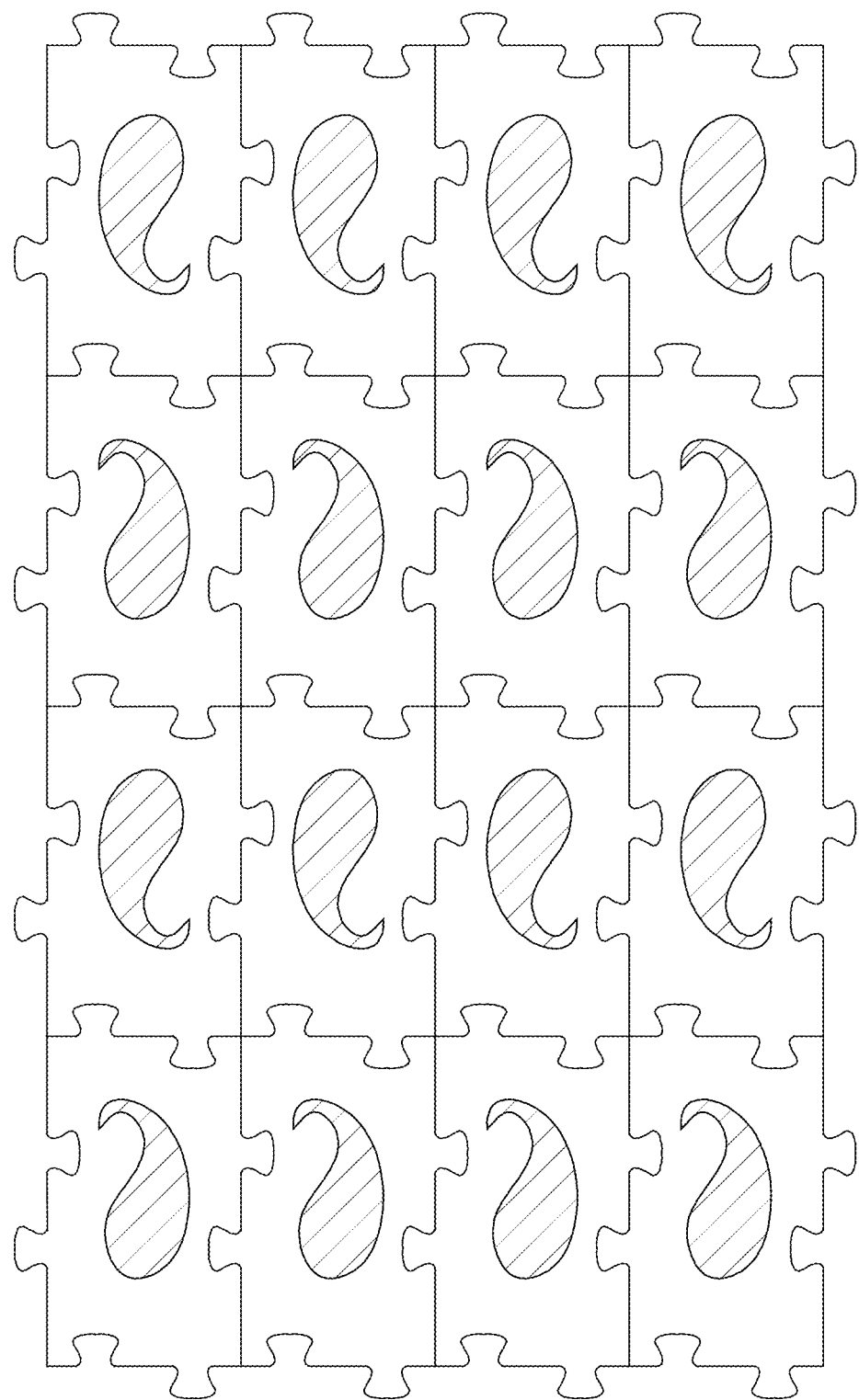
FIG. 33 is a top view of the 2222 pattern made with the rectangular tiles.

FIG. 33 is a top view of the 2222 pattern made with the rectangular tiles in FIG. 6B.

Figure 34:
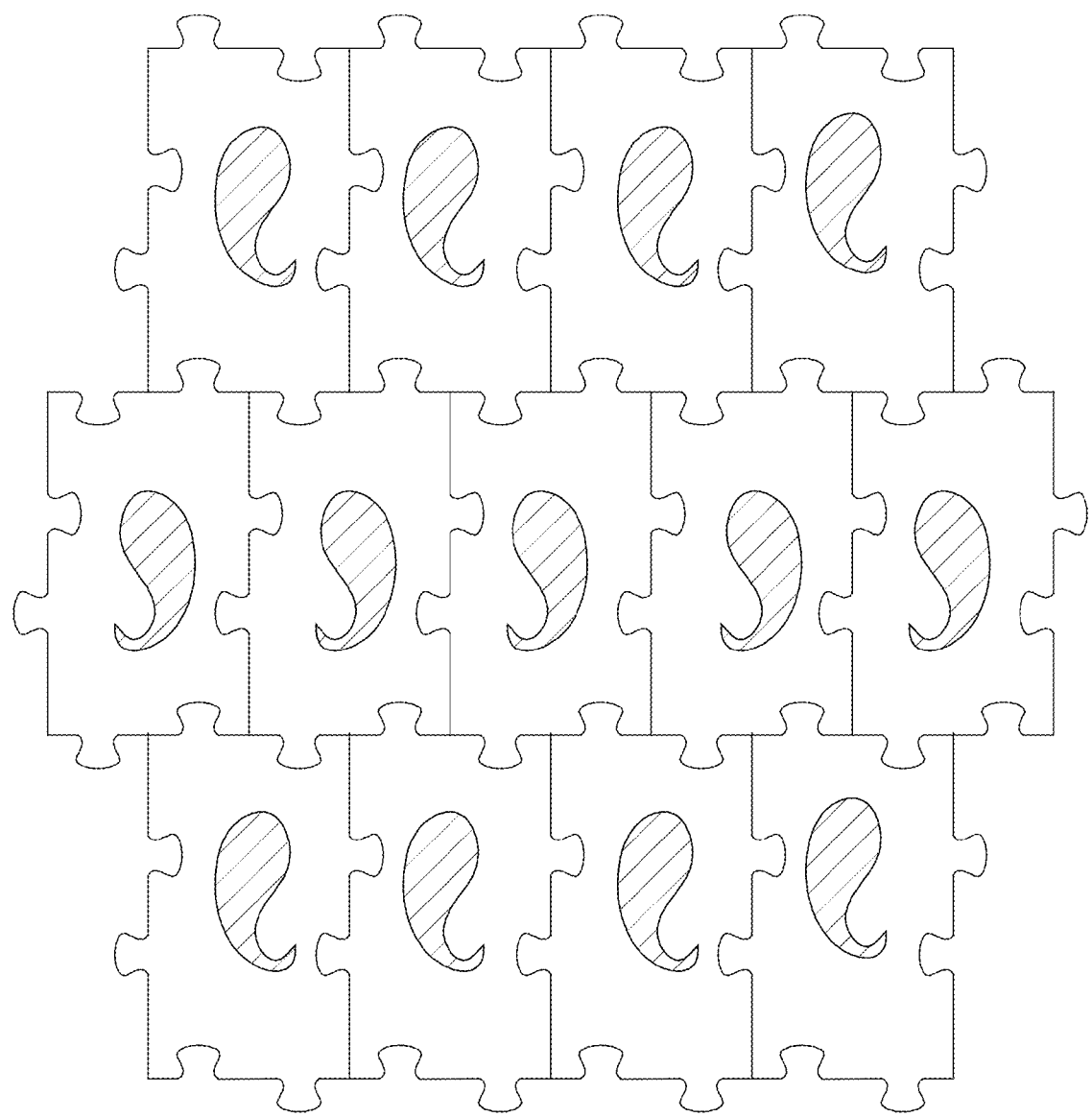
FIG. 34 is a top view of the XX pattern made with the rectangular tiles.

FIG. 34 is a top view of the XX pattern made with the rectangular tiles in FIG. 6B.

Figure 35:
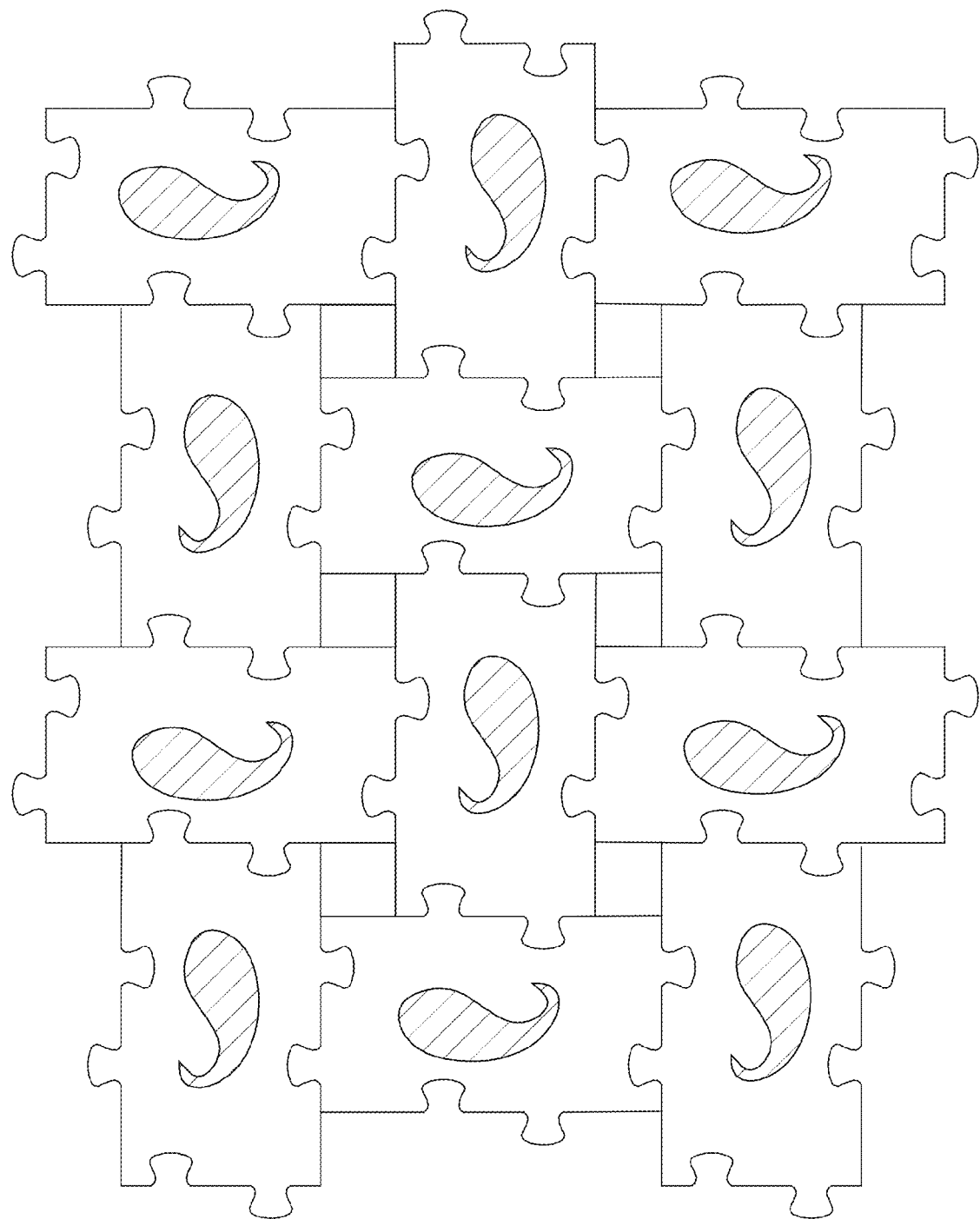
FIG. 35 is a top view of the XX pattern made with the rectangular tiles configured in a different way than in FIG. 34.

FIG. 35 is a top view of the pattern denoted as XX in the Conway notation. In contrast with the XX pattern shown in FIG. 27, here the pattern is assembled entirely of the tiles in FIG. 6A. Although the patterns in FIGS. 27 and 35 do not appear to be identical, they are considered to be the "same" from a mathematical point of view. That is because they have the same group of symmetry.

Figure 36:
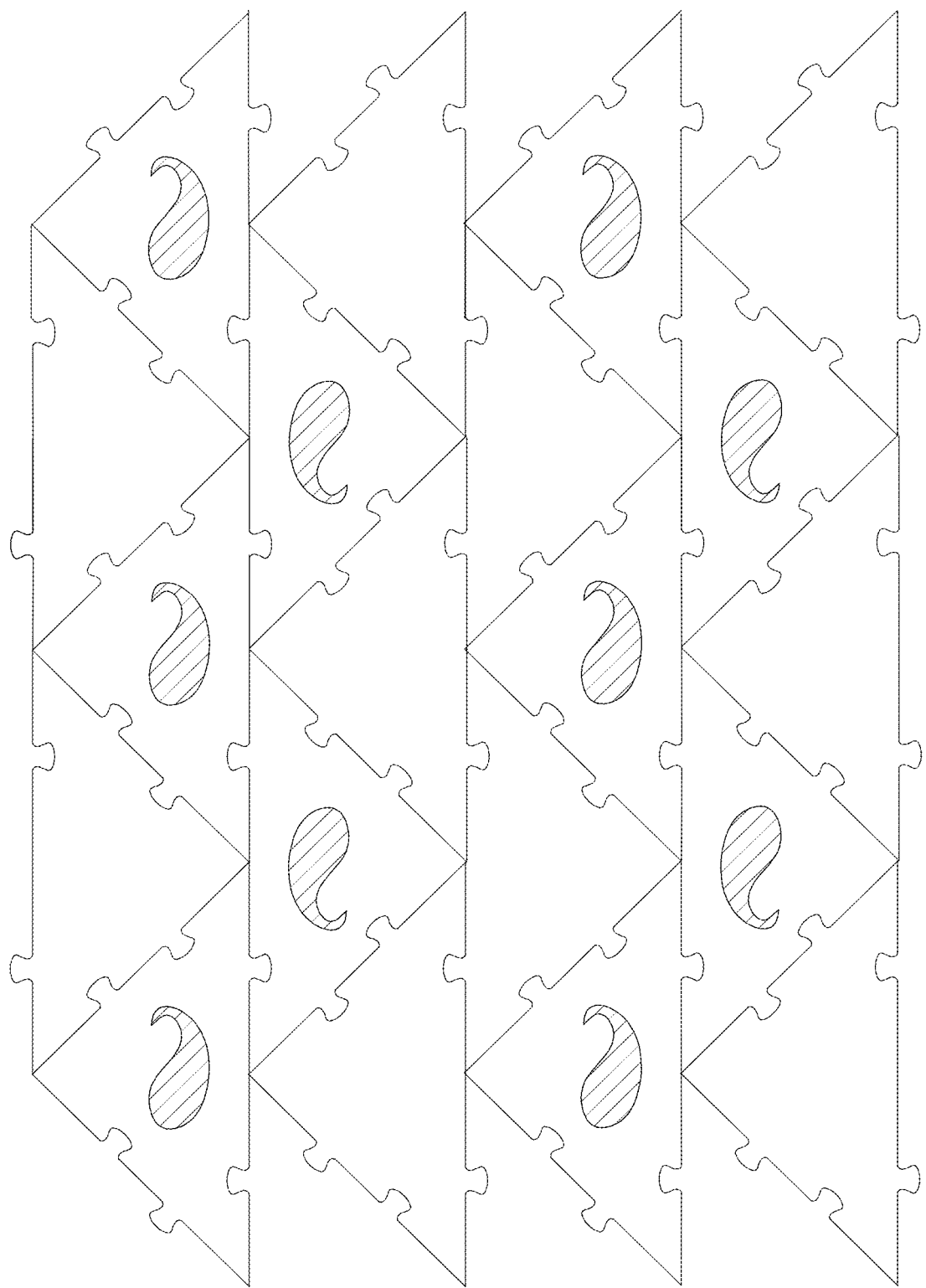
FIG. 36 is a top view of the XX pattern made with the tiles shown in FIGS. 4A, 4B, and 5. This is a different layout of the XX pattern than the one shown in FIGS. 22, 34, and 35.

FIG. 36 shows how the tiles in FIGS. 4A, 4B, and 5 can be juxtaposed to make the XX pattern. A different arrangement of these tiles to make the XX pattern was already shown in FIGS. 27, 34, and 35. In this configuration, the tiles are staggered with respect to each other, utilizing the placement of the male and female coupling elements along the hypotenuse of the triangular tiles in the preferred embodiment.

Figure 37A:
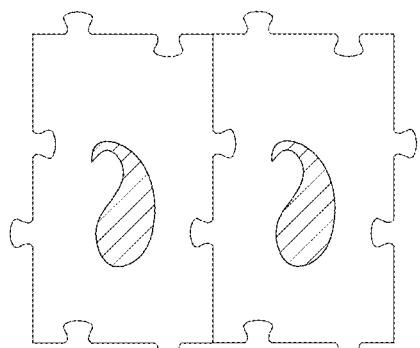
FIGS. 37A, 37B, 37C, and 37D demonstrate the four distinct ways in which the rectangular tiles of FIGS. 6A and 6B can be juxtaposed along their long sides.
Figure 37B:
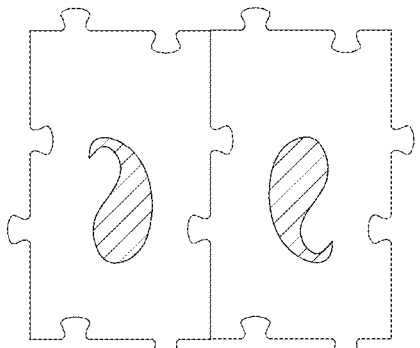
Figure 37C:
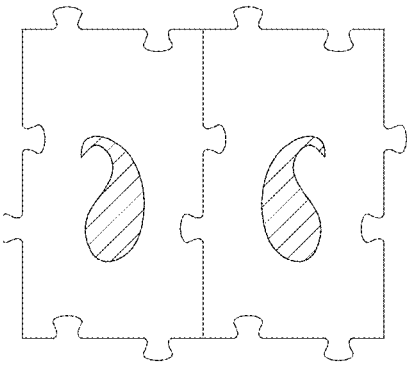
Figure 37D:
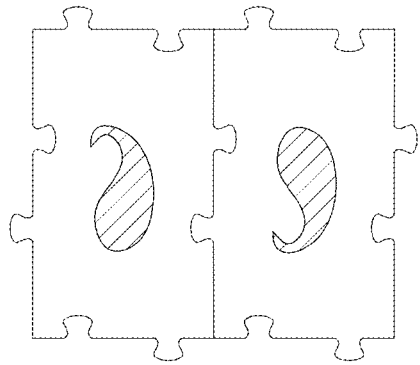

FIGS. 37A, 37B, 37C, and 37D illustrate how the invention can be used to teach students translation, gyration, reflection, and glide reflection. In FIG. 37A one gets from one tile to the other by horizontally translating. In FIG. 37B, one rotates, or gyrates, about the midpoint of the line joining the tiles to get from one tile to the other. Both translation and rotation are orientation preserving transformations, in the sense that they transform an image without mirror-reflecting it. This property is embedded in the invention in the following way. The user can perform all the orientation preserving transformations with just one type of tile; that is, without using the complement of the tile. However, if the user wants to perform an orientation reversing transformation, such as a reflection about an axis (FIG. 37C) or a glide reflection along an axis (FIG. 37D), he will need to use both the tile and its complement.

Figure 38A:
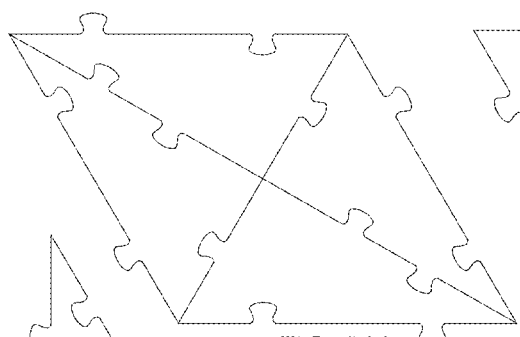
FIGS. 38A, 38B, 38C, and 38D illustrate some of some of the ways in which the tiles fit together.
Figure 38B:
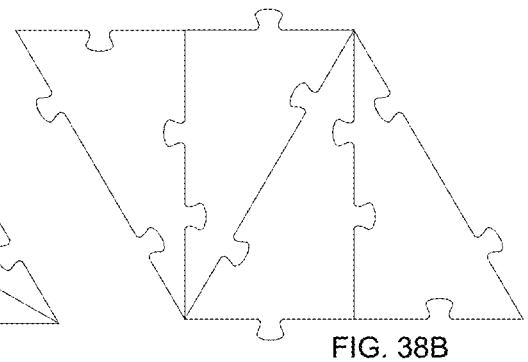
Figure 38C:
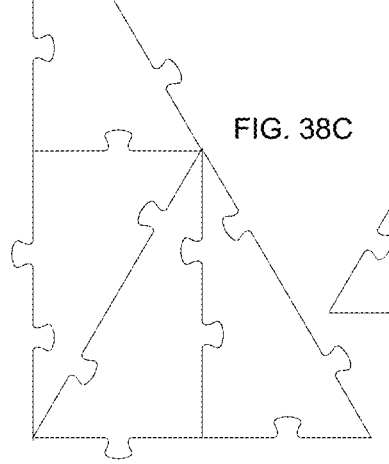
Figure 38D:
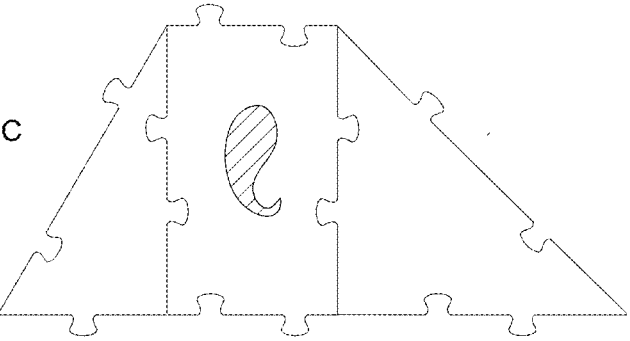

FIGS. 38A and 38B show two different ways in which a rhombus may be made with two pairs of complementary triangles pictured in FIGS. 3A and 3B. FIG. 38C shows how the same two pairs of complementary triangles can be rearranged to form a larger 30°-60°-90° triangle. FIG. 38D illustrates how a variety of tile shapes can be combined to form a trapezoid.

Figure 39A:
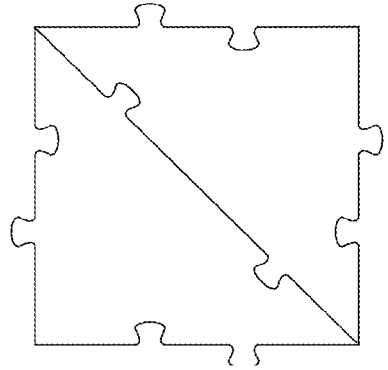
FIGS. 39A and 39B illustrate how tiles in FIG. 5 can be assembled into squares so as to demonstrate the derivation of $\sqrt{2}$.
Figure 39B:
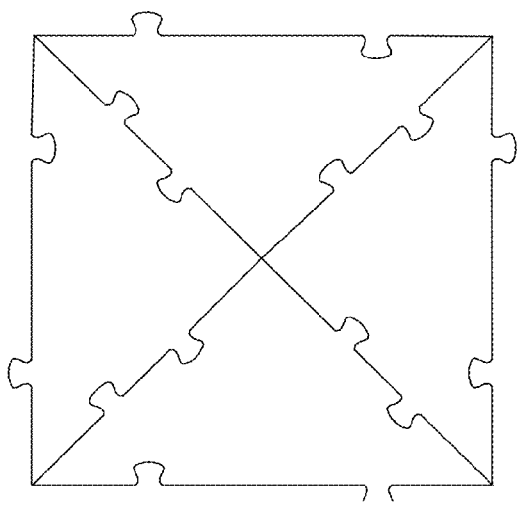

FIG. 39A shows how two tiles pictured in FIG. 5 fit together to form a square. The square shown in FIG. 39B obviously has area equal to twice that of the square in FIG. 39A. Therefore, if we assume, for simplicity, that the area of the square in FIG. 39A is 1 unit, then the area of the square in FIG. 39B is 2 units. It follows that the side length of the square in FIG. 39B is a number whose square is equal to 2, in other words, $\sqrt{2}$. By going through this reasoning, the student can "discover" the concept of the square root.

Figure 40A:
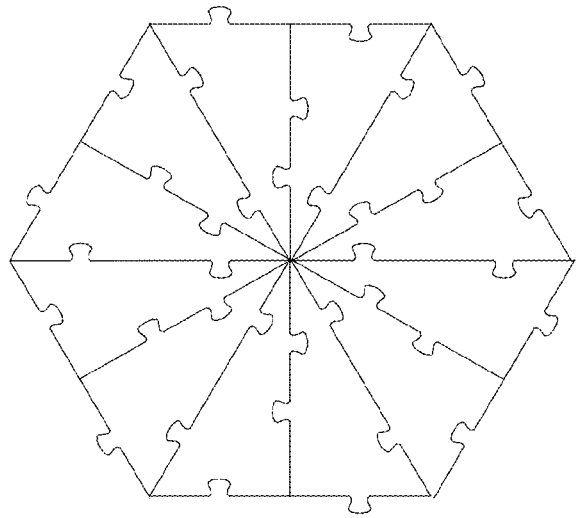
FIGS. 40A, 40B, 40C, and 40D illustrate how the tiles in FIGS. 3A and 3B can be juxtaposed so as to demonstrate the properties of a 30°-60°-90° triangle.
Figure 40B:
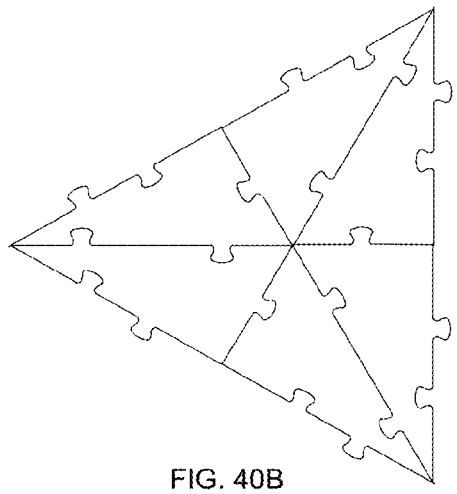
Figure 40C:
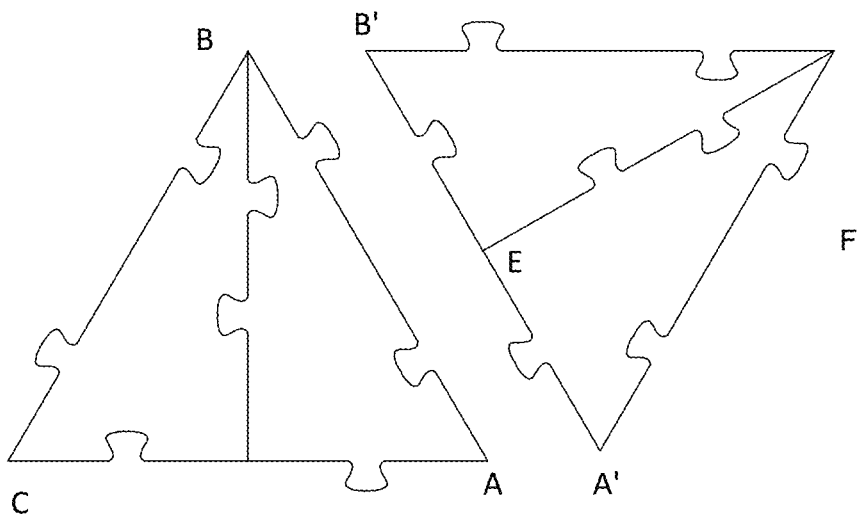
Figure 40D:
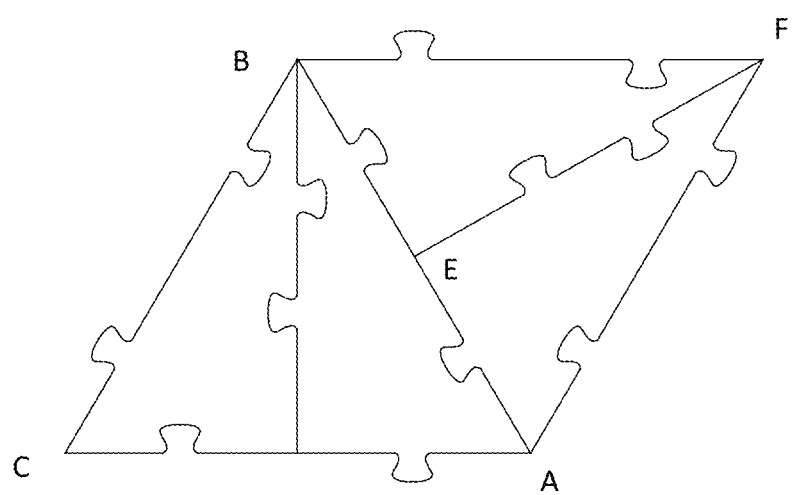

FIGS. 40A, 40B, 40C, and 40D form a sequence of figures that show how a student can be guided to "discover" the 30°-60°-90° triangle and its properties. This triangle is extremely important in the study of trigonometry. The only prior knowledge required is that the full revolution around any vertex spans 360°. By juxtaposing the tiles in FIGS. 3A and 3B as shown in FIG. 40A, the student discovers that 12 of the smaller angles in the triangle make 360°. Therefore, the smaller angle must equal 360°/12=30°. Similarly, the construction in FIG. 9B demonstrates that the larger angle of the triangle must equal 360°/6=60°. Consequently, the student finds that two 30°-60°-90° triangles can be assembled to make an equilateral triangle. FIGS. 40C and 40D illustrate the fact that the shortest side of the 30°-60°-90° triangle has length that is half of the length of its hypotenuse. First, the user can verify that segments B'E and EA' have equal length by stacking the triangles EFB' and EFA'. Then the user discovers that the segments AB and A'B' have the same lengths since the tiles fit together as shown in FIG. 40D. Therefore, the length of EA' is half of the length of AB. Since the length of AB is the same as the length of A'F, EA' is also half of the length of A'F.

FIGS. 41A-45B

Alternative Embodiments

Figure 41A:
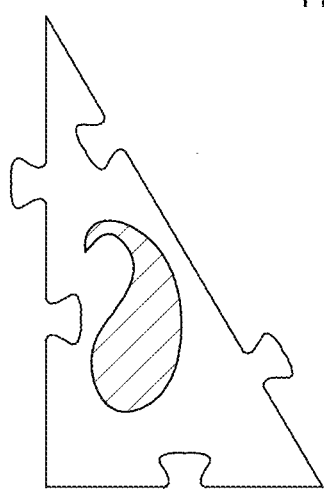
FIGS. 41A and 41B show both sides of an alternative embodiment of a typical puzzle piece. In contrast with the piece depicted in FIG. 1, here the design is printed on both side of each piece, rather than cut out.
Figure 41B:
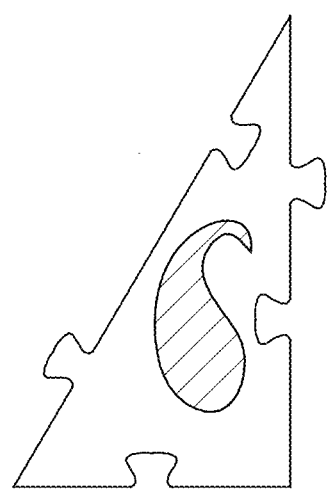
Figure 42A:
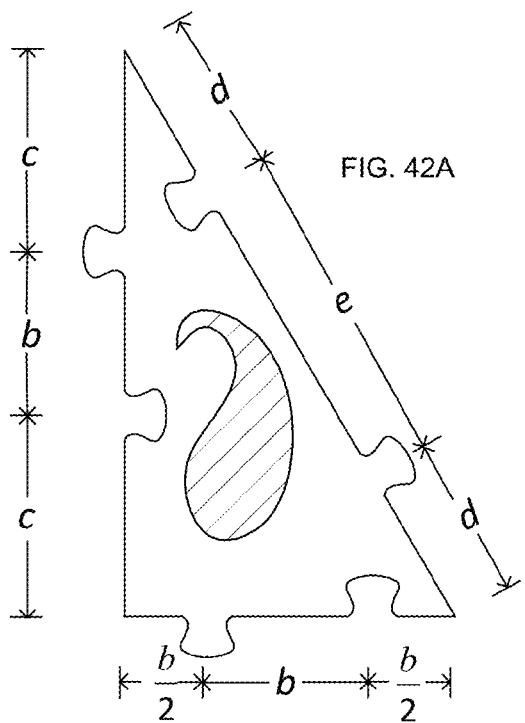
FIGS. 42A, 42B, 42C, and 42D show a top view of an alternative embodiment of the 30°-60°-90° triangle tiles that were depicted in FIGS. 2A, 2B, 3A and 3B.
Figure 42B:
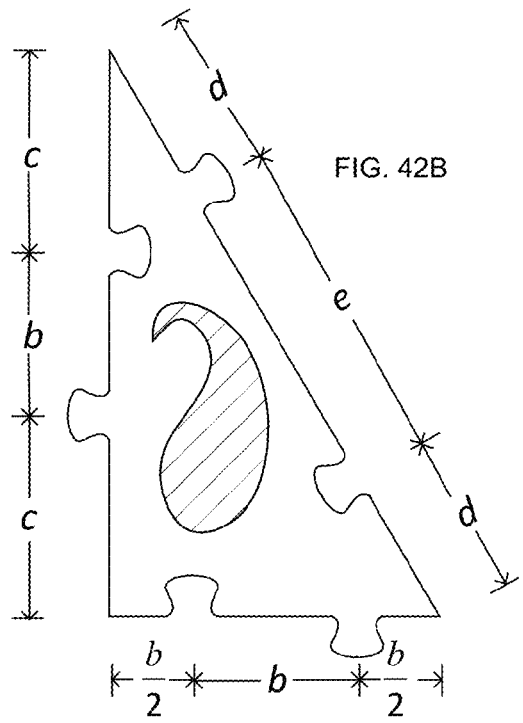
Figure 42C:
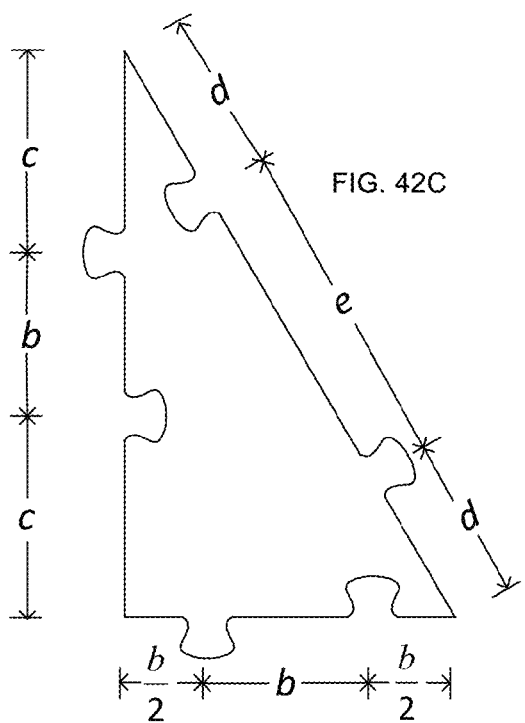
Figure 42D:
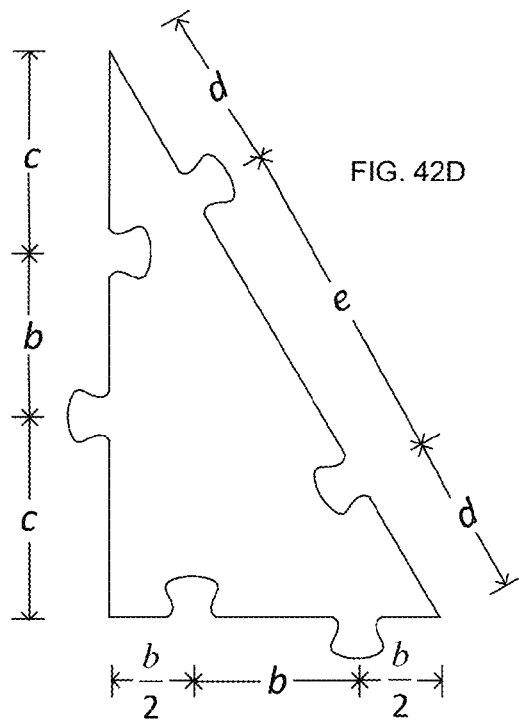

FIGS. 41A and 41B show the front and back side of a version of the invention without the stencil capacity. Instead of being a cutout, as in FIG. 1, the design is printed or drawn on both sides of the tile.

FIGS. 42A, 42B, 42C, and 42D show an alternative embodiment of the tiles shown in FIGS. 2A, 2B, 3A, and 3B, using the same dimensions a and b as earlier.

Figure 43A:
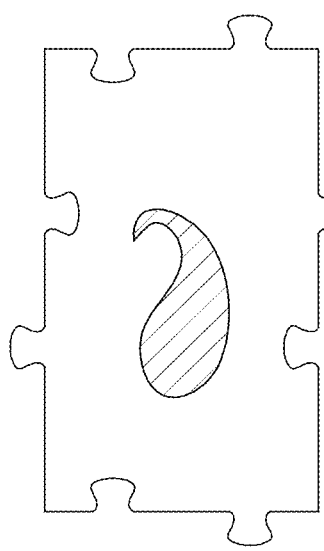
FIGS. 43A and 43B show alternative embodiments of the rectangular tiles in terms of the placement of their male and female coupling elements.
Figure 43B:
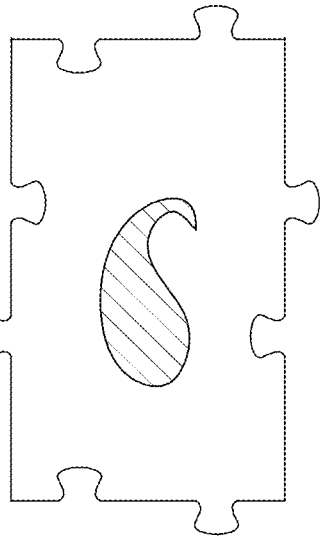
Figure 43C:
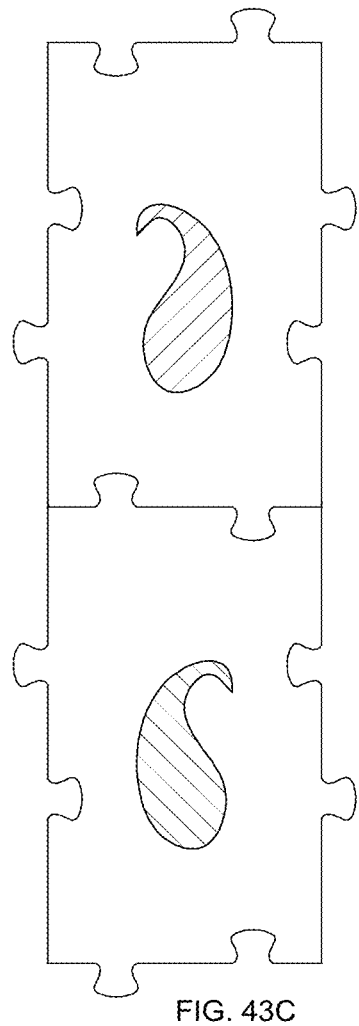
FIG. 43C shows the juxtaposition of two identical tiles pictured in FIG. 43A.

FIGS. 43A and 43B show an alternative embodiment of the rectangular tiles shown in FIGS. 6A and 6B. When the user starts out with a stack of two tiles from FIG. 43A and then juxtaposes them as pictured in FIG. 43C, he physically performs a glide reflection. Thus, the tiles in FIGS. 43A and 43B are an aid for kinetic learning of the concept of glide reflection. Unlike the case in FIG. 40D, here a glide reflection can be demonstrated using the same type of tile (as opposed to a tile and its complement).

Figure 44A:
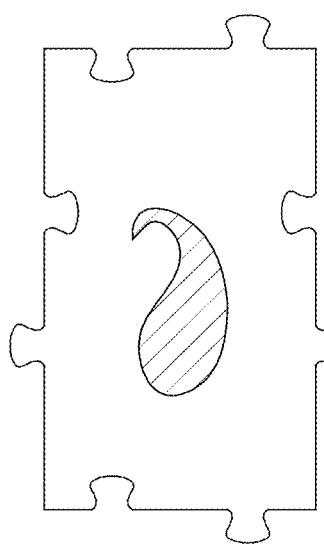
FIGS. 44A and 44B show another alternative embodiment of the rectangular tiles in terms of the placement of their male and female coupling elements.
Figure 44B:
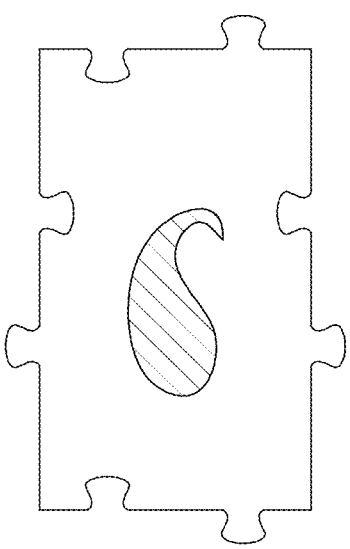

FIGS. 44A and 44B show a second embodiment of the rectangular tiles shown in FIGS. 6A and 6B. In this embodiment, each tile mates with a glide reflected version of itself, where the gliding can be parallel to either side of the rectangle.

Methods of Using the Tiles

There is no single correct way to use this invention. In fact, one of the main purposes of the invention is for the user to explore the different ways of combining the tiles on his or her own. The male and female coupling elements of the tiles have been designed so as to provide clues for the user to engage in tile placements in a structured way. While there are no hard and fast rules of operation, some suggestions on how to use the invention effectively are outlined below. The construction of the tiles through selection of the size, location and gender of the connecting elements and placement of the asymmetric stencils on the tiles directs the user to certain constructions that teach symmetry and preclude certain constructions as discussed further below.

Suggested Use, Version 1.

In this method of operation the user is guided to discover the various types of patterns he or she can make with the tiles while noting the relationships these patterns have with one another. While there is no mathematical prerequisite for seeing these relationships, the user schooled in abstract algebra will recognize the fact that the patterns derived from the "parent" pattern have symmetry groups that are subgroups of the symmetry group of the "parent" pattern. Following the steps below, the user can construct the complete set of 17 plane periodic patterns.

First, one starts with *632 as the "parent" pattern.

Step 1: The user is only permitted to work only with the tiles in FIGS. 2A and 2B. He is given an equal number of tiles of each type. He is asked to create a pattern such that each tile is adjacent to its complementary tile. The user will eventually come up with the pattern *632, shown in FIG. 8.

Step 2: The user is given an option of creating a pattern with a design and its mirror image or one without the mirror image. In the latter case, the simplest thing to do is to replace all the tiles that are identical to each other with the corresponding plain tiles. This results in the 632 pattern, as shown in FIG. 11. In the former case, the user can do one of two things. If he replaces every other equilateral triangle made of 2 tiles with a plain one (so that each 2-tile equilateral triangle with a design is surrounded by 3 plain equilateral triangles), he will obtain 3*3 (FIG. 10). On the other hand, if he replaces every other equilateral triangle made of 6 tiles with a plain one, he will obtain *333 (FIG. 9).

Step 3: Now the user is asked to take either 3*3 or *333 and replace all the tiles that are identical to each other with plain tiles. This will result in the pattern 333 (FIG. 12).

Now one starts with *442 as the "parent" pattern.

Step 4: Restrict the user to working only with the types of tiles in FIGS. 4A and 4B. He is to make a pattern such that each tile is adjacent to its complementary tile. The user will eventually come up with the pattern *442, shown in FIG. 13.

Step 5: The user is given an option of creating a pattern with a design and its mirror image or one without the mirror image. In the latter case, the simplest thing to do is to replace all the tiles that are identical to each other with the plain tiles in FIG. 5. This results in the 442 pattern (FIG. 17). In the former case, the user can do one of three things. The first option is to replace every other 4-tile square with one made of plain tiles. This will result in *2222 (FIG. 15). The second option is to replace every other 2-tile isosceles triangle with one made of plain tiles. This will give 4*2 (FIG. 14). The last option is for the user can replace every other 2-tile square with a blank one. This will result in 2*22, shown in FIG. 16.

Step 6: Starting with *2222, the user is asked to continue replacing patterned tiles with plain ones in the same vein as in Step 5. He will eventually come up with the remainder of the patterns: 2222, 22*, **, *X, XX, O, and 22X (FIGS. 18-24, respectively).

Stencil feature: At any point in the series of steps described above, the user is free to trace the pattern using the stencil capability of each tile. This can serve several purposes:

Each user can keep a record of his work, and subsequently compare the patterns she obtained with those of other users.

After tracing the pattern, the user can color it in 2, 3, or any prime number of colors to obtain new patterns. This topic is covered in (Conway, Burgiel, & Goodman-Strauss, The Symmetries of Things, 2008, pp. 135-169).

Suggested Use, Version 2.

In contrast with version 1, here the user starts out with fewer types of tiles and gradually increases the number of tiles available to her. This process guides her to discover the various features of the patterns and seeing how these features form an integral part of the Conway notation in (Conway, Burgiel, & Goodman-Strauss, 2008, pp. 15-49). This version provides another way to guide the user to construct the set of 17 plane periodic patterns.

Step 1: To begin with, the user is permitted to work only with the rectangular tiles shown in FIG. 6B.

(a) She is asked to make all possible repeating patterns using these tiles without flipping them over. This will result in patterns O and 2222, as shown in FIGS. 25 and 33. These patterns have symmetries involving only translations and rotations. They are essentially extensions of FIGS. 37A and 37B. Using just one type of rectangular tile without flipping it over corresponds to those patterns which, in the Conway notation, do not have any "X" or "*".

(b) The user is still restricted only to the tiles pictured in FIG. 6B, but now she is permitted to flip tiles over. This will result in the addition of the patterns XX and 22X, shown in FIGS. 27 and 32, respectively. X stands for "glide reflection". The user will experience glide reflections as she moves the tiles. Flipping over the tiles and sliding them (otherwise they will not mate with the other tiles) corresponds to patterns with an "X" (but without the "*") in the Conway notation.

Step 2: Now the user is permitted to work with tiles in FIGS. 6A and 6B, and she is permitted to flip the tiles over. She will obtain the patterns *2222, *X, **, 2*22, and 22*, shown in FIGS. 26 and 28-31, respectively. Working with both a tile and its complement corresponds to mirror reflecting, which is denoted with a "*" in the Conway notation.

Step 3: Now the user is permitted to work with tiles in FIGS. 2A and 2B. She follows Steps 1-3 in version 1 to construct the patterns *632, 632, 3*33, *333, and 333.

Step 4: The user is permitted to work only with the tiles in FIG. 4A and FIG. 4B. Following the Steps 4-6 in version 1 will enable her to construct the remaining patterns: *442, 4*2, and 442.

Suggested Use, Version 3.

In this version, the user needs to learn the notation for the 17 wallpaper pattern, as shown in FIG. 7. Then the invention can be used in a classroom or other group setting as a game for practicing identifying the notation. Here are some specific examples:

1) Each user is asked to make a pattern and also identify the patterns made by the other users.

2) Given a restricted set of tiles to work with, the user can be asked to make as many distinct patterns as he can with those tiles. He is then asked to determine which of his patterns are mathematically the same.

3) Given one of the 17 possible patterns and the complete set of tiles, the user is asked to make the pattern in as many different ways as possible.

Suggested Use, Version 4.

The plain tiles can be used by students learning basic geometry and trigonometry. For instance, given a set of tiles, a student can be challenged to find all the different shapes into which these tiles can be arranged. This is illustrated in FIGS. 38A and 38C. This exercise can be made more challenging by asking the student to find all the different ways in which the tiles can be arranged to make a given shape, as seen in FIG. 38B. In addition, a student can be asked to make a given shape with the tiles, such as, for example, a trapezoid shown in FIG. 38D. FIGS. 39A, 39B, 40A, 40B, 40C, and 40D and their detailed description illustrate how the tiles can be used to teach students some basic properties of important right triangles. FIGS. 37A, 37B, 37C, and 37D, along with their detailed description, show how the tiles can be used to teach the basic 4 symmetry types of translation, gyration, reflection, and glide reflection.

Tiles for Three-Dimensional Structures

The tiles described thus far can be fit together to make planar constructions. In the embodiments to follow a new connecting element is used with tiles shaped and sized similarly to those already described. The new connecting element enables construction of three-dimensional structures.

Figure 45:
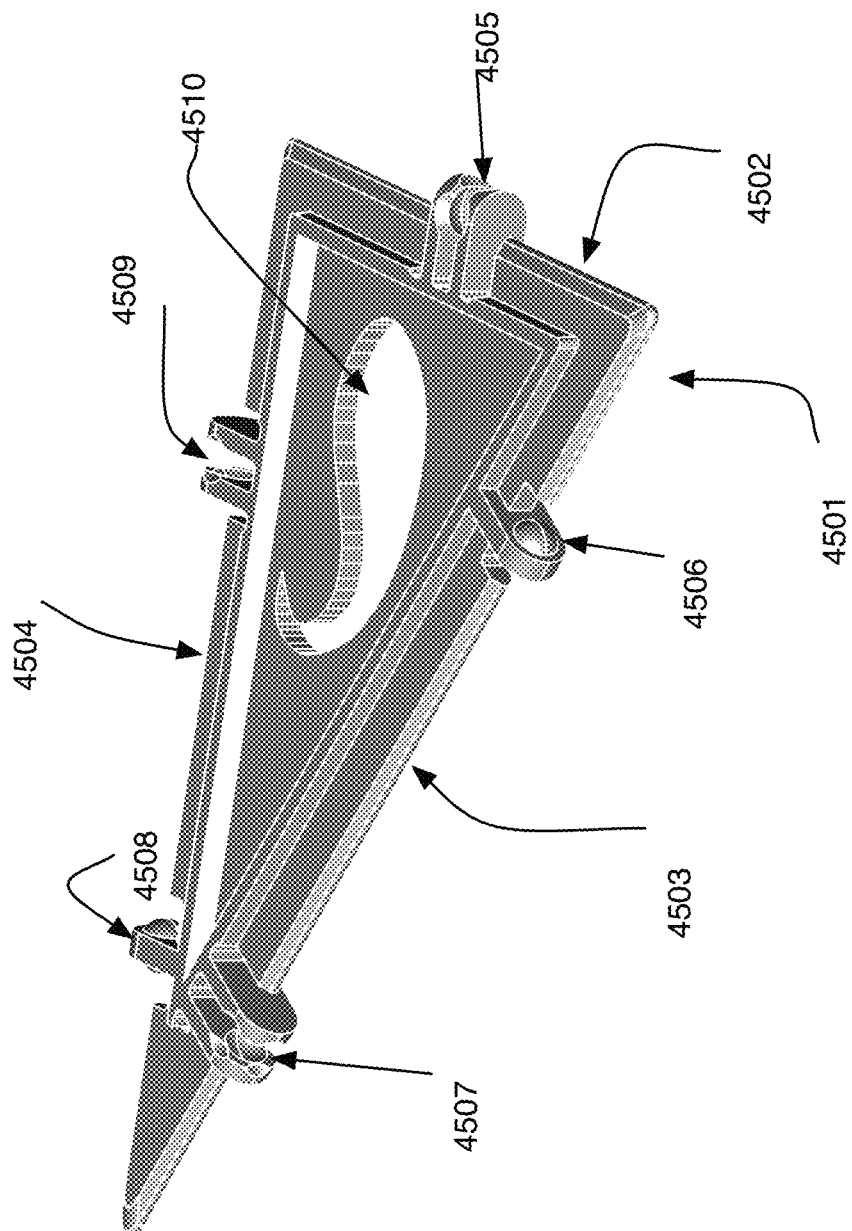
FIG. 45 shows an embodiment using ball and socket coupling elements.

Referring now to FIG. 45, a 30-60-90 right triangle tile 4501 is shown. The dimensions of the sides 4502, 4503, 4504 of the tile 4501 and the use of an asymmetric pattern 4510 on the tile are substantially the same as already discussed in conjunction with the tiles of FIGS. 1-3. The tile 4501 includes five connectors 4505, 4506, 4507, 4508, 4509. The first side of the tile 4502 includes a single connector 4505 that is shown as a female connector. The second side 4503 of the tile is the hypotenuse of the right triangle and includes a first connector 4506 that is a male connector and a second connector 4507 that is a female connector. The male connector 4506 is located nearer the first side 4502 or base of the right triangle. The third side 4504 of the tile includes two connectors 4508, 4509. The first connector 4508 is a male connector and the second connector 4509 located nearest the base 4502 of the right triangle is a female connector. A second embodiment of the 30-60-90 right triangle tile (not shown) is the complement of that shown in FIG. 45 where the gender of the five connectors 4505, 4506, 4507, 4508, 4509 is swapped for the opposite gender from that shown. That is, the complement of the tile shown in FIG. 45 is the same except that the connectors 4505, 4507, 4509 are changed to male connectors and the connectors 4506, 4508 are changed to female connectors. The difference between the tile shown in FIG. 45 and that shown in FIGS. 1-3 is that after being joined through attachment of two tiles through the connectors the tiles may be rotated out of the plane of connection due to the ball and socket nature of the connector elements.

Figure 47:
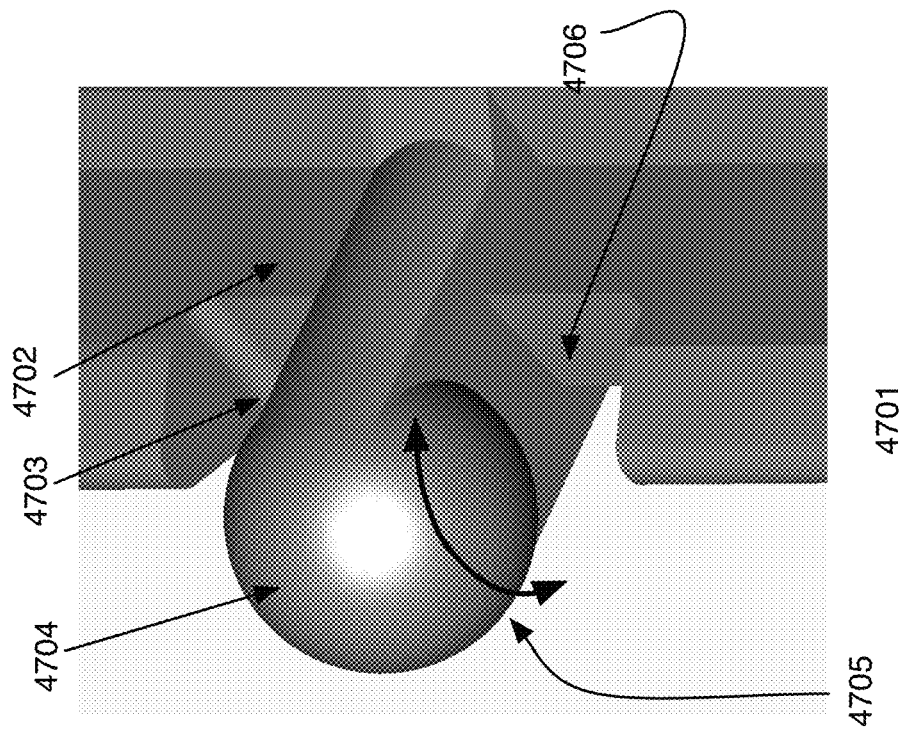
FIG. 47 is a close up view of the ball or male coupling element.
Figure 46:
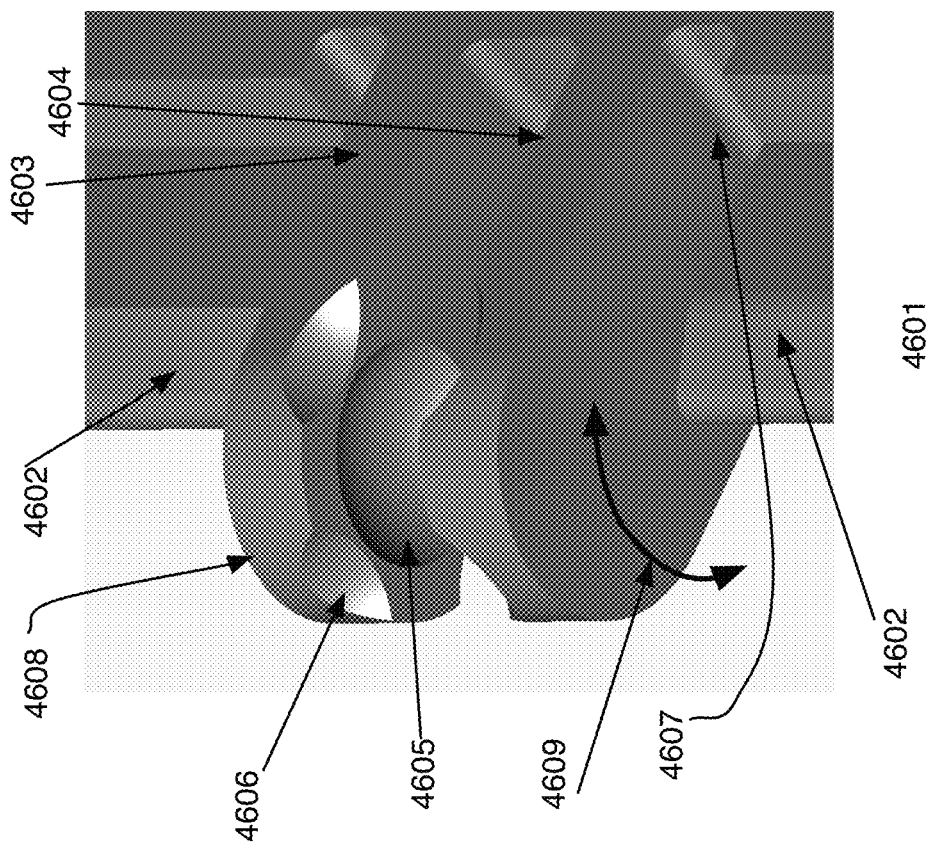
FIG. 46 is a close up view of the socket or female coupling element.

FIGS. 46 and 47 show close-up views of the connector elements. FIG. 46 shows a female connector element and FIG. 47 shows a male connector element. Referring to FIG. 46, the connector is molded into a ridge 4602 that is molded into the edge of the tile piece. The female connector element 4601 is comprised of a pair of supports 4603, 4604 that extend from a cutout 4607 in the ridge 4602 at the distal end 4608 furthest from the edge of the tile there are spherical impressions 4605 in the facing walls of the support elements 4603, 4604. Only the spherical impression 4605 in the first 4603 support element is seen in the view of the Figure. There is a corresponding spherical impression (not shown) in the other support element 4604. The size of the spherical impressions 4605 and the spacing of the support elements 4603 is selected so as to grip the sphere 4704 on the male connector element shown in FIG. 47. The grip is sufficient to removably hold two tiles together and at the same time allow rotation of the tiles in a direction 4609 that is perpendicular to the edge 4602. The support elements 4603, 4604 are flexible acting as springs that open to accept the male connector and the closing to grip the connector. The support elements further include at least one cutout 4606 that is sized and shaped to accept the spherical tip 4704 of the male connector and facility joining of the tiles through the connectors by guiding the male element into the female connector. In some embodiments a plurality of such cutouts 4606 is included. The example of FIG. 46 shows a connector with three such cutouts thereby making insertion of the male connector easier from the three different directions.

The corresponding rotatable male connector is shown in FIG. 47. The connector 4701 is comprised of a support 4703 that is molded into the edge 4702 of the tile within a cutout 4706. The distal end of the connector includes a spherical knob 4704 that mates with the spherical indentations 4605 of the female connector and once connected allows rotation of the connected parts in a direction 4705 perpendicular to the connected edges.

Figure 48:
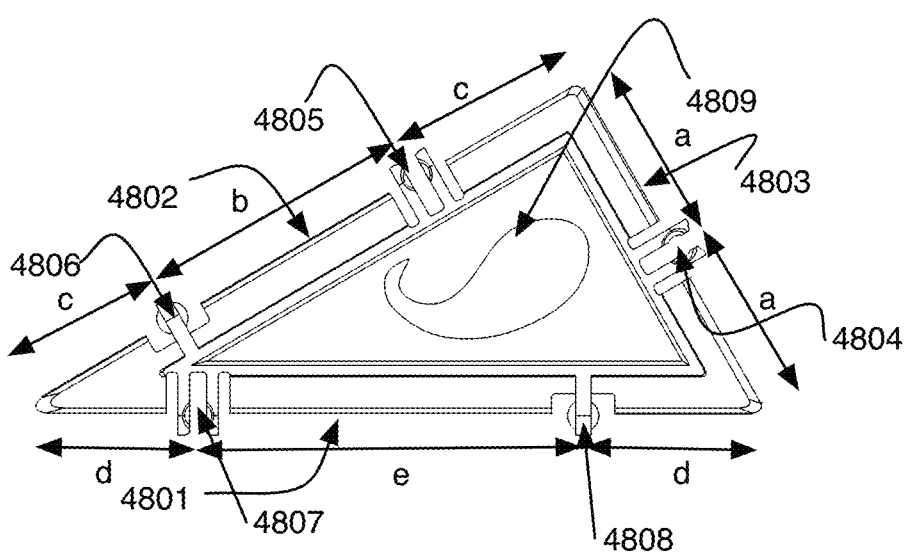
FIG. 48 is a top view of a 30°-60°-90° triangle tile with an asymmetric stencil and ball and socket coupling elements.
Figure 49:
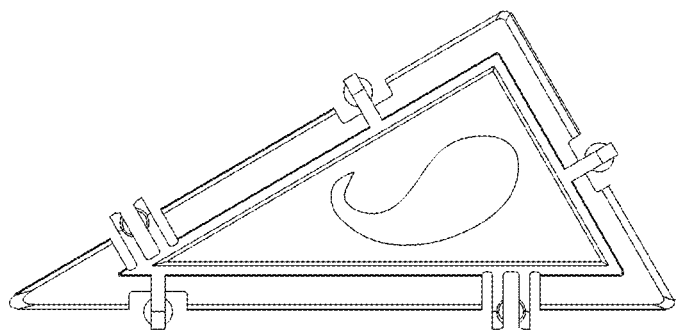
FIG. 49 is a top view of the complement tile to that of FIG. 48.
Figure 50:
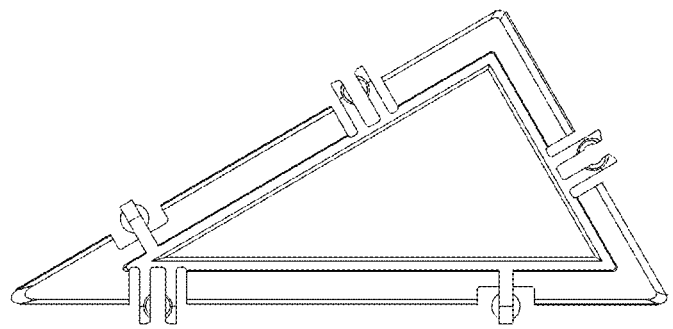
FIG. 50 is a top view of a 30°-60°-90° triangle tile with no stencil and ball and socket coupling elements.
Figure 51:
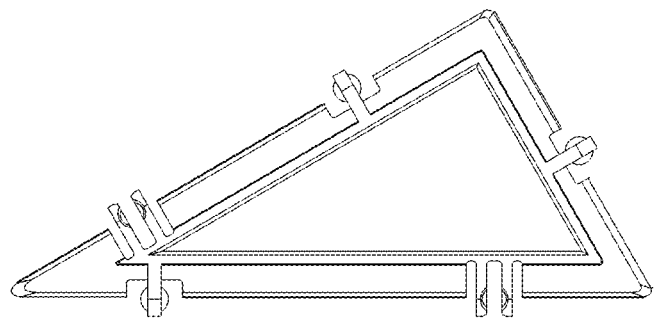
FIG. 51 is a top view of the complement tile to that of FIG. 50.

In a preferred embodiment, the dimensions of the 30-60-90 triangular tiles capable of making three dimensional figures by virtue of having the connectors shown in FIGS. 46 and 47 are the same as the tiles with the puzzle-like planar connectors already discussed. Referring to FIGS. 48-51 the 30-60-90 right triangle tiles are shown. The dimensions labeled a-e are the same as discussed in FIGS. 2 and 3. The tile in FIG. 48 is comprised of three sides 4801, 4802, 4803. The side 4803 is the base of the triangle and includes a single connector 4804 located at the midpoint of the base whose length is given by x and the distance a is the distance from the nearest apex to the midpoint of the connector and a=x/2. The length of the hypotenuse (2d+e) 4801 is equal to 2x and the distances d are x/2 and e=x. The dimension of the other leg 4802 is $\sqrt{3}x$ and b=x/2 and c=$(\sqrt{3}/2-1/4)x$, all the same as in FIGS. 1-3. FIGS. 49, 50, and 51 show other embodiments of the 30-60-90 triangular tile of FIG. 48. The tile of FIG. 49 is the complement of that shown in FIG. 48. The tiles in FIGS. 50 and 51 omit the asymmetric design 4809 and are the complements of one another.

Figure 52:
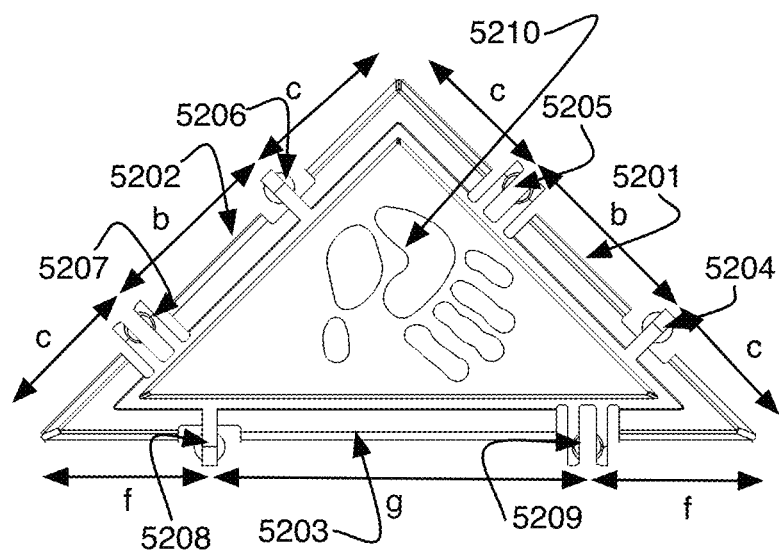
FIG. 52 is a top view of an isosceles right triangle tile with an asymmetric stencil and ball and socket coupling elements.
Figure 53:
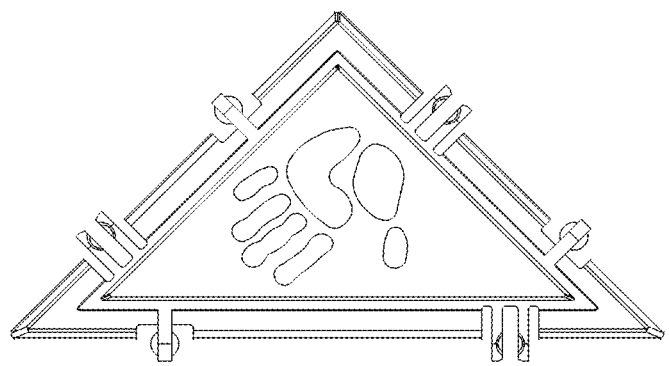
FIG. 53 is a top view of the complement tile to that of FIG. 52.
Figure 54:
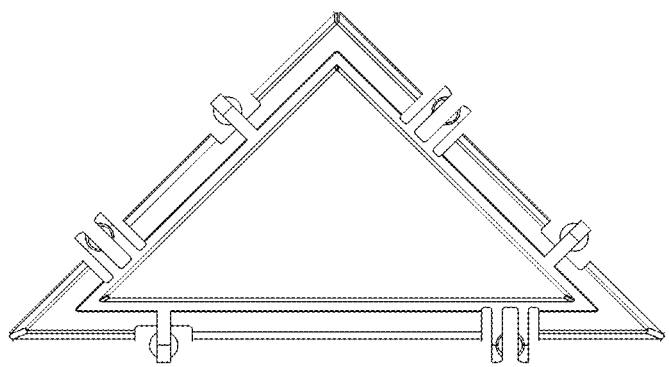
FIG. 54 is a top view of an isosceles right triangle with no stencil and ball and socket coupling elements.

FIGS. 52-54 show isosceles right triangle embodiments that include the connectors of FIGS. 46 and 47. The dimensions are the same as discussed in FIGS. 4A, 4B and 5. The triangle includes a first edge 5201 that is a leg of the triangle and has a length equal to $\sqrt{2}x$. There are two connectors 5204, 5205 on the first edge one 5204 is male and the other 5205 is female. The connectors are spaced a distance b apart, b=x, where x is the length of the shorter leg of the 30-60-90 right triangle already discussed. The distance c from the vertex to the center of the connector is, as before, c=$(\sqrt{3}/2-1/4)x$. The hypotenuse 5203 has a length equal to 2x and the dimensions f and g are the same as already discussed in FIGS. 4 and 5. That is f=$\sqrt{6}x/4$ and g=2f=f=$\sqrt{6}x/2$. The hypotenuse includes two connectors 5208, 5209, one male 5208 and the other female 5209. The second leg 5202 has the same dimensions as the first leg 5201. The second leg also includes two connectors 5206, 5207 with one male 5206 and one female 1207 connector. The tile includes an asymmetric pattern 5210 in the face of the tile. In the preferred embodiment the asymmetric pattern is a stencil cut through the tile. FIG. 53 shows the complement of the tile shown in FIG. 52. FIG. 54 shows a tile equivalent to either of the tiles in FIG. 52 or 53 but with no asymmetric pattern in the middle. Note since the tile is symmetric, that is the two legs are the same length, the tile of FIG. 54 has no complement. Asymmetry is required for a tile to have a complement. The pattern 5210 is required for the tile of FIG. 52 to have a complement in that shown in FIG. 53.

Figure 55A:
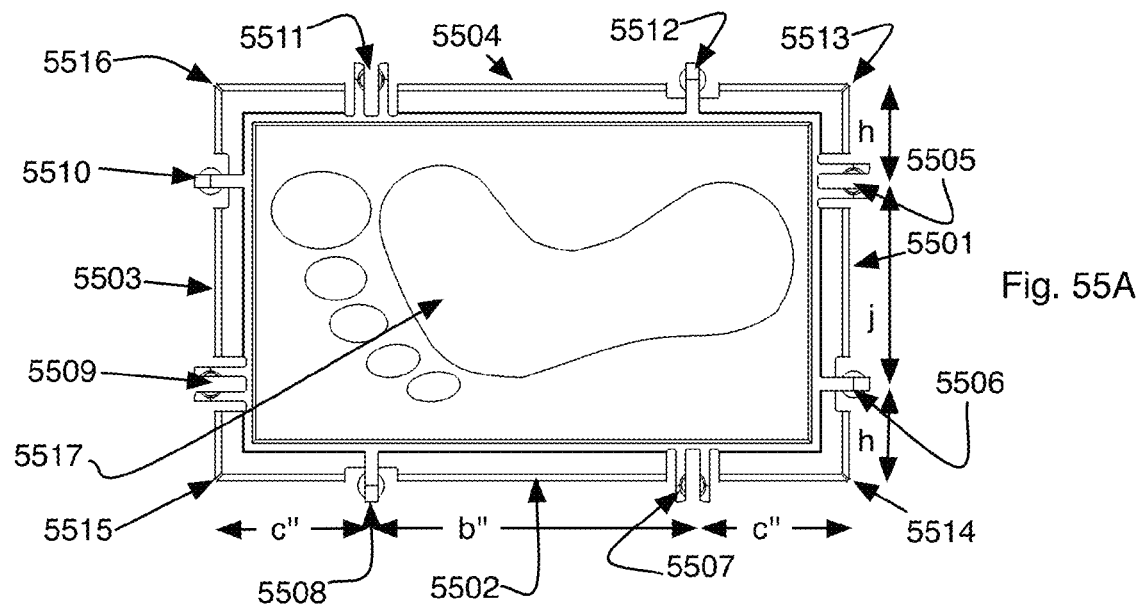
FIG. 55A is a top view of a rectangular tile with an asymmetric stencil and ball and socket coupling elements.
Figure 55B:
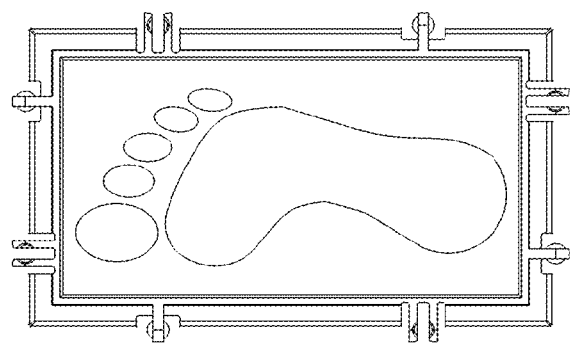
FIG. 55B is a top view of a complement tile to that of FIG. 57A.
Figure 56:
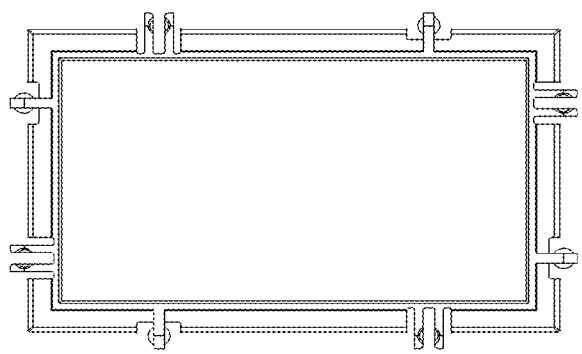
FIG. 56 is a top view of a rectangular tile with no stencil and ball and socket coupling elements.

FIGS. 55A, 55B and 56 show rectangular tiles using the connectors of FIGS. 46 and 47. Referring to FIG. 55A, the rectangular tile using the connectors 5505, 5506, 5507, 5508, 5509, 5510, 5511, 5512 of FIGS. 46 and 47 enables tiles connected to be rotated in a direction perpendicular to the plane of the tile. The dimensions b", c", h, j are the same as discussed earlier in conjunction with FIGS. 6A and 6B. The rectangular tile has four sides 5501, 5502, 5503, 5504 with two connectors in each side, one male 5506, 5508, 5510, 5512 and one female 5505, 5507, 5509, 5511. In one embodiment, the length of the long sides 5502, 5504 of the rectangle is 2x where x is the length of the short leg of the 30-60-90 triangle. The length of the short edge 5501, 5503 can be any dimension >0 and less than 2x, where the minimum length (>0) is selected for ease of handling of the tile. In a preferred embodiment the ratio of the length, 2x or 2c"+b" to the width 2h+j is the golden ratio or $(1+\sqrt{5})/2$. The tile further includes an asymmetric pattern 5517 in the tile face. In a preferred embodiment the asymmetric pattern 5517 is a stencil cut through the face of the tile. The rectangular tiles using the connectors of FIGS. 46 and 47 further include a tile that is the complement of that shown in FIG. 55A and is shown in FIG. 55B and a tile shown in FIG. 56 that is the same as that in FIG. 55A but excludes the asymmetric pattern 5517.

Figure 57A:
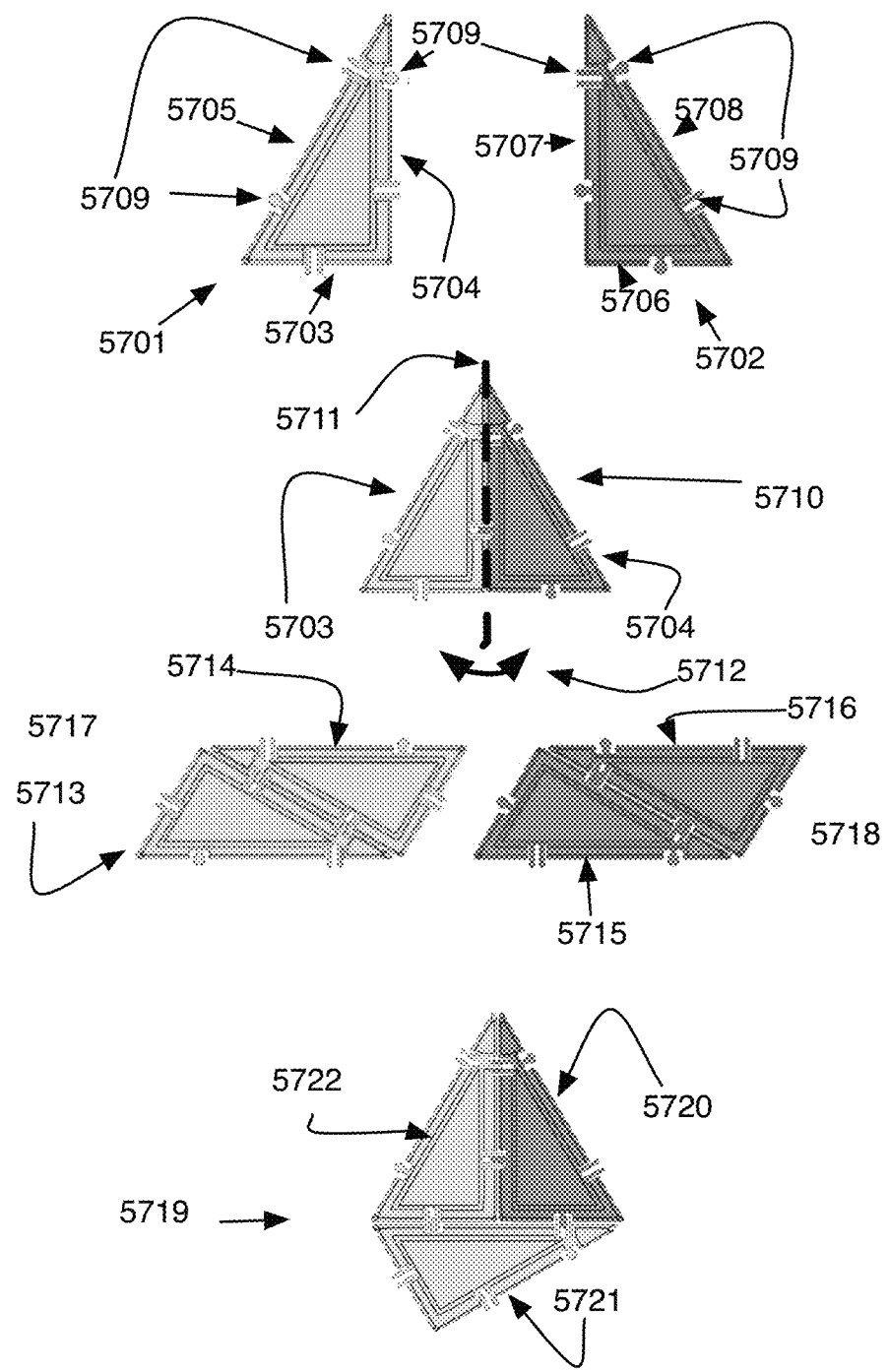

The gender and location of the connector elements on the tiles is selected to enable and also limit the ways the tiles may be joined together. This is shown in FIGS. 57-60. Referring to FIG. 57, a 30-60-90 triangular tile 5701 and its complement 5702 are shown. In one embodiment, the details of the tiles are as already discussed. In another embodiment, more general, the dimensions of the tiles and the locations and genders of the connector elements 5709 (not all are labeled) are selected to enable and also limit certain connection options. The tiles are joined together by mating male connector elements with female connector elements that align along one of the three edges 5703, 5704, 5705, 5706, 5707, 5708 of each triangle. A first allowed connection is shown 5710 where a first tile 5703 and its complement 5704 are joined along the longer leg of the 30-60-90 triangle. The male connectors on the tiles mate with the female connectors on the tiles to join the tiles along the edge 5711. The tiles include the connectors as discussed in FIGS. 46 and 47 and the tiles once joined may be individually rotated 5712 along the axis 5711 out of the plane of the paper. The nature of the connectors requires that male connectors mate with female connectors. Connectors of the same gender cannot be mated together thereby precluding certain configurations of joining the tiles. There are a number of these not allowed configurations all are not enumerated here but are easily seen as any configuration that would require mating of connectors of the same gender. As an example one could not join the short edge 5703 of the tile 5701 with the short edge of an identical tile since this would require mating of two female connector elements. A piece 5717 shows a joining of two identical tiles 5713, 5714 along the long leg of the 30-60-90 triangular tile. Similarly 5718 shows joining of two tiles 5715, 5716 that are the complements of the first tiles 5713, 5714. The pieces formed 5717, 5718 are themselves complements of one another.

The next view 5719 shows three tiles 5720, 5721, 5722 joined together. The top tiles 5720, 5722 are the same as the piece 5710 it is seen that the length of the long leg of the 30-60-90 right triangle and the location of the connectors along that leg allow connection to the short legs of the tiles 5720, 5722.

FIG. 57B shows additional views of allowed joining of the tiles. The first view 5723 shows joining of two 30-60-90 triangular tiles that are the complements of one another along the hypotenuse. View 5724 shows that two complementary 30-60-90 triangular tiles may be joined along their short legs. Views 5725 and 5726 show joining of identical 30-60-90 triangular tiles along their hypotenuse to form two different rectangular pieces.

Figure 58:
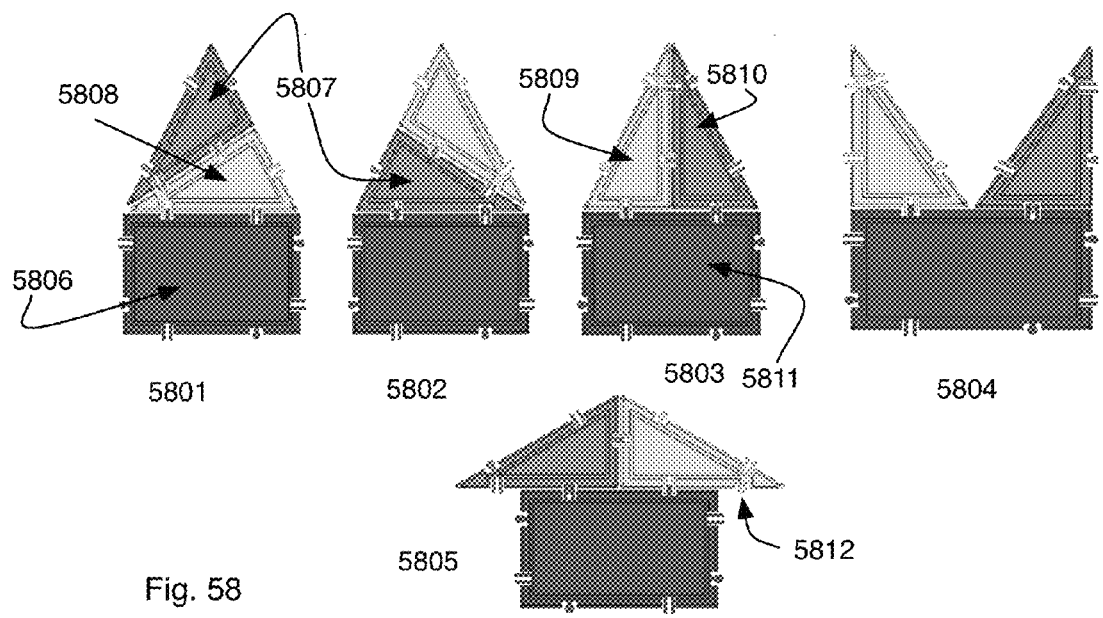
FIG. 58 shows ways that the 30-60-90 triangles fit together with the rectangular tiles.
Figure 59:
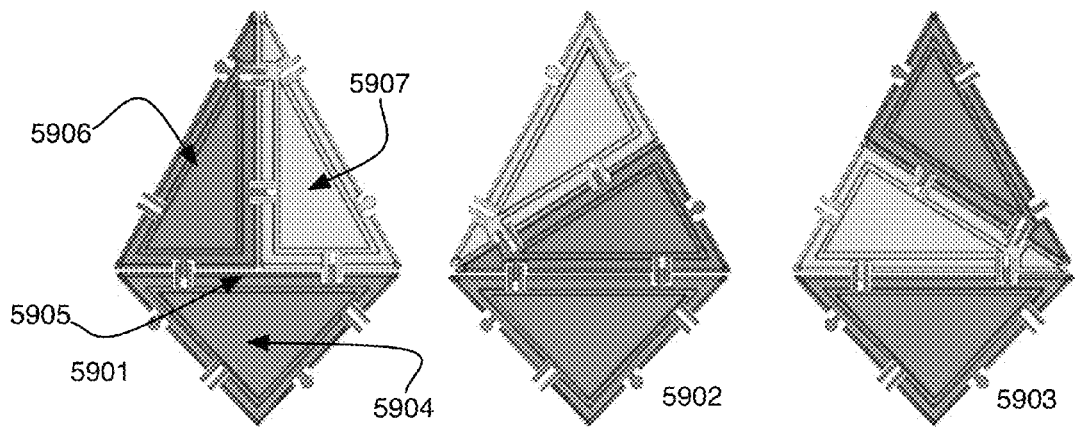
FIG. 59 shows ways that the 30-60-90 triangular tiles fit together with the equilateral triangular tiles.

FIG. 58 shows the ways to join a 30-60-90 right triangular tile to a rectangular tile and FIG. 59 shows the ways with the current design of joining 30-60-90 triangular tiles to isosceles triangular tiles. In all of the examples shown the tiles include the connectors of FIGS. 46 and 47 so that the joined tiles may be rotated perpendicular to the joined edges.

Referring to FIG. 58 in the first view 5801 it is seen that the length of the hypotenuse of the 30-60-90 triangular tile 5808 is the same length and the connectors align in location and with appropriate gender for making a connection with the long edge of the rectangular tile 5806. A second 30-60-90 triangular tile 5807. The next view 5802 shows the complementary tile 5807 attached to the rectangular tile. The next view 5803 shows two complementary 30-60-90 triangular tiles 5809, 5810 joined together via the long leg of the triangle and then the adjoined short legs now having a length of 2x joined to the long edge of the rectangle also having a length 2x. Again the gender and placement of the connectors enables such a union of the tiles. The next view 5804 shows the 30-60-90 triangles joined to the rectangular tile but the triangular tiles are flipped and not joined to one another. The next view 5805 shows a fifth way to connect the 30-60-90 triangular tiles and the rectangular tile. Note that this is not considered a valid connection even though there is overlap because it is not possible to attach another tile in the overhang region 5812 and form a plane filling structure.

Similarly FIG. 59 shows three connections between the 30-60-90 triangular tiles and the isosceles triangular tile. The length of the hypotenuse 5905 of the isosceles triangular tile is equal to 2x where x is the length of the shorter leg of the 30-60-90 triangular tiles 5906, 5907 the length of the edges and the location of the connectors on both the 30-60-90 triangular tiles and the isosceles triangular tile enable the connection as shown. Similarly and for the same reasons the hypotenuse of the 30-60-90 triangular tile may be adjoined to the hypotenuse of the isosceles triangular tile as shown in the other two views 5902, 5903.

FIG. 60 shows two ways the 30-60-90 triangular tiles may be joined to form a square structure. The first view 6001 shows a square formed from a first version of the tiles and the second view 6002 shows a square formed using tiles that are the complements of those shown in the first view. The squares thus formed are known in the art as a teaching tool to prove the Pythagorean theorem.

Figure 61A:
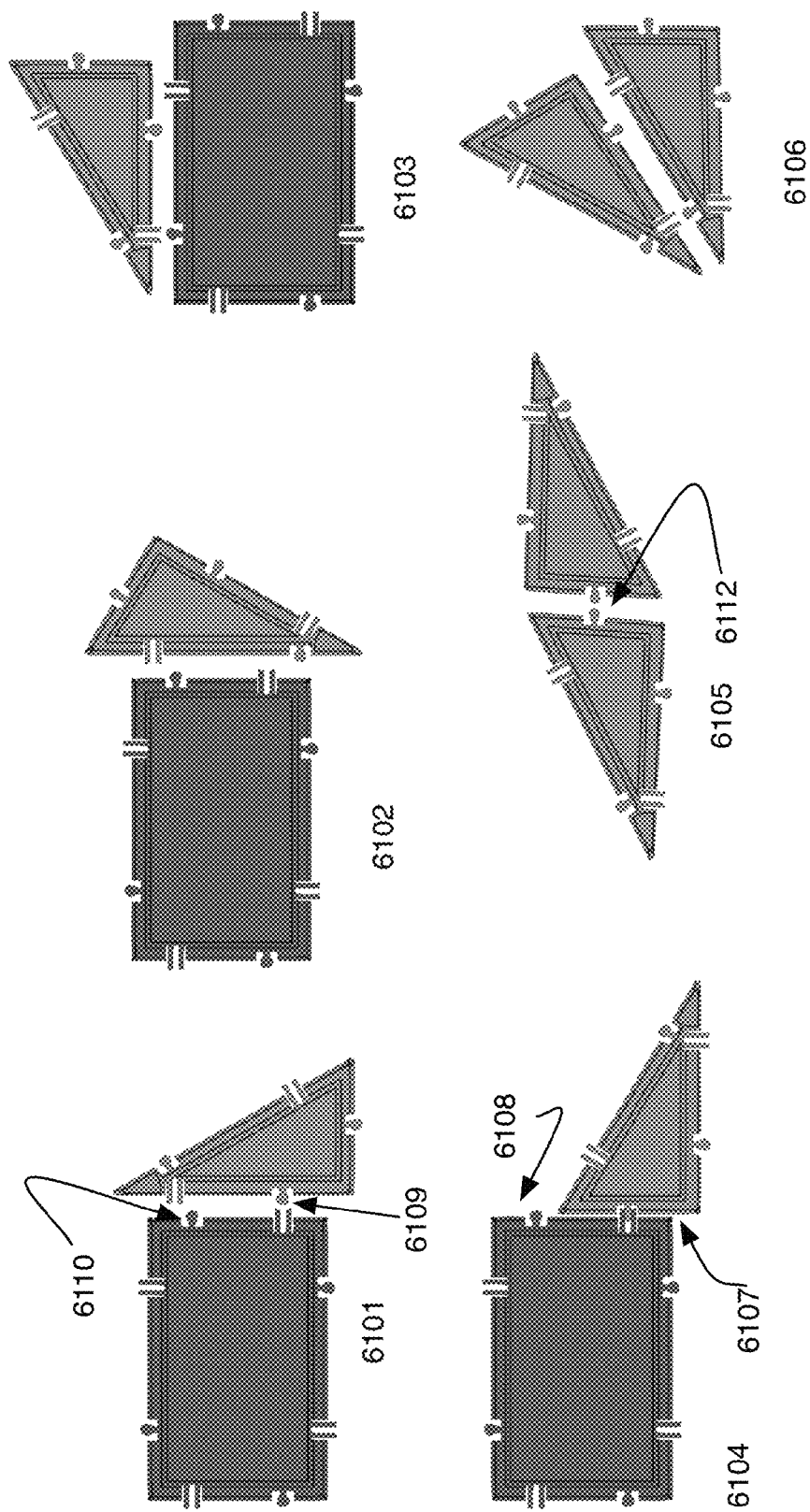
FIG. 61A shows how the size of the tiles and the selected placement of the coupling elements preclude certain connections between the tiles.

The size of the tiles and placement and gender of the connector elements also preclude many ways that the tiles may be interconnected. Non-limiting examples are shown in FIGS. 61A and 61B. In FIG. 61A it is shown that the rectangular tile and the 30-60-90 triangular tile do not fit together in the configurations shown in the six views 6101-6106. In the case of the view 6104 a pair of single connectors may be joined but the gaps at either end 6107, 6108 are not sized to allow connections to additional tile elements. In other cases if one pair of connectors with the appropriate gender difference align 6109 then the other connector elements do not align 6110. In another case 6105 the edges tiles may be appropriately sized but the connector elements 6112 preclude joining because they are of the same gender.

FIG. 61B shows several ways that two 30-60-90 triangular tiles may be joined to form particular structures and joinings that are precluded. The top views 6113, 6114 show a 30-60-90 triangular tile and its complement. The long edge of the 30-60-90 triangular tile was shown in FIG. 57 to be able to be joined with the long edge of an identical tile to form a parallelogram structure (FIG. 57 item 5717). The long edges of the 30-60-90 triangular tiles may not be joined to form another triangular piece as shown 6115 because the connectors of the same gender align and preclude connections. However the long edges of the complementary tiles 6113, 6114 can be joined to form a new triangular structure 6116. The structure thus formed is the repeating unit shown when creating the 333 symmetry tiling shown in FIG. 12. Precluding the first triangular structure 6117 and allowing the second structure 6118 guides the user to using the tiles to make the 17 plane repeating patterns already discussed. Similarly the hypotenuses of identical tiles may not be joined to form a Penrose kite 6117, but the hypotenuses of complementary tiles may be joined to form a Penrose kite 6118. The structure produced 6118 is the repeating cell for the 3*3 tiling pattern shown in FIG. 10. Again allowing certain patterns 6118 and precluding others 6117 guides the user to using the tiles to creating all 17 plane repeating symmetry types. Similarly complementary triangles may not be joined along their hypotenuses to form a rectangle 6119. But identical tiles may be joined along their hypotenuses to form a rectangle 6120. Note that the complementary tiles are identified by coloration in FIG. 61B. In order to create the 17 plane periodic patterns an asymmetric aspect must be included in the tiles. Otherwise all of the patterns shown in FIGS. 8 through 12 would be identical. It is the introduction of the asymmetric pattern on the tiles that enables creation of all 17 plane periodic structures. Also note that the asymmetric patterns on the tiles are identical. This is required in order for particular symmetry operations that identify the plane periodic structures to be present. That is the definition and identification of the plane periodic patterns imply presence of certain symmetry operations such as a rotation, translation or glide plane, without the identical asymmetric pattern on each of the tiles these symmetry operations are not present in the patterns shown in the structures shown in FIGS. 8-36. Therefore embodiments of the invention include the tiles as already described and an asymmetric pattern on some of the tiles, also as already described wherein the asymmetric patterns on some of the tiles are identical in shape and location.

The Tiles described thus far can form all 17 plane periodic patterns and by virtue of using the connectors of FIGS. 46 and 47 the tiles can in addition form many three-dimensional structures by rotating the connected tiles perpendicular to the connected edge and making additional connections to make many three-dimensional structures. Exemplary structures are discussed in conjunction with FIGS. 66-86. However some of the structures require additional tiles, which are discussed first.

Figure 62:
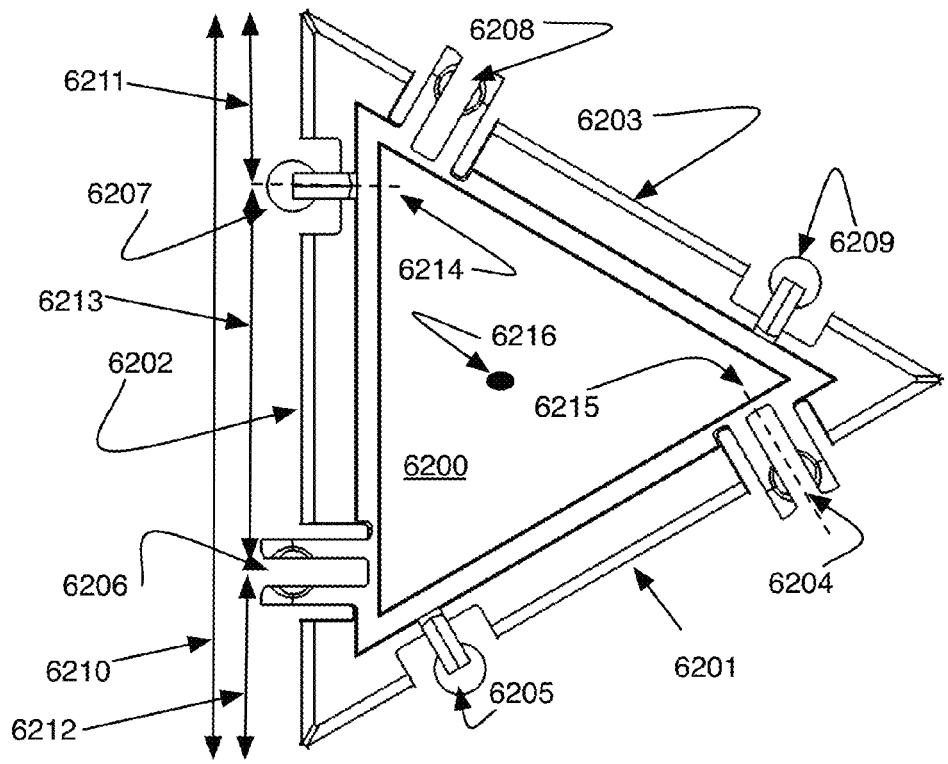
FIG. 62 is a top view of an equilateral triangular tile with ball and socket coupling elements.

In another embodiment shown in FIG. 62 an equilateral triangle 6200 is added to the set of tiles. The triangle has three sides 6201, 6202, 6203 all of equal length 6210. The tiles include connectors 6204, 6205, 6206, 6207, 6208, 6209 with two connectors one male 6205, 6207, 6209 and one female 6204, 6206, 6208 on each side. The center lines 6214, 6215 of the connectors on each side are spaced a distance 6213 apart and a distance 6211, 6212 from the vertices. The "centerline" as shown in this figure applies to all of the connectors in this application. That is all of the connectors are symmetrical and have a centerline as shown here even if not labeled as such in previous figures. All distances related to connectors are measured from the centerlines of the connectors. In a preferred embodiment the distance 6213 is one half the length of the side 6210 and the distances 6211, 6212 are ¼ the length of the side 6210 and the length of the side 6210 is equal to the length of the shorter edge of the rectangle shown in FIGS. 55A, 55B and 56 that is the lengths 6211, 6212 are the same as h in FIG. 55A and the length j in FIG. 55A is the same as the separation 6213. The center point 6216 is a three-fold rotation axis.

Figure 63:
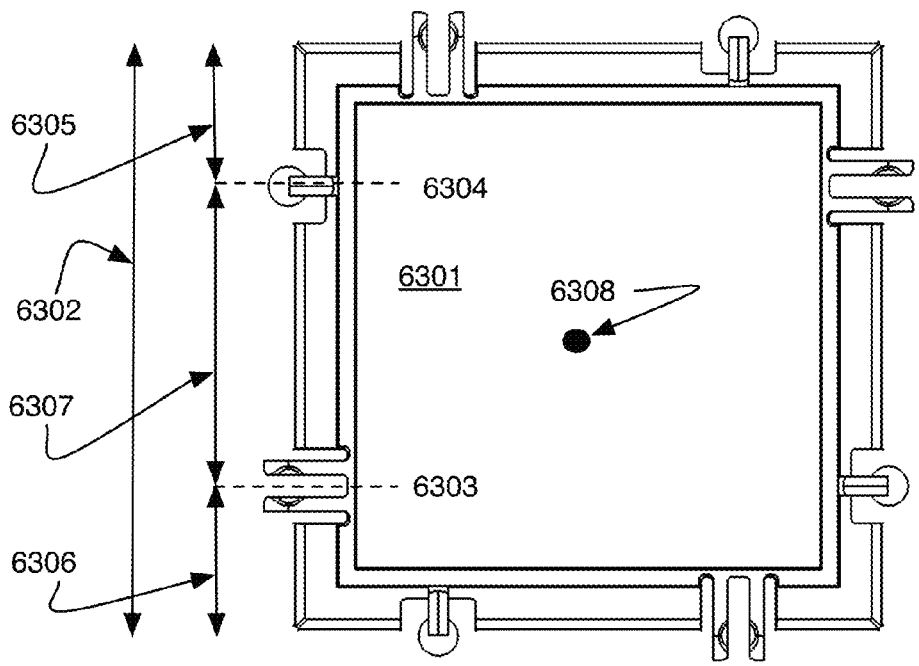
FIG. 63 is a top view of a square tile with ball and socket coupling elements.

Another embodiment shown in FIG. 63 includes a square tile 6301. The tile has four sides of equal length 6302 and each tile includes a pair of connectors (not labeled), one male and one female. The centerlines 6303, 6304 of the connectors in each side are separated by a distance 6307 and are located distances 6305, 6306 from the nearest corners. In the preferred embodiment the distance 6307 is one half of the length of the side 6302 and the distances 6305 are ¼ of the length 6302 and the length 6302 is the same as the length 6210 of the equilateral triangle of FIG. 62 and thus the edge of the equilateral triangle of FIG. 62 may be joined to the edge of the square 6301 and both may be joined with the short edge of the rectangle of FIGS. 55A, 55B and 56. The center point 6308 is a four fold rotation axis.

Figure 64:
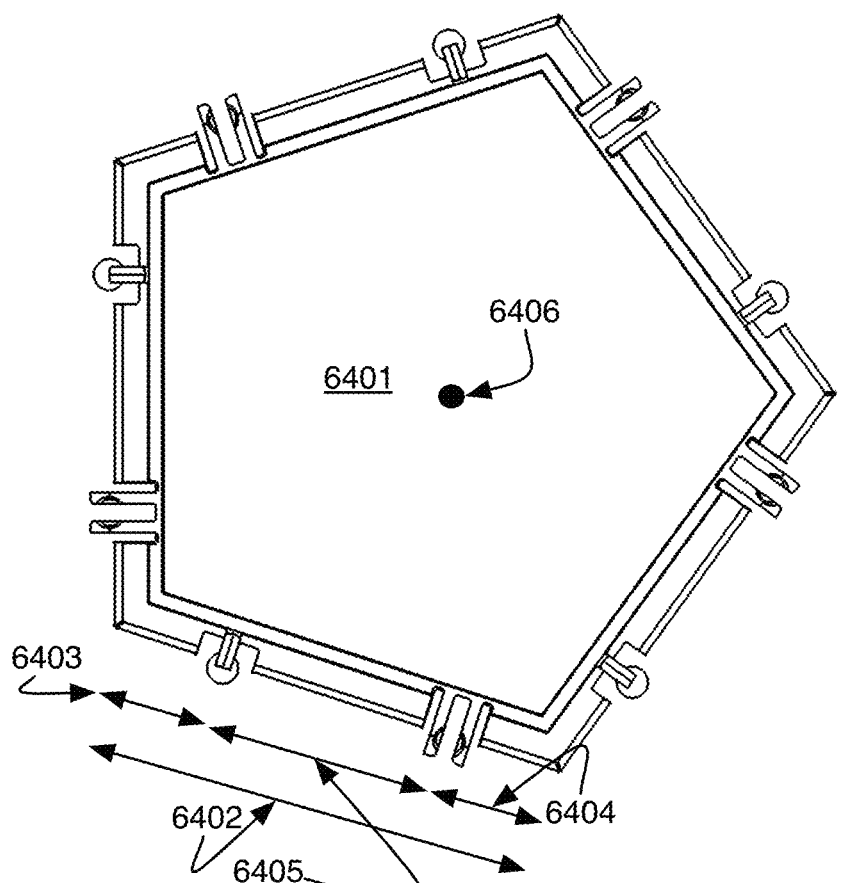
FIG. 64 is a top view of a pentagonal tile element with ball and socket coupling elements.

Another embodiment shown in FIG. 64 further includes a pentagonal tile 6401. The tile has five sides (not labeled) of equal length 6402 and two connectors, one male and one female, are included in each side the centerline of the connectors are spaced a distance 6405 apart and are located a distance 6403, 6404 from the nearest vertex. In the preferred embodiment the distance 6402 is the same as the length of the edge of the triangle 6210 and the length of the side of the square 6302 and the length of the short edge of the rectangle (2h+j) of FIGS. 55A, 55B and 56. Thus all these edges having the same length have connectors located such that the edges may be joined with male connectors fitting into female connectors. The center point 6406 is a five-fold rotation axis.

Figure 65:
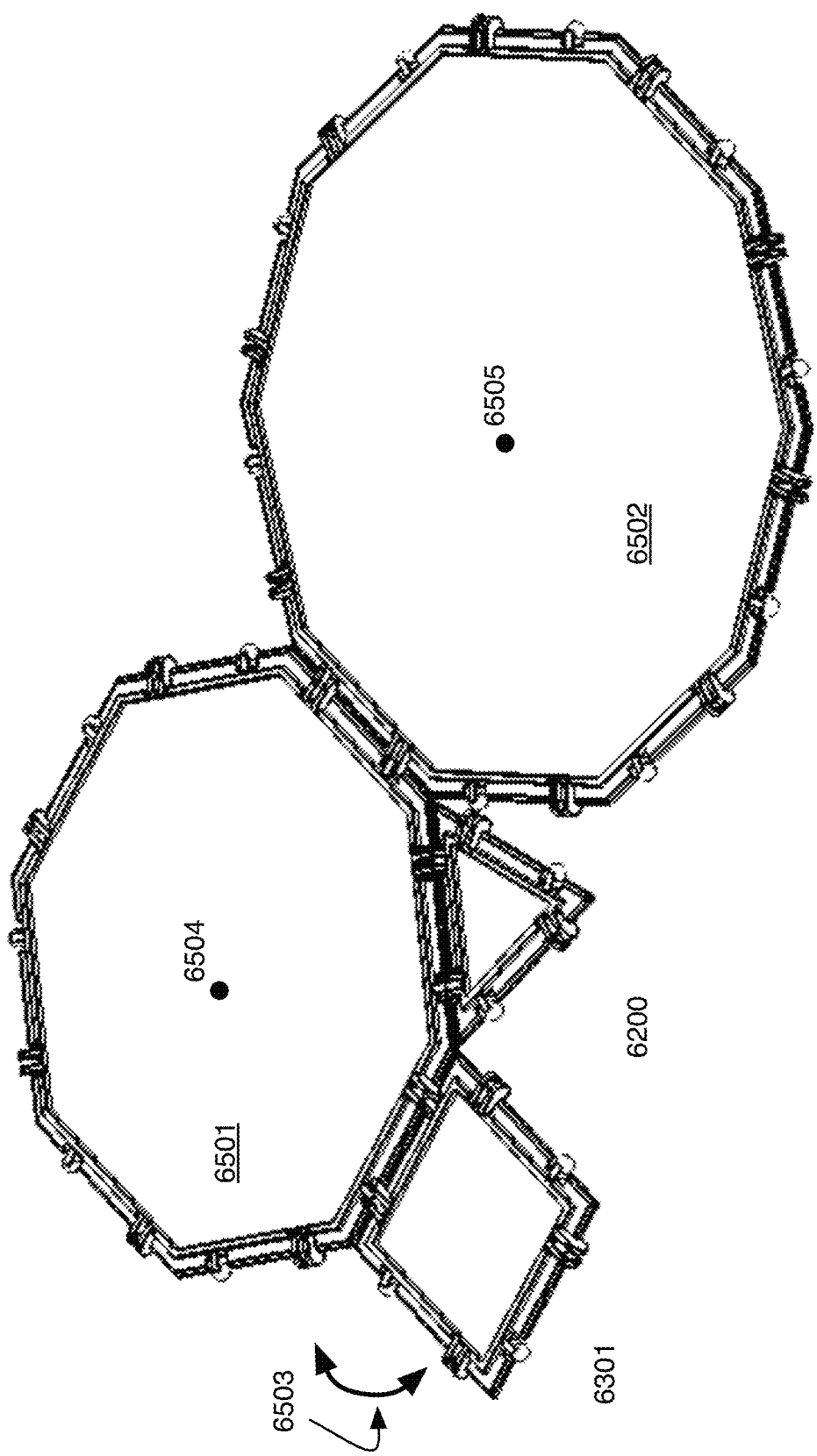
FIG. 65 are a top view of a hexagonal, decagonal square and equilateral triangle and their fitting together.

Another embodiment shown in FIG. 65 further includes an octagonal tile 6501 and a decagonal tile 6502. Also shown are the tiles fitting with the equilateral triangle tile 6200 of FIG. 62 and the square tile 6301 of FIG. 63. The lengths of the edges of the octagonal tile 6501 and the decagonal tile 6502 are the same as for the tiles 6200, 6301 already discussed in detail at least twice. The same is true for the location of the connectors on each edge (two connectors one male, one female) and the spacing of the connectors. The lengths of the edges and the location of the connectors allow all four types of tiles to be joined together as shown. The tiles will also connect to the short edge of the rectangular tile (not shown in this Figure) of FIGS. 55A, 55B and 56. All of the tiles show utilize the ball and socket connectors described in FIGS. 46 and 47 thereby allowing joined tiles to be rotated 6503 and when rotated make additional connections to other tiles as will be discussed in following figures to create three dimensional structures. The center point 6504 of the octagonal tile is an 8-fold rotation axis and the center-point 6505 of the decagonal tile is a 10-fold rotation axis.

Three Dimensional Structures

Figure 66:
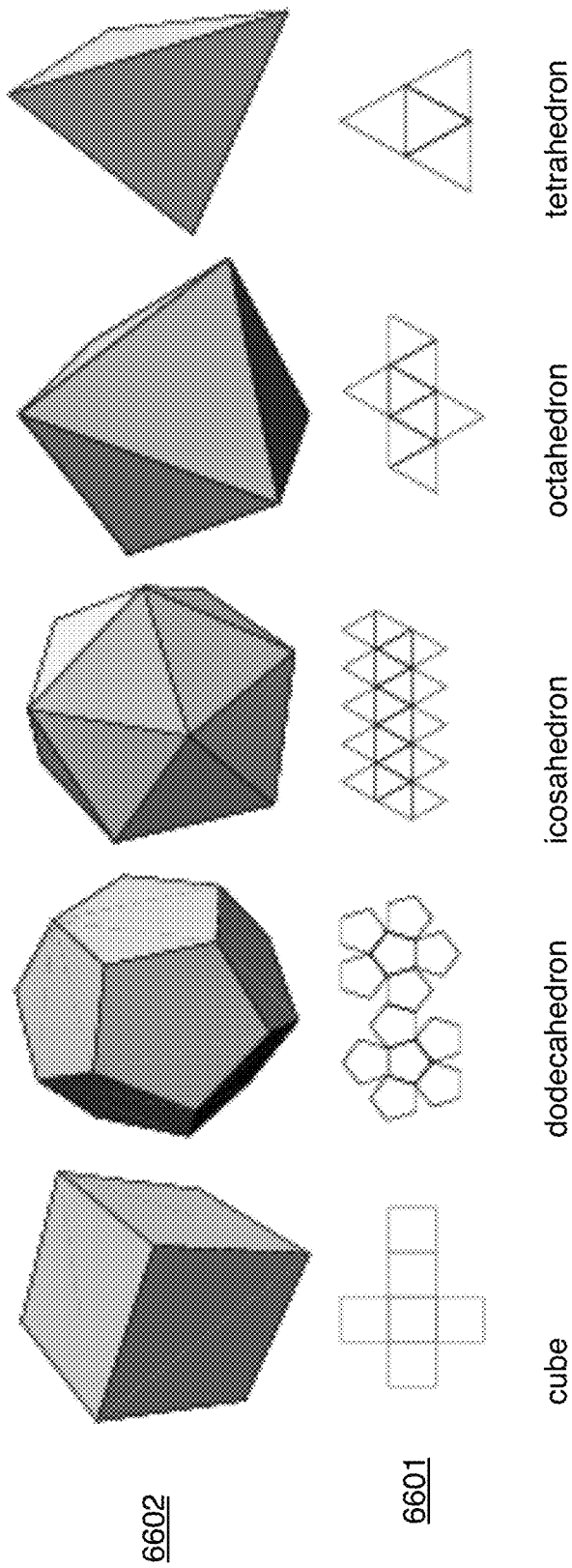
FIG. 66 is a prior art image showing the five platonic solids and the corresponding net diagrams for each.
Figure 67A:
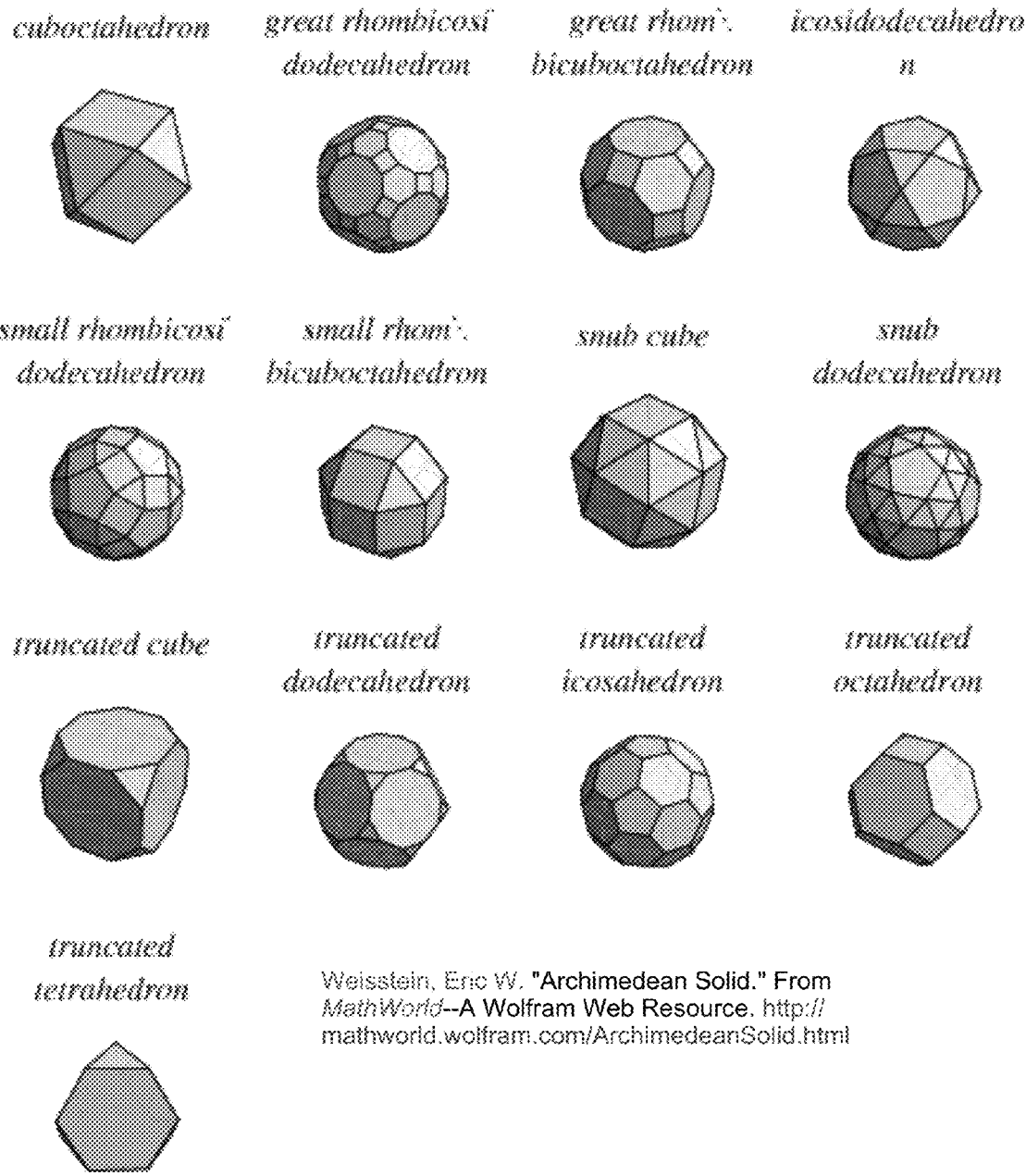
FIG. 67A is a prior art image showing the 13 Archimedean solids.
Figure 67B:
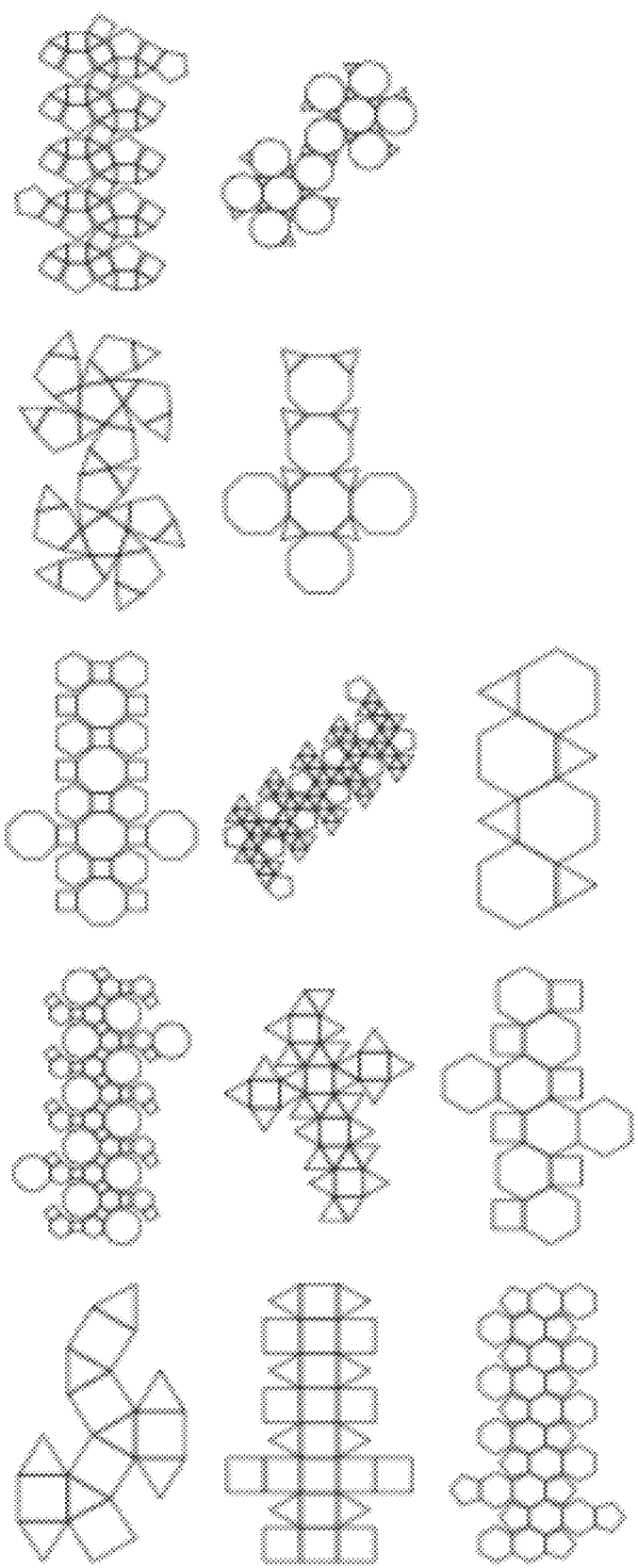
FIG. 67B is a prior art image showing the net diagrams for the 13 Archimedean solids.

FIG. 66 shows a prior art image of three dimensional figures that can be constructed from the invented set of tiles (see Weisstein, Eric W. "Platonic Solid." From *Math-World*—A Wolfram Web Resource. http://mathworld.wolfram.com/PlatonicSolid.html visited Jan. 19, 2015). In one embodiment a set of tiles includes a square tile, a pentagonal tile, an equilateral tile. Each of the tiles include the connectors as described in FIGS. 46 and 47 such that the tiles may be joined to form the complete set of Platonic solids as shown in FIG. 66. Another goal of the invention as a learning tool is to be able to create the set of Archimedean solids (see Weisstein, Eric W. "Archimedean Solid." From *MathWorld*—A Wolfram Web Resource. http://mathworld.wolfram.com/ArchimedeanSolid.html visited Jan. 19, 2015) The structures are shown in FIG. 67A and the corresponding net diagrams are shown in FIG. 67B (see Weisstein, Eric W. "Archimedean Solid." From *MathWorld*—A Wolfram Web Resource. http://mathworld.wolfram.com/ArchimedeanSolid.html).

Use of the tiles to teach the construction of the Platonic and Archimedean solids includes selection of an appropriate set of tiles to create the net diagrams 6601 for the Platonic solids and then rotating the tiles along the interconnected edges and joining further edges to finally create the Platonic solids 6602 themselves.

Similarly an embodiment includes a method of teaching the construction of the Archimedean tiles by first selecting a set of tiles appropriate to create the net diagrams of FIG. 67B and once constructed rotating the joined edges and connecting additional edges as they meet in rotation to create the finished Archimedean solids of FIG. 67A. FIGS. 68A through 72B show how to use a set of tiles as described above to make all of the Platonic solids.

Figure 68A:
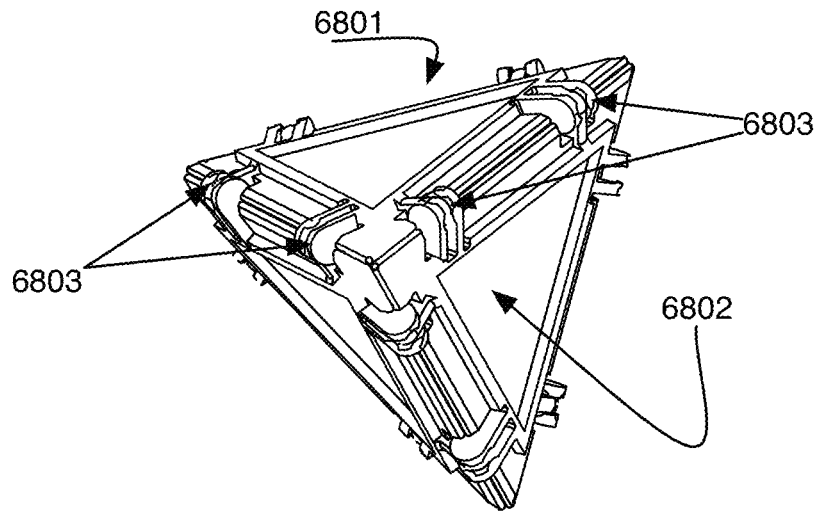

Referring to FIG. 68A, a tetrahedron 6801 is constructed using three of the equilateral triangular tiles 6802 already described in detail. The connectors 6803 enable rotation rotate along the joined edges and connections along multiple edges in different planes to create the three dimensional structure as shown. The location of the connectors ensures alignment in three dimensions.

Figure 68B:
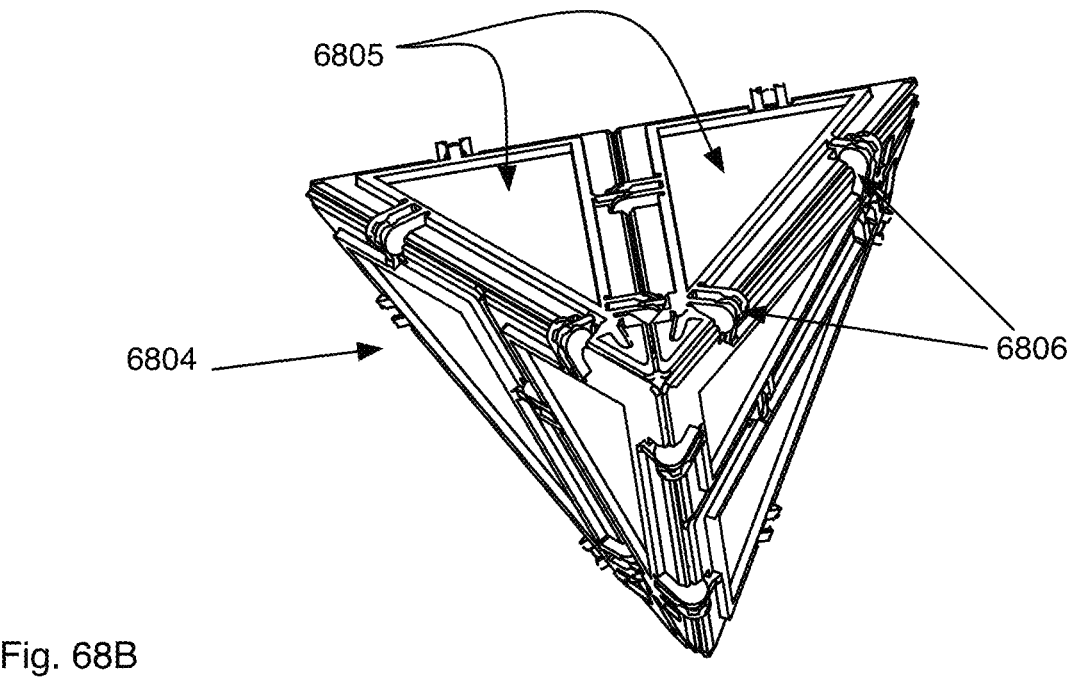
FIG. 68B shows the construction of a large tetrahedron.

In another embodiment, shown in FIG. 68B, the tetrahedron 6804 is created using the 30-60-90 triangular tiles 6805 again interconnected using the ball and socket connecting elements 6806 described above.

Figure 69A:
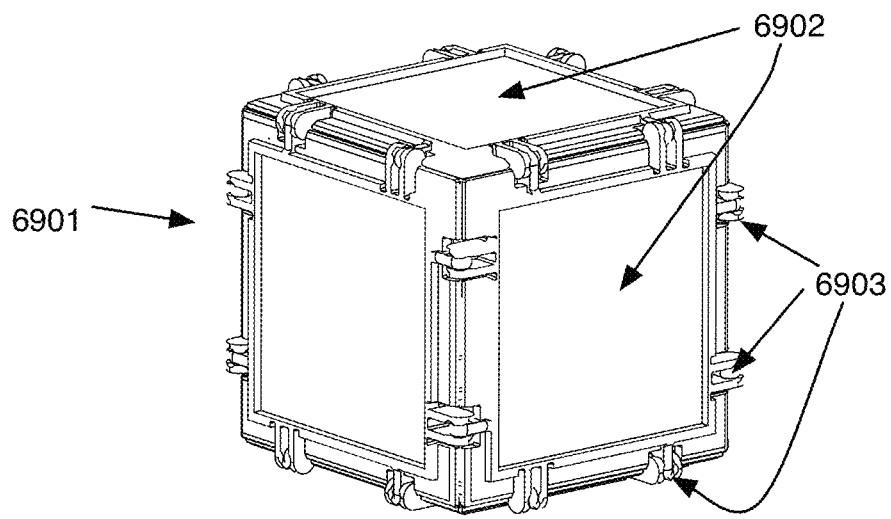
FIG. 69A shows the construction of a small cube.
Figure 69B:
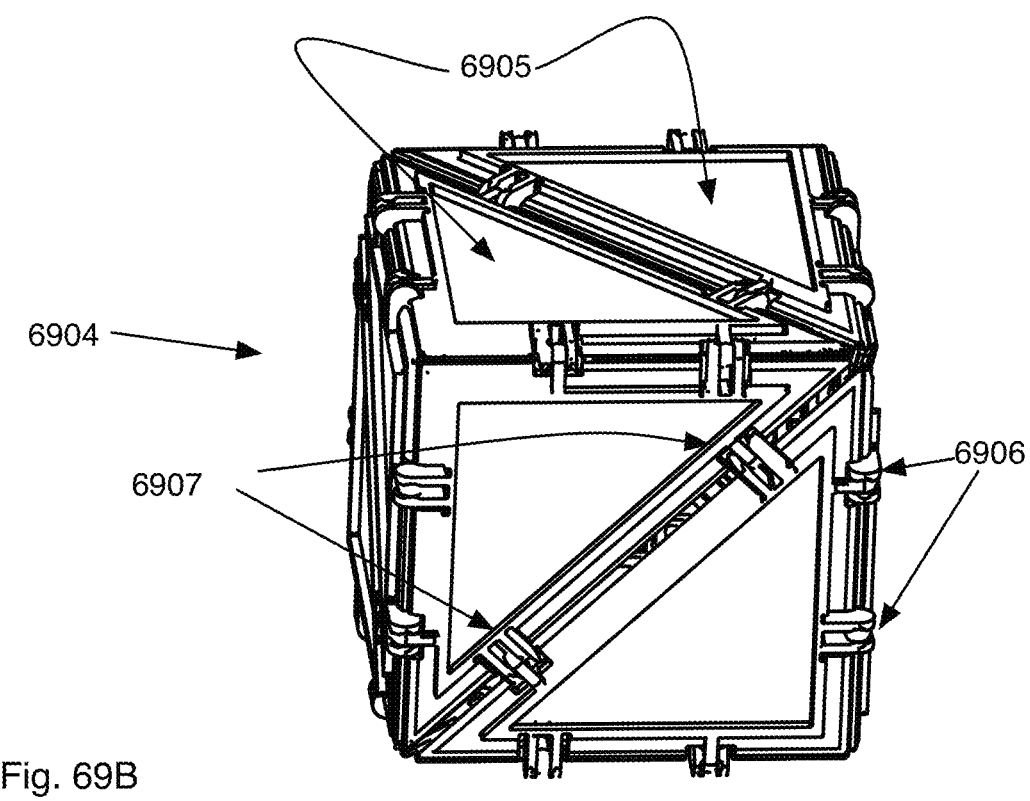
FIG. 69B shows the construction of a large cube.

Similarly two versions of a cube are shown in FIGS. 69A and 69B. The first 6901 is created using the square tiles 6902 already described. The connecting elements 6903 (only three are labeled) allow connection in three dimensions to create a cube.

In another embodiment the sides of the cube 6904 are created using a pair of the isosceles triangular tiles 6905 interconnected as before both at the edges of the cube and now also on the face 6907 of the cube 6904.

Figure 70A:
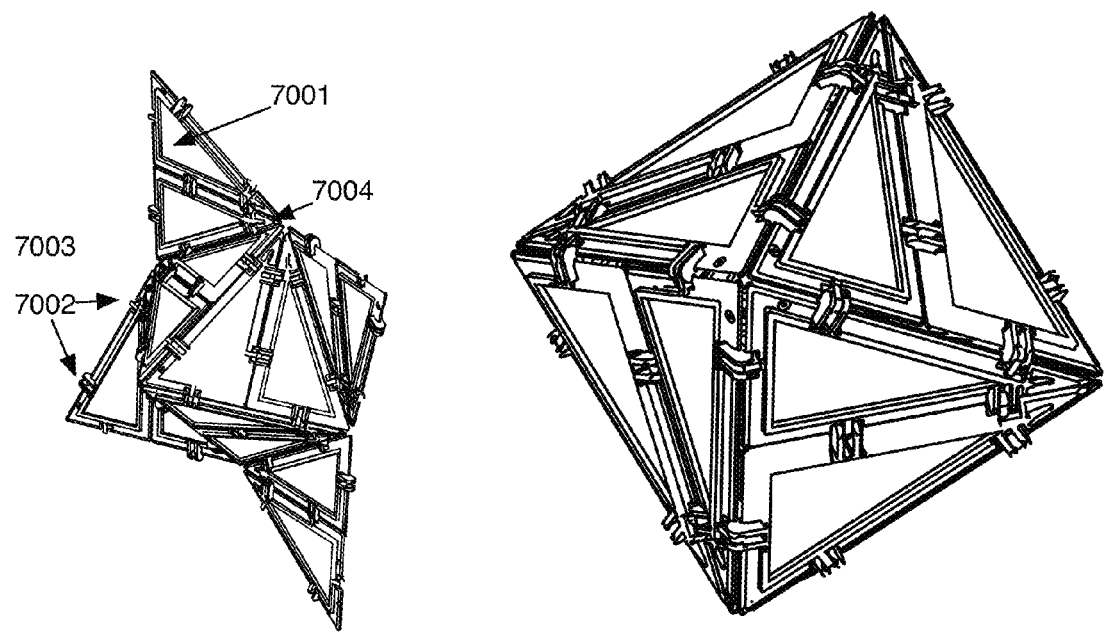
FIG. 70A shows the construction of a large octahedron.
Figure 70B:
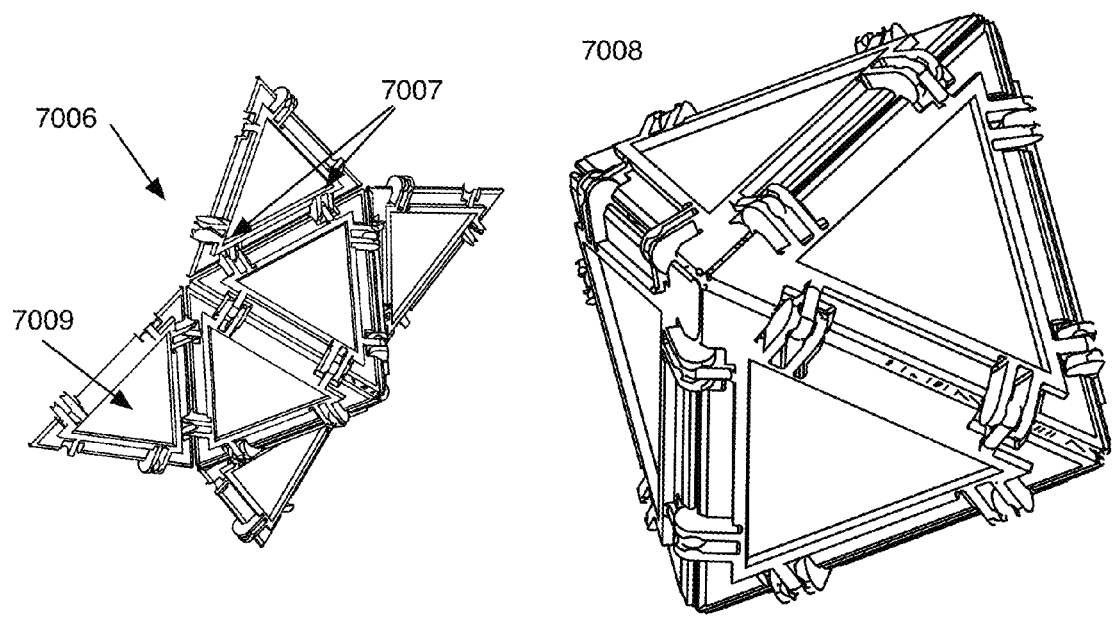
FIG. 70B shows the construction of a small octahedron.

FIGS. 70A and 70B display means to make an octahedron from the tiles already described. The figures further show the octahedron in different stages of construction. Referring to FIG. 70A the left image 7003 shows using the 30-60-90 triangular tiles 7001 in the stages of constructing an octahedron. The tiles are joined using the ball and socket connecting elements 7002. Once joined the joined tiles may be pivoted along the joined axis 704 to further connect the edges of the tiles to form the completed structure 7005. Similarly an octahedron can be constructed using the equilateral triangular tiles 7009. The tiles are joined to create a flat structure 7006 and then folded along the line of connection 7007 and the remaining sides are connected to create the finished Octahedron 7008.

Figure 71:
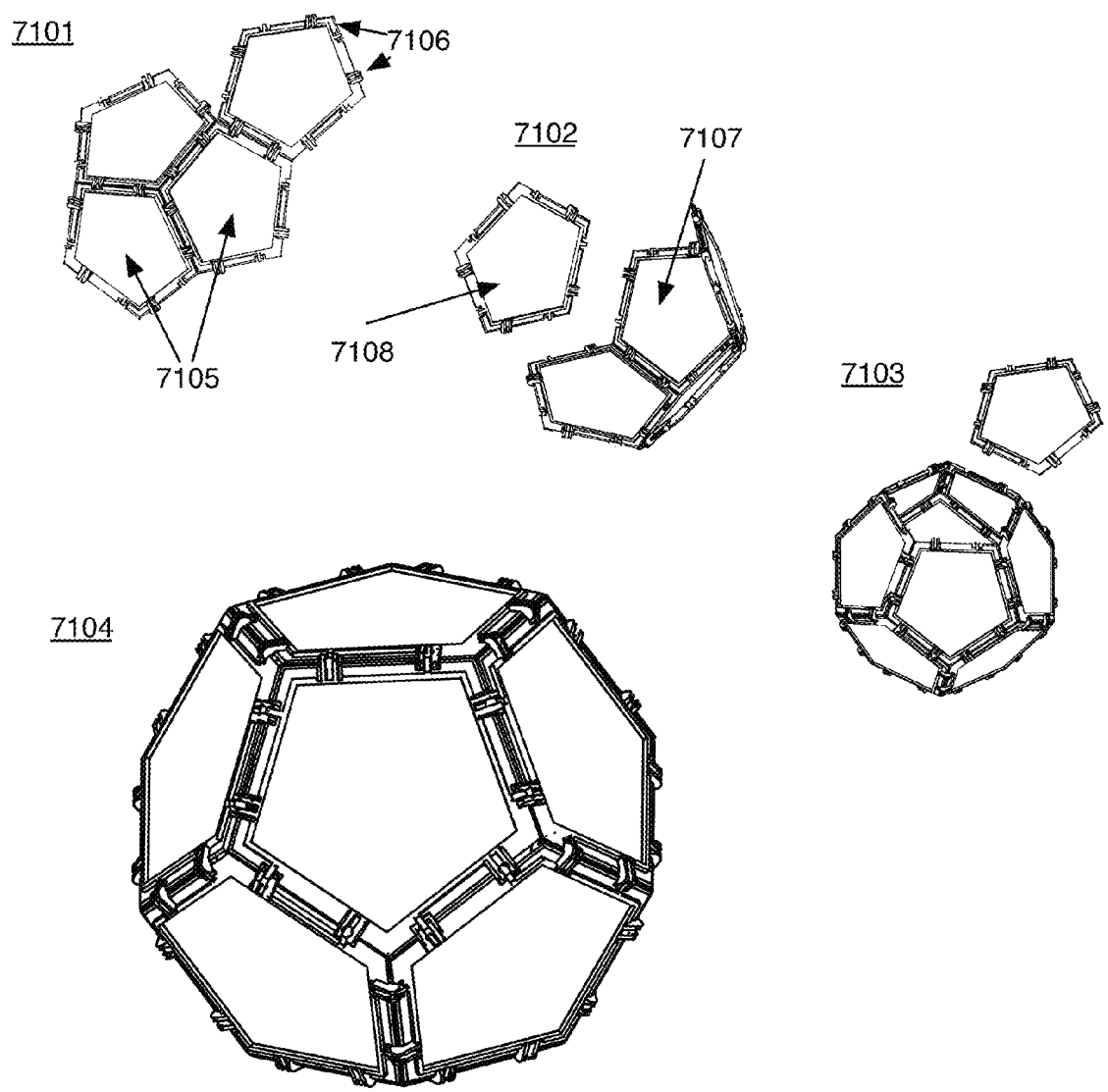

FIG. 71 shows the use of the pentagonal tiles 7105 to construct the Platonic solid Dodecahedron. The construction is shown in stages 7101, 7102, 7103, 7104. The tiles are first joined at the edges forming a structure shown in the first view 7101. where all sides of a tile 7105 are joined to a neighboring tile using the ball and socket connecting elements 7106. The tiles are folded out of the plane and the unattached sides are connected to create the bowl structure 7107. Additional pentagonal tiles 7108 are added to create the nearly complete dodecahedron with one tile to go of view 7103 which when joined in place creates the finished dodecahedron 7104.

Figure 72A:
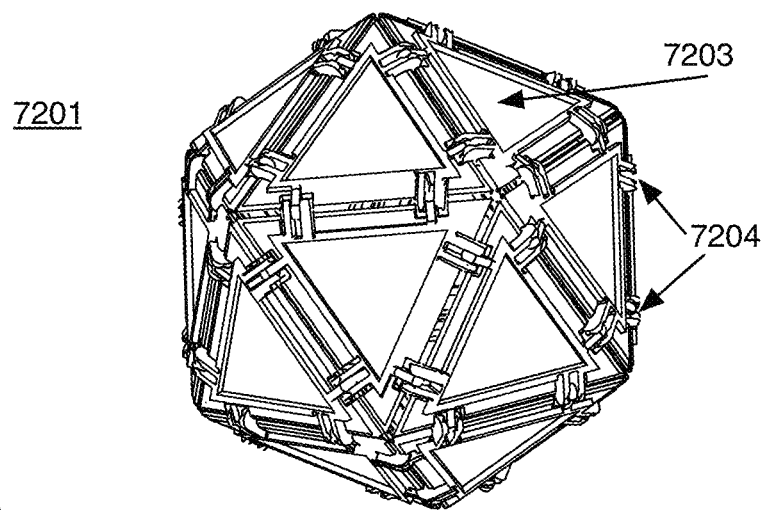
FIG. 72A shows the construction of a small icosahedron.
Figure 72B:
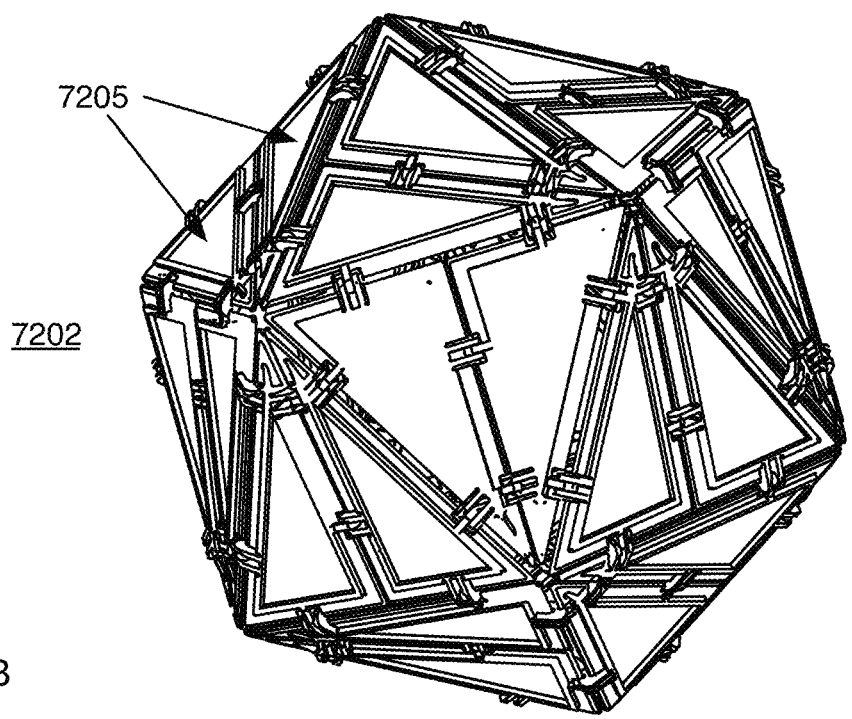
FIG. 72B shows the construction of a large icosahedron.
Figure 86:
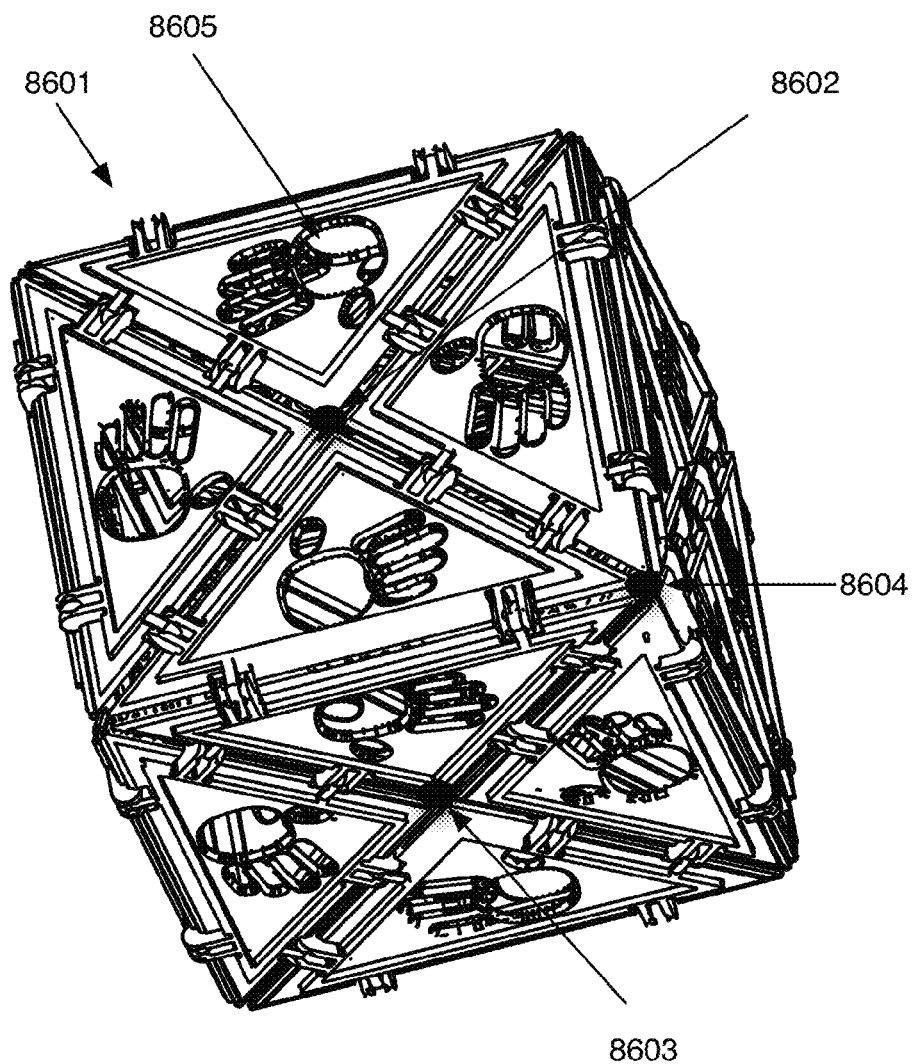

FIGS. 72A and 72B show two ways to construct the Platonic solid, Icosahedron 7201. In FIG. 72A an icosahedron 7201 is made using the equilateral tiles 7203 by joining the tiles as described using the ball and socket connecting elements 7204. FIG. 72B shows a second means to construct an icosahedron 7202 using the 30-60-90 triangular tiles 7205.

Considering the descriptions of FIGS. 68A through 72B added to the earlier results, an embodiment includes:

A set of plane-filling, double-sided tiles capable of being joined to form all 17 plane periodic patterns and capable of being joined to form the set of all 5 Platonic solids, said set comprising a. at least 6 identical tiles of a first type, being of substantially right triangular shape and having angles of 30°, 60°, and 90°, and having one male and one female coupling elements on their longer edge and hypotenuse and having one male coupling element along their shorter edge, and b. at least 6 identical tiles of a second type, being of substantially right triangular shape and having angles of 30°, 60°, and 90°, and having one male and one female coupling elements on their longer edge and hypotenuse and having one female coupling element along their shorter edge, and having a hypotenuse, long edge and short edge that are the same length as the hypotenuse, long edge and short edge respectively of the tiles of the first type, and c. at least 6 identical tiles of a third type, being of substantially right triangular shape and having angles of 30°, 60°, and 90°, and having one male and one female coupling elements on their longer edge and hypotenuse and having one male coupling element along their shorter edge and having an asymmetrical design on both sides and having a hypotenuse, long edge and short edge that are the same length as the hypotenuse, long edge and short edge respectively of the tiles of the first type, and d. at least six identical tiles of a fourth type, being of substantially right triangular shape and having angles of 30°, 60°, and 90°, and having one male and one female coupling elements on their longer edge and hypotenuse and having one female coupling element along their shorter edge and having an asymmetrical design on both sides and having a hypotenuse, long edge and short edge that are the same length as the hypotenuse, long edge and short edge respectively of the tiles of the first type, and e. the size and location of the coupling elements on the tiles of the first, second, third and fourth types provide for mutual interlocking of the tiles such that the tiles may be interlocked only with long edges adjoined to one another, short edges adjoined to one another and hypotenuses adjoined to one another, f. and whereby tiles of the first, second, third and fourth type may be selected and joined to form patterns displaying the symmetry of the plane periodic patterns identified in Conway notation as O, 2222, 22X, XX, **, *X, *2222, 2*22, 22*, 333, 632, *333, 3*3 and *632, and g. at least four identical tiles of a fifth type, being of substantially right triangular shape and having angles of 45°, 45°, and 90°, and having one male and one female coupling element on each of their edges, and h. at least four identical tiles of a sixth type, being of substantially right triangular shape and having angles of 45°, 45°, and 90°, and having one male and one female coupling element on each their edges and having a hypotenuse that is the same length as the hypotenuse of the tiles of the fifth type and having an asymmetrical design on both sides, and i. the size and location of the coupling elements on the tiles of the fifth and sixth types provide for mutual interlocking of the tiles such that the tiles may be interlocked only with hypotenuses adjoined to one another and legs joined to one another, j. and whereby tiles of the fifth and sixth type may be selected and joined to form patterns displaying the symmetry of the plane periodic patterns identified in Conway notation as O, 2222, 22X, XX, **, *X, *2222, 2*22, 22*, 442, *442 and 4*2.

Further including additional tiles of type one or three and of type two or four such that the total number of 30-60-90 triangular tiles and their complements total 40 so that there are sufficient tiles to build the icosahedron of FIG. 72B. Further including 12 pentagonal tiles to make the dodecahedron of FIG. 71 and further including at least 6 square tiles to make the cube of FIG. 69A. Where all of the coupling elements are of the ball and socket type. Whereby a set of tiles is provided that can be used to construct all 17 plane filling plane periodic patterns and all five platonic solids.

Another embodiment includes a plurality of equilateral triangular tiles that may be used to replace the pair of tiles used in each side of the tetrahedron, octahedron, and icosahedron as shown above. The number of equilateral triangular tiles may be anywhere from 1 to replace use of the 30-60-90 triangular tiles in a single side of one of the structures to 20 to create the icosahedron completely from equilateral tiles.

Another embodiment further includes rectangular tiles having male and female connectors of the ball and socket type and wherein the long side of the rectangle is sized and includes one male and one female connector so that it can be removably attached to another rectangular tile, to the longer leg of the 30-60-90 triangular tiles, to the leg of the equilateral triangle, to the edge of the square tile, to an edge of the pentagonal tile.

In another embodiment at least a portion of the rectangular tiles include an asymmetric pattern on at least one face of the tile. The asymmetric pattern having a size, location and orientation such that the asymmetric pattern on like tiles will exactly overlap if the tiles are stacked face to face. Another embodiment further includes reactan Note the asymmetric patterns are required in some of the tiles as discussed earlier to enable construction of the 17 plane periodic patterns. The set of tiles in the above embodiment that also includes the square and equilateral triangular tiles can also be used to construct a subset of the Archimedean solids. The addition of the octagonal and decagonal tiles as described in FIG. 65 enables construction of all 17 plane periodic patterns, all the Platonic solids and now all of the Archimedean solids. Construction of the Archimedean solids is shown in FIGS. 73-85.

Referring to FIG. 73 the first of the Archimedean three dimensional structures is shown. The truncated tetrahedron 7304 is constructed of equilateral triangular tiles 7305 that include the ball and socket connecting elements 7306 on the edges that enable rotation of the connection perpendicular to the connected edges. The stages of building the truncated tetrahedron are shown in views 7301, 7302 and 7303.

FIG. 74 shows construction of the Truncated Octahedron 7404. The truncated octahedron can be made using the square tile 7405 and the equilateral triangular tile 7406, both as described above. The stages of construction are shown in views 7401-7403 with the finished three-dimensional object in 7404.

FIG. 75 shows two versions of the cuboctahedron. In the first 7501 the cuboctahedron is constructed using the 30-60-90 triangular tiles 7504 and the equilateral triangular tiles 7503 to construct a cuboctahedron 7501. The structure can also be made using the square tiles 7506 and the equilateral tiles 7505 as shown in the second view 7502.

FIG. 76 shows construction of the rhombicuboctahedron 7601 using the square tiles 7603 and the equilateral triangular tiles 7602.

FIG. 77 shows construction of the snub dodecahedron 7701 using the pentagonal tiles 7702 and the equilateral triangular tiles 7703.

FIG. 78 shows construction of the truncated icosahedron 7801 using the pentagonal tiles 7802 and the equilateral triangular tiles 7803.

FIG. 79 shows construction of the snub cube 7901 using the square tiles 7902 and the equilateral triangular tiles 7903.

FIG. 80 shows construction of the icosidodecahedron 8001 using the equilateral triangular tiles 8002 and the pentagonal tiles 8003.

FIG. 81 shows construction of the rhombicosidodecahedron 8101 using the pentagonal tiles 8102. The square tiles 8103 and the equilateral triangular tiles 8104.

FIG. 82 shows construction of the truncated dodecahedron 8201 using the equilateral triangular tiles 8202 and the decahedral tiles 8203.

FIG. 83 shows construction of the truncated cube 8301 using the equilateral triangular tiles 8303 and the octahedral tiles 8302.

FIG. 84 shows construction of the great rhombicuboctahedron 8401 using the square tile 8402 the equilateral triangular tile 8403 and the octahedral tile 8404.

FIG. 85 shows construction of the great rhombicosidodecahedron 8501 using the square tile 8502, the decahedral tile 8503 and the equilateral triangular tile 8504.

In another embodiment a method of teaching construction of the Platonic solids includes selecting a set of tiles that includes the square tiles, the pentagonal tiles, the equilateral triangular tiles and linking the edges such that the linked tiles when laid out flat form the five net diagrams (FIG. 66) of the Platonic solids. Then rotating the interconnected tiles relative to one another and perpendicular to the connected edges until additional edges meet and interconnecting the additional edges until all edges are interconnected and the structure is one of the Platonic solids (also shown in FIG. 66). Thereby constructing all five Platonic solids.

In another embodiment a method of teaching construction of the Archimedean solids includes selecting a set of tiles that includes the square tiles, the pentagonal tiles, the equilateral triangular tiles, the octagonal tiles and the decagonal tiles and linking the edges such that the linked tiles when laid out flat form the thirteen net diagrams (FIG. 67B) of the Archimedean solids. Then rotating the interconnected tiles relative to one another and perpendicular to the connected edges until additional edges meet and interconnecting the additional edges until all edges are interconnected and the structure is one of the Archimedean solids (also shown in FIG. 67A). Thereby constructing all thirteen Archimedean solids.

In another embodiment the tiles of FIGS. 73-85 further include an asymmetric pattern (not shown) on the tiles that enable construction of the Archimedean three-dimensional objects with additional symmetries. In an example shown in FIG. 86 a cube having the spherical symmetry *332 is shown. The addition of the asymmetric pattern 8605 results in the 2 fold rotational axes 8602, 8603 and the three-fold rotational axes 8604 characteristic of the *332 symmetry.

Therefore in another embodiment the tile set as described above further includes a plurality of each of the tile shapes that further include an asymmetric pattern on the face of the tile. In the preferred embodiment the same asymmetric pattern is used on all of the tiles and the asymmetric pattern is located in the same location on each tile and oriented in the same direction such that the tiles could be stacked such that the asymmetric patterns in successive tiles in the stack would overlap. In another embodiment (not shown) the asymmetric pattern is a stencil cut through the face of the tiles.

Summary

A variety of sets of interconnecting plane tiles having shapes, patterns on the faces of some of the tiles and interconnecting elements to be able to construct all 17 plane periodic patterns, the five Platonic solids and the thirteen Archimedean solids are described. The tiles include connectors that enable constructing plane patterns as well as three-dimensional solids and patterns on these three-dimensional solids.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

I claim:

1. A set of plane-filling, double-sided tiles capable of forming all 17 plane periodic patterns, four three-dimensional Platonic solids, wherein the four three-dimensional Platonic solids are a tetrahedron, a cube, an octahedron and an icosahedron, and, five three-dimensional Archimedean solids, wherein the five three-dimensional Archimedean solids are a truncated tetrahedron, a truncated octahedron, a snub cube, a rhombicuboctahedron and a cuboctahedron, said set comprising:

a. at least six identical tiles of a first type, having a planar right triangular shape, having two faces and three edges consisting of a shorter edge, a longer edge, and a hypotenuse edge, and, having angles of 30°, 60°, and 90° between the edges, and, having a first male coupling element along the shorter edge, a second male coupling element along the longer edge, a third female coupling element along the longer edge, a fourth male coupling element along the hypotenuse edge of the triangle, and, a fifth female coupling element along hypotenuse edge of the triangle, all said coupling elements having a centerline, and, all said coupling elements having a location of the centerlines along the edges, and, b. at least six identical tiles of a second type, having a planar right triangular shape, having two faces and three edges consisting of a shorter edge, a longer edge, and a hypotenuse edge, and, having angles of 30°, 60°, and 90° between the edges, and, having a first female coupling element along the shorter edge, a second female coupling element along the longer edge, a third male coupling element along the longer edge, a fourth female coupling element along the hypotenuse edge of the triangle, and, a fifth male coupling element along the hypotenuse edge of the triangle, all said coupling elements having a centerline, and, all said coupling elements having a location of the centerlines along the edges, and, the locations of the first second, third, fourth, and, fifth coupling elements along the edges being the same as the locations of the first, second, third, fourth and fifth coupling elements of the tiles of the first type along their edges, and, c. at least six identical tiles of a third type said tiles being identical to the tiles of the first type, but further including an asymmetric pattern on each side of each tile, said asymmetric patterns being the same on both sides, and, on all tiles of the third type, and, the patterns having a location and an orientation on the two faces of the tiles, said locations and orientations being the same on all faces and all tiles of the third type, and, d. at least six identical tiles of a fourth type, said tiles being identical to the tiles of the second type, but further including an asymmetric pattern on each side of each tile, said asymmetric patterns being the same on both sides, and, on all tiles of the fourth type, the same as the asymmetric patterns on the tiles of the third type, and, the patterns having a location and an orientation on the faces of the tiles, said locations and orientations being the same on all faces and all tiles of the fourth type, and, said locations and orientations being the same as the locations and orientations of the asymmetric patterns on the tiles of the third type, and, e. the size and location of the coupling elements on the tiles of the first, second, third and fourth types provide for mutual interlocking of the tiles such that the tiles may be interlocked only with long edges adjoined to one another, short edges adjoined to one another and hypotenuses adjoined to one another, and, f. wherein tiles of the first, second, third and fourth type may be selected and joined to form patterns displaying the symmetry of the plane periodic patterns identified in Conway notation as 0, 2222, 22X, XX, ** *X *2222, 2*22, 22*, 333, 632, *333, 3*3 and *632, and, g. at least four identical tiles of a fifth type having a planar right triangular shape with two faces and three edges consisting of a first leg edge, a second leg edge, and a hypotenuse edge, and, having angles of 45°, 45°, and 90° between the edges, and, having a first female coupling element along the first leg edge, and, a second male coupling element along the first leg edge, and, a third female coupling element along the second leg edge, and, a fourth male coupling element along the second leg edge, and, a fifth female coupling element along hypotenuse edge of the triangle, and, a sixth male coupling element along the hypotenuse edge, each of the coupling elements having a centerline and a location along the edge that is defined by the locations of the centerlines, and, h. at least four identical tiles of a sixth type, said tiles being identical to the tiles of the fifth type but further including an asymmetric pattern on each side of each tile, said asymmetric patterns being the same on both sides and on all tiles of the sixth type, and, is the same as the asymmetric patterns on the tiles of the third type, and, the patterns having a location, and, an orientation on the faces of the tiles said locations and orientations being the same on all laces and all tiles of the sixth type, and, i. at least lour identical tiles of a seventh type said tiles being identical to the tiles of the sixth type except that the first third and fifth coupling elements are male coupling elements and the second, fourth and sixth coupling elements are female coupling elements, and, j. the size and location of the coupling elements on the tiles of the fifth, sixth and seventh types provide for mutual interlocking of the tiles such that the tiles may be interlocked only with hypotenuses adjoined to one another and legs joined to one another, and, k. wherein tiles of the fifth, sixth and seventh types may be selected and joined to form patterns displaying the symmetry of the plane periodic patterns identified in Conway notation as 0, 2222, 22X, XX, **, *X, *2222, 2*22, 22*, 442, *442, and, 4*2, and, l. wherein all of the coupling elements are of a ball and socket type, said male coupling elements comprising a ball-shaped structure and said female coupling elements comprising a socket-shaped structure, such that when coupling elements along two mutual edges of the tiles are joined, the two tiles may be rotated relative to one another about an axis of connection between the male and female coupling elements of the mutual edges in a direction perpendicular to the two edges being joined;

m. wherein the hypotenuses of all the tiles are the same length; and n. wherein the size and location of the coupling elements on the hypotenuse of the tiles of the first, second, third and fourth types are chosen such that the hypotenuses of the tiles may be adjoined to an edge formed from two short legs of a pair tiles of the first, second, third and fourth type adjoined along their long edges.

2. A set of tiles according to claim 1, wherein a proper subset of the 17 possible plane periodic patterns can be constructed with a restricted number of said types of said tiles.

3. A set of tiles according to claim 1, wherein said asymmetrical design is a stencil aperture.

4. A set of tiles according to claim 1, wherein said asymmetrical design is printed on one side of each of said tile, and, a mirror image of said asymmetrical design is printed on the reverse side of each of said tiles.

5. The set of tiles of claim 1 further including a plurality of plane double sided rectangular tiles said rectangular tiles comprising:

a. a plurality of tiles of an eighth type, having a male and a female coupling element on each edge of the rectangle, and, b. wherein all of the coupling elements are of a ball and socket type, said male coupling elements comprising a ball-shaped structure and said female coupling elements comprising a socket-shaped structure, such that when coupling elements along two mutual edges of the tiles are joined, the two tiles may be rotated relative to one another about an axis of connection between the male and female coupling elements of the mutual edges in a direction perpendicular to the two edges being joined.

6. The set of tiles of claim 1 further including a plurality of plane double sided rectangular tiles said rectangular tiles comprising:

a. at least four tiles of a ninth type, having an asymmetrical design printed on one side and a mirror image of the asymmetrical design on the second side, and, a male and a female coupling element on each edge of the rectangle, and, b. at least four tiles of a tenth type, having an asymmetrical design printed on one side and a mirror image of the asymmetrical design on the second side, and, a male and a female coupling element on each edge of the rectangle, wherein the coupling elements and the asymmetric designs are positioned and sized such that the rectangular tiles of the eighth type and the rectangular tiles of the ninth type are complements, and, c. wherein the at least four rectangular tiles of the ninth type and the four rectangular tiles of the tenth type may be selected and joined to form patterns displaying the symmetry of the plane periodic patterns identified in Conway notation as O, 2222, 22X, XX, **, *X, *2222, 2*22, and 22*, and, d. wherein all of the coupling elements are of a ball and socket type, said male coupling elements comprising a ball-shaped structure and said female coupling elements comprising a socket-shaped structure, such that when coupling elements along two mutual edges of the tiles are joined, the two tiles may be rotated relative to one another about an axis of connection between the male and female coupling elements of the mutual edges in a direction perpendicular to the two edges being joined.

7. The set of tiles of claim 1 further including a plurality of plane equilateral triangular tiles said tiles having three edges, two faces, three vertices at the intersections of the edges, the edges having a length, and, there is a center-point on the faces, and, a. a first female connecting element on a first edge and a second male connecting element on the first edge, and, b. a third female connecting element on a second edge and a fourth male connecting element on the second edge, and, c. a fifth female coupling element on a third edge and a sixth male coupling element on the third edge, and, d. said coupling elements having a centerline and a location along the edges, e. wherein the locations of the centerlines of all the female connecting elements aligns with all the male connecting elements such that the male and female connecting elements may be interconnected to join the edges of any two tiles, such that the edges are aligned and the vertices at each end of the edges align, and, the center-point of the faces of the equilateral triangular tiles is a threefold rotation axis, and, f. the connecting elements are of a ball and socket type, said male coupling elements comprising a ball-shaped structure and said female coupling elements comprising a socket-shaped structure, such that once the male and female coupling elements along mutual edges of two tiles are interconnected, the two tiles may be rotated relative to one another about an axis of connection between the male and female coupling elements of the mutual edges in a direction perpendicular to the two edges being joined.

8. The set of tiles of claim 7 further including a plurality of plane square tiles, said tiles having four edges, four vertices at the intersections of the edges, and, the edges having a length that is equal to the length of the edges of the equilateral triangular tiles, and, the tiles having two faces, and, the faces having a center-point, and, a. a first female coupling element along a first edge and a second male coupling element along the first edge, and, b. a third female coupling element along a second edge and a fourth male coupling element along the second edge, and, c. a fifth female coupling element along a third edge and a sixth male coupling element along the third edge, and, d. a seventh female coupling element along a fourth edge and an eighth male coupling element along the fourth edge, and, e. said coupling elements having a centerline and a location along the edges,
f. wherein the location of the centerlines of the female connecting elements align with the centerline of the male connecting elements such that the male and female connecting elements may be interconnected to join the edges of any two squares and any square tile to any equilateral triangular tile, such that the edges are aligned and the vertices at each end of the edges are aligned and the center-point of the face of the square tiles is a four-fold rotation axis, and,
g. the connecting elements are of a ball and socket type, said male coupling elements comprising a ball-shaped structure and said female coupling elements comprising a socket-shaped structure, such that once the male and female coupling elements along mutual edges of two tiles are interconnected, the two tiles may be rotated relative to one another about an axis of connection between the male and female coupling elements of the mutual edges in a direction perpendicular to the two edges being joined.

9. The set of tiles of claim 8 further including a plurality of plane pentagonal tiles said tiles having five edges, five vertices at the intersections of the edges, and, the edges having a length that is equal to the length of the edges of the equilateral triangular tiles, and, the tiles having two faces and the faces having a center-point, and,
  a. a first female coupling element along a first edge and a second male coupling element along the first edge, and,
  b. a third female coupling element along a second edge and a fourth male coupling element along the second edge, and,
  c. a fifth female coupling element along a third edge and a sixth male coupling element along the third edge, and,
  d. a seventh female coupling element along a fourth edge and an eighth male coupling element along the fourth edge, and,
  e. a ninth female coupling element along a fifth edge and a tenth male coupling element along the fifth edge, and,
  f. said coupling elements having a centerline and a location along the edges,
  g. wherein the location of the centerlines of the female connecting elements align with the centerline of the male connecting elements such that the male and female connecting elements may be interconnected to join the edges of any two pentagonal tiles and any pentagonal tile to any equilateral triangular tile, and, any pentagonal tile to any square tile, such that the edges are aligned and the vertices at each end of the edges are aligned and the center-point of the face of the pentagonal tiles is a five-fold rotation axis, and,
  h. the connecting elements are of a ball and socket type, said male coupling elements comprising a ball-shaped structure and said female coupling elements comprising a socket-shaped structure, such that once the male and female coupling elements along mutual edges of two tiles are interconnected, the two tiles may be rotated relative to one another about an axis of connection between the male and female coupling elements of the mutual edges in a direction perpendicular to the two edges being joined.

10. The set of tiles of claim 9 further including a plurality of plane octagonal tiles, said tiles having eight edges, eight vertices at the intersections of the edges, and, the edges having a length that is equal to the length of the edges of the equilateral triangular tiles, and, the tiles having two faces and the faces having a center-point, and,
  a. a first female coupling element along a first edge and a second male coupling element along the first edge, and,
  b. a third female coupling element along a second edge and a fourth male coupling element along the second edge, and,
  c. a fifth female coupling element along a third edge and a sixth male coupling element along the third edge, and,
  d. a seventh female coupling element along a fourth edge and an eighth male coupling element along the fourth edge, and,
  e. a ninth female coupling element along a fifth edge and a tenth male coupling element along the fifth edge, and,
  f. an eleventh female coupling element along a sixth edge and a twelfth male coupling element along the sixth edge, and,
  g. an thirteenth female coupling element along a seventh edge and a fourteenth male coupling element along the seventh edge, and,
  h. an fifteenth female coupling element along an eighth edge and a sixteenth male coupling element along the eighth edge, and,
  i. said coupling elements having a centerline and a location along the edges,
  j. wherein the location of the centerlines of the female connecting elements align with the centerline of the male connecting elements such that the male and female connecting elements may be interconnected to join the edges of any two octagonal tiles, and, any octagonal tile to any equilateral triangular tile, and, any octagonal tile to any square tile, and, any octagonal tile to any pentagonal tile, such that the edges are aligned and the vertices at each end of the edges are aligned, and, the center-point of the face of the octagonal tiles is an eight-fold rotation axis, and,
  k. the connecting elements are of a ball and socket type, said male coupling elements comprising a ball-shaped structure and said female coupling elements comprising a socket-shaped structure, such that once the male and female coupling elements along mutual edges of two tiles are interconnected, the two tiles may be rotated relative to one another about an axis of connection between the male and female coupling elements of the mutual edges in a direction perpendicular to the two edges being joined.

11. The set of tiles of claim 10, said set of tiles further capable of forming all five Platonic solids and all thirteen Archimedean solids, said set of tiles further including a plurality of plane decagonal tiles, said tiles having ten edges, ten vertices at the intersections of the edges, and, the edges having a length that is equal to the length of the edges of the equilateral triangular tiles, and, the tiles having two faces and the faces having a center-point, and,
  a. a first female coupling element along a first edge and a second male coupling element along the first edge, and,
  b. a third female coupling element along a second edge and a fourth male coupling element along the second edge, and,
  c. a fifth female coupling element along a third edge and a sixth male coupling element along the third edge, and,
  d. a seventh female coupling element along a fourth edge and an eighth male coupling element along the fourth edge, and,
  e. a ninth female coupling element along a fifth edge and a tenth male coupling element along the fifth edge, and,
  f. an eleventh female coupling element along a sixth edge and a twelfth male coupling element along the sixth edge, and, g. an thirteenth female coupling element along a seventh edge and a fourteenth male coupling element along the seventh edge, and,
h. a fifteenth female coupling element along an eighth edge and a sixteenth male coupling element along the eighth edge, and,
i. a seventeenth female coupling element along a ninth edge and an eighteenth male coupling element along the ninth edge, and,
j. a nineteenth female coupling element along a tenth edge and a twentieth male coupling element along the ninth edge, and,
k. said coupling elements having a centerline and a location along the edges,
l. wherein the location of the centerlines of the female connecting elements align with the centerline of the male connecting elements, such that the male and female connecting elements may be interconnected to join the edges of any two decagonal tiles, and, any decagonal tile to any equilateral triangular tile, and, any decagonal tile to any square tile, and, any decagonal tile to any pentagonal tile, and, any decagonal tile to any octagonal tile, such that the edges are aligned and the vertices at each end of the edges are aligned, and, the center-point of the face of the decagonal tiles is a ten-fold rotation axis, and,
m. the connecting elements are of a ball and socket type, said male coupling elements comprising a ball-shaped structure and said female coupling elements comprising a socket-shaped structure, such that once the male and female coupling elements along mutual edges of two tiles are interconnected, the two tiles may be rotated relative to one another about an axis of connection between the male and female coupling elements of the mutual edges in a direction perpendicular to the two edges being joined.

* * * * *